(12) United States Patent
Lim et al.

(10) Patent No.: US 12,464,348 B2
(45) Date of Patent: Nov. 4, 2025

(54) METHOD AND DEVICE FOR SETTING STATE OF BUNDLE AFTER TRANSFER OF BUNDLE BETWEEN APPARATUSES

(71) Applicant: SAMSUNG ELECTRONICS CO., LTD., Suwon-si (KR)

(72) Inventors: Taehyung Lim, Suwon-si (KR); Jonghoe Koo, Suwon-si (KR); Kangjin Yoon, Suwon-si (KR); Duckey Lee, Suwon-si (KR); Hyewon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 17/762,047

(22) PCT Filed: Sep. 21, 2020

(86) PCT No.: PCT/KR2020/012728
§ 371 (c)(1),
(2) Date: Mar. 18, 2022

(87) PCT Pub. No.: WO2021/054808
PCT Pub. Date: Mar. 25, 2021

(65) Prior Publication Data
US 2022/0385670 A1    Dec. 1, 2022

(30) Foreign Application Priority Data

Sep. 20, 2019 (KR) .................. 10-2019-0116222
Nov. 5, 2019 (KR) .................. 10-2019-0140219
(Continued)

(51) Int. Cl.
*H04L 9/40*       (2022.01)
*H04W 8/20*       (2009.01)
(Continued)

(52) U.S. Cl.
CPC ......... *H04W 12/06* (2013.01); *H04L 63/0869* (2013.01); *H04L 63/0876* (2013.01);
(Continued)

(58) Field of Classification Search
CPC ............... H04L 63/104; H04L 63/0869; H04L 63/0876; H04L 63/105; H04L 9/40; H04W 8/20; H04W 12/06
(Continued)

(56) References Cited

U.S. PATENT DOCUMENTS 8,712,474 B2    4/2014   Gehrmann
8,842,833 B2    9/2014   Natarajan
(Continued)

FOREIGN PATENT DOCUMENTS

CN    105339894 A    2/2016
CN    110024426 A    7/2019
(Continued)

OTHER PUBLICATIONS

European Patent Office, "Supplementary European Search Report," dated Sep. 16, 2022, in connection with European Patent Application No. 20865704.9, 11 pages.
(Continued)

*Primary Examiner* — Linglan Edwards
*Assistant Examiner* — Phuc Pham

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety
(Continued)

services. The present disclosure describes a method and device for setting the state of a bundle after the bundle has been transmitted between smart security media.

15 Claims, 30 Drawing Sheets

(30) Foreign Application Priority Data

| | | | |
|---|---|---|---|
| Nov. 21, 2019 | (KR) | ........................ | 10-2019-0150329 |
| Nov. 21, 2019 | (KR) | ........................ | 10-2019-0150466 |
| Sep. 18, 2020 | (KR) | ........................ | 10-2020-0120292 |

(51) Int. Cl.
*H04W 12/06* (2021.01)
*H04W 12/71* (2021.01)

(52) U.S. Cl.
CPC .......... *H04L 63/104* (2013.01); *H04L 63/105* (2013.01); *H04W 8/20* (2013.01); *H04W 12/71* (2021.01)

(58) Field of Classification Search
USPC ............................................................. 726/4
See application file for complete search history.

(56) References Cited

U.S. PATENT DOCUMENTS

| | | | |
|---|---|---|---|
| 9,749,282 B2 | 8/2017 | Jain et al. | |
| 10,142,829 B2* | 11/2018 | Jin | ........................ H04W 8/183 |
| 10,242,210 B2 | 3/2019 | Girard et al. | |
| 10,694,369 B2 | 6/2020 | Park | |
| 10,735,945 B2 | 8/2020 | Lee et al. | |
| 11,197,150 B2 | 12/2021 | Yoon et al. | |
| 2014/0237101 A1* | 8/2014 | Park | ...................... H04W 8/205 |
| | | | 709/223 |
| 2019/0075453 A1* | 3/2019 | Yoon | .................... H04W 12/06 |
| 2019/0313246 A1* | 10/2019 | Nix | ...................... H04W 12/069 |
| 2022/0078615 A1 | 3/2022 | Lee et al. | |

FOREIGN PATENT DOCUMENTS

| | | |
|---|---|---|
| EP | 2741466 A1 | 6/2014 |
| JP | 2010-532107 A | 9/2010 |
| JP | 2012019511 A | 1/2012 |
| JP | 2014507823 A | 3/2014 |
| KR | 10-2014-0086950 A | 7/2014 |
| KR | 10-2016-0032603 A | 3/2016 |
| KR | 10-2019-0027488 A | 3/2019 |
| KR | 10-2020-0101257 A | 8/2020 |

OTHER PUBLICATIONS

ETSI TS 103 666-2 V0.13.0 (Jul. 2019); Technical Specification; Smart Secure Platform (SSP); Integrated SSP (iSSP) characteristics (Release 15); 81 pages.
ETSI TS 103 465 V16.0.0 (Aug. 2019); Technical Specification; Smart Cards; Smart Secure Platform (SSP); Requirements Specification; 53 pages.
Samsung R&D Institute UK, "Addition of notification over Si2 interface," ETSI TC SCP TEC Meeting #82, Prague, CZ, Sep. 2019, SCPTEC(19)000262r1, 5 pages.
Orange, "Add a notification procedure for Secondary Platform Bundle management operations," ETSI TC SCP TEC Meeting #82, Prague, CZ, Sep. 2019, SCPTEC(19)000236, 7 pages.
Samsung R&D Institute UK, "Discussion on iSSP Unique Identifier," ETSI TC SCP REQ Meeting #71, SCPREQ(18)000124, Paris, FR, Sep. 2018, 12 pages.
International Search Report in connection with International Application No. PCT/KR2020/012728 issued Jan. 8, 2021, 2 pages.
ETSI TS 103 465 V15.0.0, Smart Cards; Smart Secure Platform (SSP); Requirements Specification, May 2019, 52 pages.
MSG MCP, "Approved minutes 12th meeting ad hoc multistakeholder group on Mobile Contactless SEPA Cards Interoperability Implementation Guidelines (MCP IIGs)", MSG MCP 008-2018, Version 1.0, Feb. 23, 2018, 10 pages.
Written Opinion of the International Searching Authority in connection with International Application No. PCT/KR2020/012728 issued Jan. 8, 2021, 3 pages.
The First Office Action dated Apr. 10, 2024, in connection with Chinese Patent Application No. 202080080987.6, 11 pages.
Notice of Reasons for Refusal issued Jul. 2, 2024, in connection with Japanese Patent Application No. 2022-517517, 13 pages.
The Second Office Action issued Sep. 6, 2024, in connection with Chinese Patent Application No. 202080080987.6, 16 pages.
Examination report issued Aug. 22, 2024, in connection with Indian Patent Application No. 202237014183, 7 pages.
ETSI TC SCP, "Approval of Smart Secure Platform requirement specification", S3-191158, 3GPP TSG SA WG3 #95, Reno (US), May 6-10, 2019, 1 page.

* cited by examiner

METHOD AND DEVICE FOR SETTING STATE OF BUNDLE AFTER TRANSFER OF BUNDLE BETWEEN APPARATUSES

CROSS-REFERENCE TO RELATED APPLICATIONS

This application is a 371 of International Application No. PCT/KR2020/012728 filed on Sep. 21, 2020, which claims priority to Korean Patent Application No. 10-2019-0116222 filed on Sep. 20, 2019, Korean Patent Application No. 10-2019-0140219 filed on Nov. 5, 2019, Korean Patent Application No. 10-2019-0150329 filed on Nov. 21, 2019, Korean Patent Application No. 10-2019-0150466 filed on Nov. 21, 2019, and Korean Patent Application No. 10-2020-0120292 filed on Sep. 18, 2020, the disclosures of which are herein incorporated by reference in their entirety.

BACKGROUND

1. Field

The disclosure relates to a smart security medium, and more particularly, to a method and device for configuring a state of a bundle after a bundle transfer between smart secure media is made.

The disclosure relates to a smart security medium, and more particularly, to a method and device for registering a bundle transfer result in a server after a bundle transfer between smart secure media is made.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The disclosed embodiment provides a device and method for configuring a bundle state after bundle transmission is performed when a bundle is moved between security modules included in two electronic devices.

Further, the disclosed embodiment provides a device and method for registering a bundle transmission result in a server after bundle transmission is performed when a bundle is moved between security modules included in two electronic devices.

SUMMARY

According to an embodiment of the disclosure, a method of operating a first terminal includes transmitting a bundle to a second terminal; receiving, from the second terminal, a first attestation generated including bundle state information of the second terminal; verifying the received first attestation; generating a second attestation including bundle state information of the first terminal after verifying the first attestation; and transmitting the second attestation to the second terminal.

In some examples, the bundle state information of the first terminal may include that the bundle state of the first terminal is configured to at least one of DELETE, IN TRANSITION, or SUSPENSION.

In some examples, the method may further include receiving, from the second terminal, a third attestation generated including information on the bundle state change of the second terminal when the bundle state of the first terminal is configured to IN TRANSITION; verifying the received third attestation; and deleting the bundle of the first terminal after verifying the third attestation.

In some examples, a fourth attestation including information on a verification result of the first attestation and the second attestation may be generated by the second terminal, the fourth attestation may be transmitted to the server, and the fourth attestation may be verified by the server.

In some examples, a fifth attestation including an authentication result with the server may be generated by the server; the fifth attestation may be transmitted to the second terminal, and the fifth attestation may be verified by the second terminal.

According to another embodiment of the disclosure, a method of operating a second terminal includes receiving a bundle from a first terminal; installing the bundle; generating a first attestation including bundle state information of a second terminal; transmitting the first attestation to the first terminal; receiving, from the first terminal, a second attestation generated including bundle state information of the first terminal; verifying the received second attestation; and changing the bundle state configuration information of the second terminal after verifying the second attestation.

According to another embodiment of the disclosure, a first terminal includes a transceiver configured to transmit and receive at least one signal; and a controller coupled to the transceiver, wherein the controller is configured to transmit a bundle to a second terminal, to receive, from the second terminal, a first attestation generated including bundle state information of the second terminal; to verify the received first attestation; to generate a second attestation including bundle state information of the first terminal after verifying the first attestation, and to transmit the second attestation to the second terminal.

According to another embodiment of the disclosure, a second terminal includes a transceiver configured to transmit and receive at least one signal; and a controller coupled to the transceiver, wherein the controller is configured to receive a bundle from the first terminal, install the bundle, to generate a first attestation including bundle state information of the second terminal, to transmit the first attestation to the first terminal, to receive, from the first terminal, a second attestation generated including bundle state information of the first terminal, to verify the received second attestation, and to change the bundle state configuration information of the second terminal after verifying the second attestation.

According to various embodiments of the disclosure, a bundle installed in one device can be transmitted and installed to another device in a safe and efficient manner, and after transmission and installation are completed, a bundle state can be configured.

Further, according to various embodiments of the disclosure, a bundle installed in one device can be transmitted and installed to another device in a safe and efficient manner, and after transmission and installation are completed, a transmission result of the bundle can be registered in a server.

DETAILED DESCRIPTION

Figure 1:
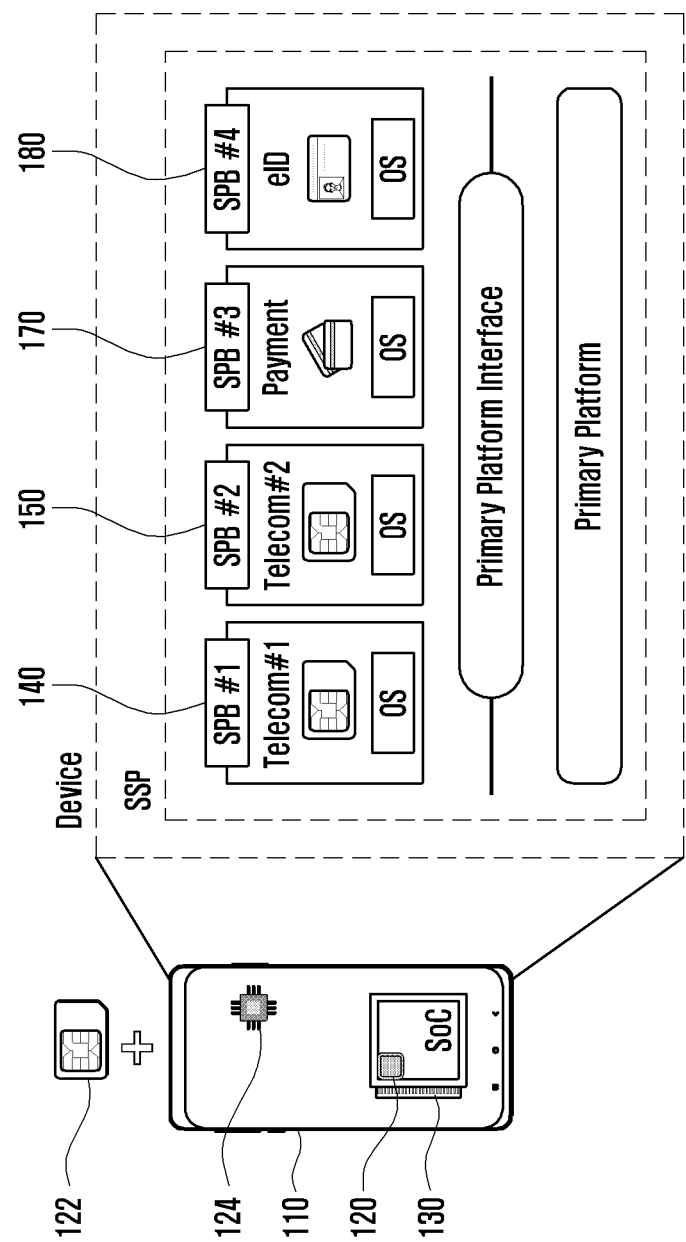
FIG. 1 is a conceptual diagram illustrating an SSP according to an embodiment of the disclosure.

Hereinafter, embodiments of the disclosure will be described in detail with reference to the accompanying drawings.

In describing the embodiments, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of message flow diagrams and combinations of the message flow diagrams may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the message flow diagram block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the message flow diagram block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the message flow diagram block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term "-unit" used in this embodiment means software or hardware components such as FPGA or ASIC, and "-unit" performs certain roles. However, "-unit" is not limited to software or hardware. "-unit" may be configured to reside in an addressable storage medium or may be configured to reproduce one or more processors. Therefore, as an example, "-unit" includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and "-units" may be combined into a smaller number of components and "-units" or may be further separated into additional components and "-units". Further, components and "-units" may be implemented to reproduce one or more CPUs in a device or secure multimedia card.

Further, in the disclosure, each embodiment is described by taking an SSP as an example of a security medium, but the scope of the disclosure is not limited to that by the SSP. For example, it is apparent to those skilled in the art that various embodiments to be described below may be applied substantially the same as or similar to other security media that perform substantially the same function as or similar functions to the SSP.

Specific terms used in the following description are provided to help the understanding of the disclosure, and the use of such specific terms may be changed to other forms without departing from the technical spirit of the disclosure.

A "secure element (SE)" refers to a security module configured as a single chip that may store security information (e.g., mobile communication network access key, user identification information such as ID/passport, credit card information, encryption key, and the like) and that may mount and operate a control module (e.g., network access control module such as USIM, encryption module, key generation module, and the like) using the stored security information. The SE may be used in various electronic devices (e.g., smartphones, tablet PCs, wearable devices, automobiles, IoT devices, and the like), and provide security services (e.g., mobile communication network access, payment, user authentication, and the like) through security information and the control module.

The SE may be classified into an universal integrated circuit card (UICC), an embedded secure element (eSE), and a smart secure platform (SSP), which is an integrated form of the UICC and the eSE and may be subdivided into removable, embedded, and integrated, which are integrated into a specific element or system on chip (SoC) according to the type of connection or installation in an electronic device.

The "universal integrated circuit card (UICC)" is a smart card inserted and used in a mobile communication terminal, and may be referred to as a UICC card. The UICC may include an access control module for accessing a network of a mobile communication service provider. Examples of the access control module may include a universal subscriber identity module (USIM), a subscriber identity module (SIM), and an IP multimedia service identity module (ISIM). A UICC including a USIM is usually referred to as a USIM card. Similarly, a UICC including a SIM module is commonly referred to as a SIM card. The SIM module may be loaded upon producing an UICC or a SIM module of a mobile communication service in which a user wants to use at a desired time may be downloaded in the UICC card. The UICC card may be used by downloading and installing a plurality of SIM modules and selecting at least one SIM module thereof. Such a UICC card may or may not be fixed to the terminal. A UICC fixed to and used in a terminal is referred to as an embedded UICC (eUICC), and in particular, a UICC built in a communication processor of the terminal, an application processor, or a System-On-Chip (SoC) including a single processor structure in which the two processors are integrated may be referred to as an integrated UICC (iUICC). In general, the eUICC and iUICC may refer to a UICC card fixed to a terminal and used, and that may be selected by remotely downloading a SIM module. In the disclosure, a UICC card that may remotely download and select a SIM module is collectively referred to as an eUICC or an iUICC. That is, among UICC cards that may be selected by remotely downloading a SIM module, UICC cards that are fixed or not fixed to the terminal are collectively used as an eUICC or iUICC. Further, the downloaded SIM module information is collectively used as the term eUICC profile, iUICC profile, or more simply, the term profile.

In the disclosure, the term UICC may be used interchangeably with SIM, and the term eUICC may be used interchangeably with eSIM. Further, in the disclosure, the USIM profile may have the same meaning as the profile or may mean that information included in the USIM application within the profile is packaged in the form of software.

An "embedded secure element (eSE)" refers to a fixed SE used by being fixed to an electronic device. The eSE is usually produced exclusively for a terminal manufacturer by a request of the terminal manufacturer, and may be produced including an operating system and framework. The eSE remotely downloads and installs an applet-type service control module and may be used for various security services such as an e-wallet, ticketing, e-passport, and digital key. In the disclosure, a single chip type SE attached to an electronic device capable of remotely downloading and installing a service control module is collectively referred to as an eSE.

A "smart secure platform (SSP)" is capable of integrating UICC and eSE functions in a single chip and may be distinguished into a removable SSP (rSSP), an embedded SSP (eSSP), and an integrated SSP (iSSP) embedded in a SoC. The SSP may include one primary platform (PP) and at least one secondary platform bundle (SPB) operating on the PP, and the primary platform may include at least one of a hardware platform or a low level operating system (LLOS), and the secondary platform bundle may include at least one of a high-level operating system (HLOS) or an application running on the HLOS. The secondary platform bundle is also referred to as an SPB or a bundle. The bundle may access resources such as a central processer and a memory of the PP through a primary platform interface (PPI) provided by the PP, thereby being run on the PP. In the bundle, communication applications such as a subscriber identification module (SIM), a universal SIM (USIM), and an IP Multimedia SIM (ISIM) may be loaded, and various application applications such as an electronic wallet, ticketing, e-passport, digital key, and the like may be loaded. In the disclosure, the SSP may be referred to as a smart security medium.

The SSP may be used for the above-described UICC or eSE purpose according to a bundle to be downloaded and installed, and a plurality of bundles may be installed in a single SSP and operated at the same time to mix the uses of UICC and eSE. That is, when a bundle including a profile operates, the SSP may be used as a UICC for accessing a network of a mobile communication service provider. The corresponding UICC bundle may be operated by downloading and selecting at least one profile such as the eUICC or iUICC from the remote into the bundle. Further, when a bundle including a service control module loaded with application applications capable of providing services such as an electronic wallet, ticketing, e-passport, or digital key operates on the SSP, the SSP may be used for the purpose of the eSE. A plurality of service control modules may be integrated, installed, and operated in one bundle or may be installed and operated as an independent bundle.

The SSP may be installed by downloading a bundle from a secondary platform bundle manager (SPB Manager) using over the air (OTA) technology or may receive a bundle from another terminal to be installed. In the disclosure, a method of installing the downloaded or received bundle may be equally applied to a removable SSP (rSSP) that may be inserted into and removed from the terminal, a fixed SSP (eSSP) that may be installed in the terminal, and an integrated SSP (iSSP) included in the SoC installed in the terminal.

An "SSP identifier (SSP ID)" is an object identifier of the SSP embedded in the terminal and may be referred to as an sspID. Further, when the terminal and the SSP chip are not separated, as in the embodiment of the disclosure, the SSP ID may be a terminal ID. Further, the SSP ID may refer to a specific bundle identifier (SPB ID) in the SSP. In more detail, the SSP ID may refer to a bundle identifier of a management bundle or a secondary platform bundle loader (SPBL) that installs other bundles in the SSP and that manages activation, deactivation, and deletion of other bundles. Further, the SSP ID may refer to a primary platform identifier in the SSP. The SSP may have a plurality of SSP identifiers, and the plurality of SSP identifiers may be values derived from a single unique SSP identifier.

A "secondary platform bundle (SPB)" is driven using resources of a PP on a primary platform (PP) of an SSP, and for example, the UICC bundle may mean that an application, a file system, an authentication key value, and the like stored in the existing UICC, and that an operating system (HLOS) in which they operate are packaged in a software form. In the disclosure, an SPB may be referred to as a bundle.

In the disclosure, a "state" of the terminal may be as follows.

[Enable]

In the disclosure, operation of enabling a bundle by a terminal or an external server may mean operation of configuring so that the terminal receives a service (e.g., a communication service, a credit card payment service, a user authentication service, and the like through an communication service provider) provided by the bundle by changing a state of the corresponding SPB to enabled. A bundle in an enabled state may be represented as an "enabled bundle". The bundle in the enabled state may be stored in an encrypted state in a storage space inside or outside the SSP.

[Active]

The bundle enabled in the disclosure may be changed to active according to a bundle external input (e.g., user input, push, application request in the terminal, authentication request from a communication operator, PP management message, and the like) or an operation (e.g., timer, polling) inside the bundle. The active bundle may mean that the bundle is loaded from a storage space inside or outside the SSP into an active memory inside the SSP, processes security information using a secure CPU inside the SSP, and provides a security service to the terminal.

[Disabled]

In the disclosure, operation in which a terminal or an external server disables a bundle may mean operation of configuring so that the terminal may not receive a service provided by the bundle by changing the bundle state to disabled. The disabled SPB may be represented as a "disabled bundle". The disabled bundle may be stored in an encrypted state in a storage space inside or outside the SSP.

[Deleted]

In the disclosure, operation in which a terminal or an external server deletes a bundle may mean operation of changing the bundle state to deleted or configuring so that the terminal or the external server may no longer drive, enable, or disable the bundle by deleting related data of the bundle including the bundle. A bundle in a deleted state may be represented as a "deleted bundle".

A "bundle Image (or image)" may be used interchangeably with a bundle or may be used as a term representing a data object of a specific bundle and may be referred to as a bundle TLV or a bundle image TLV. When the bundle image is encrypted using encryption parameters, it may be referred to as a protected bundle image (PBI) or a protected bundle image TLV (PBI TLV). When the bundle image is encrypted using an encryption parameter that can be decrypted only by a specific SSP, it may be referred to as a bound bundle image (BBI) or a bound bundle image TLV (BBI TLV). The bundle image TLV may be a data set representing information constituting a bundle in a TLV (Tag, Length, Value) format.

A "bundle delimiter" may be referred to as a matching factor of a bundle identifier (SPB ID), a bundle family identifier (SPB Family ID), a bundle family manager identifier (SPB Family Custodian Object ID), a bundle matching ID, an event identifier (event ID). The bundle identifier (SPB ID) may indicate an object identifier of each bundle. The bundle family identifier may indicate an identifier for classifying a type of a bundle (e.g., a telecom bundle for accessing a mobile communication company network). In the disclosure, the bundle family identifier may be referred to as Family ID, Fid, or FID. The bundle family manager identifier may indicate an identifier that identifies a subject (e.g., a communication service provider, a terminal manufacturer, a specific organization, and the like) that manages the bundle family identifier. In the disclosure, the bundle family manager identifier may be referred to as an OID or Oid. The bundle delimiter may be used as a value that can index bundles in the bundle management server or the terminal.

"Bundle metadata" is a term indicating a set of information that can refer to or describe a bundle. The bundle metadata may include the above-described bundle delimiter. Further, bundle metadata may further include information on attributes, characteristics, or configurations of the bundle. Bundle metadata may be represented as "metadata".

A "bundle management server" may include a function of generating a bundle, encrypting the generated bundle, generating a bundle remote management instruction, or encrypting the generated bundle remote management instruction according to a request from a service provider or other bundle management server. The bundle management server that provides the above functions may be represented as at least one of a secondary platform bundle manager (SPBM), a remote bundle manager (RBM), an image delivery server (IDS), subscription manager data preparation (SM-DP), subscription manager data preparation plus (SM-DP+), a manager bundle server, managing subscription manager data preparation plus (managing SM-DP+), a bundle encryption server, a bundle generation server, a bundle provisioner (BP), a bundle provider, or a bundle provisioning credentials holder (BPC holder).

In the disclosure, the bundle management server may perform a function of downloading, installing, or updating a bundle from the SSP and managing configurations of a key and certificate for remote management of the bundle state. The bundle management server that provides the above function may be represented as at least one of a secondary platform bundle manager (SPBM), a remote bundle manager (RBM), an image delivery server (IDS), subscription manager secure routing (SM-SR), subscription manager secure routing plus (SM-SR+), off-card entity of eUICC profile manager or profile management credentials holder (PMC holder), or eUICC Manager (EM).

In the disclosure, an open relay server may receive an event register request (register event request) from one or more bundle management servers or open relay servers. Further, one or more open relay servers may be complexly used, and in this case, a first open relay server may receive an event register request from not only the bundle management server but also a second open relay server. In the disclosure, a function of the open relay server may be integrated into the bundle management server. The open relay server that provides the above function may be represented as at least one of a secondary platform bundle manager (SPBM), a remote bundle manager (RBM), a secondary platform bundle discovery sever (SPBDS), a bundle discovery sever (BDS), a subscription manager discovery service (SM-DS), a discovery service (DS), a root SM-DS, or an alternative SM-DS.

In the disclosure, the bundle management server may collectively refer to a combination of a function of generating, encrypting, and transferring a bundle or bundle remote management instruction, and a function of manage a configuration of an SSP and an installed bundle. Further, the bundle management server may collectively refer to the combined functions of the open relay server. Therefore, in various embodiments of the disclosure, operations of the bundle management server and the open relay server may be performed in one bundle management server. Further, each function may be divided and performed by a plurality of bundle management servers separated from each other. Further, in the specification of the disclosure, the bundle management server or the open relay server may be represented as a bundle server. The bundle server may be one of the bundle management server and the open relay server, or may be a device including both the bundle management server and the open relay server.

A "service provider" may indicate a business entity that issues a requirement to the bundle management server to request bundle generation, and that provides a service to a terminal through the bundle. For example, a service provider may represent a mobile operator that provides a communication network access service through a bundle in which a communication application is loaded, and may collectively refer to all of a business supporting system (BSS), an operational supporting system (OSS), a point of sale terminal (POS), and other IT systems of the communication operator. Further, in the disclosure, the service provider is not limited to expressing only one specific business entity, but may be used as a term referring to a group or association (or consortium) of one or more business entities or a representative representing the group or association. Further, in the disclosure, a service provider may be referred to as an operator (OP or Op.), a bundle owner (BO), an image owner (TO), and the like, and each service provider may receive a configuration or allocation of at least one of a name and/or unique identifier (OID). When the service provider refers to a group, association, or representative of one or more businesses, a name or object identifier of any group, association, or representative may be a name or object identifier shared by all business entities affiliated with the group or association or all business entities collaborating with the representative.

A "subscriber" may be used as a term referring to a service provider having ownership of the terminal or an end user having ownership of the terminal. In general, the former may be referred to as an M2M device, and the latter may be referred to as a consumer device. In the case of an M2M device, although it does not have ownership of the device, there may be an end user who transfers or leases and uses the device from a service provider, and in this case, the user may be different from or the same as the service provider.

A "subscriber intent" may be used as a generic term for an intention of a subscriber to manage a bundle locally or remotely. Further, in the case of local management, a subscriber intent refers to an end user intent, and in the case of remote management, a subscriber intent may be used as a term referring to a service provider intent.

An "end user consent" may be used as a term indicating whether a user agrees to perform local management or remote management.

A "terminal" may be used as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, mobile, or other terms. Various embodiments of the terminal may include a cellular phone, a smart phone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and playback appliance having a wireless communication function, an Internet home appliance capable of wireless Internet access and browsing, as well as a portable unit or terminal incorporating combinations of such functions. Further, the terminal may include a machine to machine (M2M) device and a machine type communication (MTC) terminal/device, but is not limited thereto. In the disclosure, a terminal may be referred to as an electronic device.

In the disclosure, an SSP that may be installed by downloading a bundle may be embedded in the electronic device. When the SSP is not embedded in the electronic device, the SSP physically separated from the electronic device may be inserted into the electronic device and connected to the electronic device. For example, the SSP may be inserted into the electronic device in the form of a card. The electronic device may include a terminal, and in this case, the terminal may be a terminal including an SSP that can be installed by downloading a bundle. The SSP may be embedded in the terminal, and when the terminal and the SSP are separated, the SSP may be inserted into the terminal, and may be inserted into the terminal to be connected to the terminal.

A "local bundle assistant (LBA)" may refer to software or an application installed in a terminal or electronic device in order to control the SSP. The software or application may be referred to as a Local Bundle Manager (LBM).

A "secondary platform bundle loader (SPBL)" may refer to a management bundle that installs other bundles in an SSP and that manages enabling, disabling, and deletion thereof. An LBA of a terminal or a remote server may install, enable, disable, or delete a specific bundle through the loader. In the disclosure, operation of the loader may be described as operation of the SSP including the loader.

An "event" may be a generic term for bundle download, remote bundle management, or management/processing instructions of other bundles or SSPs. The event may be referred to as a remote bundle provisioning operation (RBP operation, or RBP operation) or an event record, and each event may be referred to as data including at least one of a corresponding event identifier (Event ID, EventID) or a matching identifier (Matching ID, MatchingID), an address (FQDN, IP Address, or URL) of a bundle management server or an open relay server in which the event is stored, or each server identifier. Bundle download may be used interchangeably with bundle Installation. Further, an event type may be used as a term indicating whether a particular event is bundle download, remote bundle management (e.g., delete, enable, disable, replace, update, and the like), or other bundle or SSP management/processing instruction, and may be referred to as an operation type (OperationType), an operation class (OperationClass), an event request type, an event class, an event request class, and the like.

"Local bundle management (LBM)" may be referred to as bundle local management, local management, local management command, local command, local bundle management package (LBM Package), bundle local management package, local management package, local management command package, or local command package. LBM may be used for installing any bundle through software installed in the terminal, changing a state (enabled, disabled, deleted) of a specific bundle, or updating contents (e.g., bundle nickname, or bundle metadata, and the like) of a specific bundle. The LBM may include one or more local management commands, and in this case, a bundle to be targeted for each local management command may be the same or different for each local management command.

"Remote bundle management (RBM)" may be referred to as bundle remote management, remote management, remote management command, remote command, remote bundle management package (RBM package), bundle remote management package, remote management package, remote management command package, or remote command package. RBM may be used for installing any bundle, changing a state (enabled, disabled, deleted) of a specific bundle, or updating contents (e.g., a bundle nickname, or bundle metadata) of a specific bundle. The RBM may include one or more remote management commands, and a bundle to be targeted for each remote management command may be the same or different for each remote management command.

A "target bundle" may be used as a term referring to a bundle to be a target of a local management command or a remote management command.

A "bundle rule" may be used as a term referring to information that the terminal should identify when performing local management or remote management for a target bundle. Further, the bundle rule may be used interchangeably with terms such as a bundle policy, a rule, and a policy.

A "certificate" or digital certificate may represent a digital certificate used for mutual authentication based on an asymmetric key consisting of a pair of a public key (PK) and a secret key (SK). Each certificate may include one or more public keys (PK), a public key identifier (PKID) corresponding to each public key, and an identifier (certificate issuer ID) of a certificate issuer (CI) issued the corresponding certificate, and digital signature. Further, the certificate issuer may be referred to as a certification issuer, a certificate authority (CA), a certification authority, and the like. In the disclosure, a public key (PK) and a public key identifier (PKID) may be used interchangeably with the same meaning referring to a specific public key or a certificate including the public key, a part of a specific public key, a portion of a certificate including the public key, an operation result (e.g., hash value) of a specific public key, an operation result (e.g., hash) of a certificate including the corresponding public key, or an operation result (e.g., hash) value of a portion of a specific public key, an operation result (e.g., hash) value of a portion of the certificate including the corresponding public key, or a storage space in which data is stored.

When certificates (primary certificates) issued by a "certificate issuer" are used for issuing other certificates (secondary certificates), or when secondary certificates are used for jointly issuing tertiary or higher certificates, a "certificate chain" or a certificate hierarchy may indicate a correlation between the corresponding certificates. In this case, a CI certificate used for issuing an initial certificate may be referred to as a root of certificate, a top certificate, a root CI, a root CI certificate, a root CA, or a root CA certificate.

In describing the disclosure, when it is determined that a detailed description of a related known function or configuration may unnecessarily obscure the subject matter of the disclosure, a detailed description thereof will be omitted.

Hereinafter, various embodiments of a method and device for moving and installing a bundle between terminals will be described.

FIG. 1 is a conceptual diagram illustrating an SSP according to an embodiment of the disclosure.

According to various embodiments, as in an example of FIG. 1, a terminal 110 may include an SSP 120. For example, the SSP 120 may be embedded in an SoC 130 of the terminal 110. In this case, the SoC 130 may be a communication processor, an application processor, or a processor in which the two processors are integrated. For another example, the SSP 120 may be a removable type 122 in the form of an independent chip without being integrated into the SoC, or may be an embedded type 124 pre-embedded in the terminal 110.

According to various embodiments, the SSP 120 included in the terminal may include at least one of one or more telecom bundles, one or more payment bundles, or one or more electronic ID bundles. For example, as illustrated in FIG. 1, when a plurality of telecom bundles 140 and 150 are included in the SSP 120, by enabling the plurality of telecom bundles 140 and 150 to operate simultaneously or in time division according to a configuration, the terminal 110 may use a mobile communication network. Further, when a payment bundle 170 and an electronic ID bundle 180 are included in the SSP 120, the terminal 110 may use online payment through an terminal app or offline payment through an external credit card point of sale (PoS) device using the payment bundle 170, and verify the identity of a terminal owner using the electronic ID bundle 180.

Figure 2:
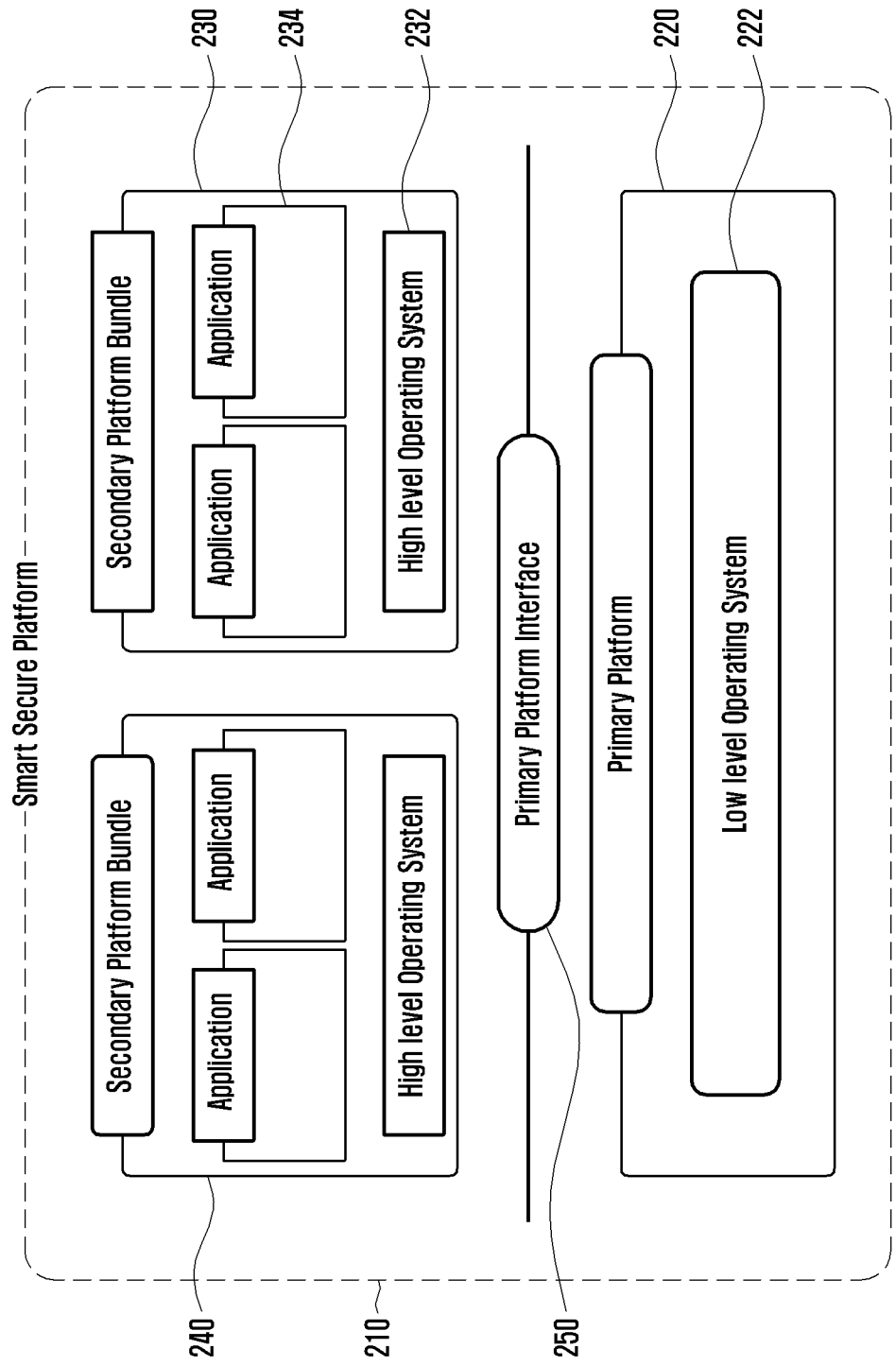
FIG. 2 is a conceptual diagram illustrating an internal structure of an SSP according to an embodiment of the disclosure.

FIG. 2 is a conceptual diagram illustrating an internal structure of a smart secure platform (SSP) according to an embodiment of the disclosure.

According to various embodiments, as in an example of FIG. 2, an SSP 210 may include one primary platform (PP) 220 and at least one secondary platform bundle (SPB) 230 and 240 operating thereon.

According to various embodiments, the primary platform 220 may include hardware (not disclosed) and at least one low level operating system (LLOS) 222.

According to various embodiments, the secondary platform bundle 230 may include a high-level operating system (HLOS) 232 and at least one application 234 operating thereon.

According to various embodiments, each of the secondary platform bundles 230 and 240 may access resources such as a central processer and a memory of the primary platform 220 using a primary platform interface (PPI) 250, thereby being driven in the SSP 210.

Figure 3:
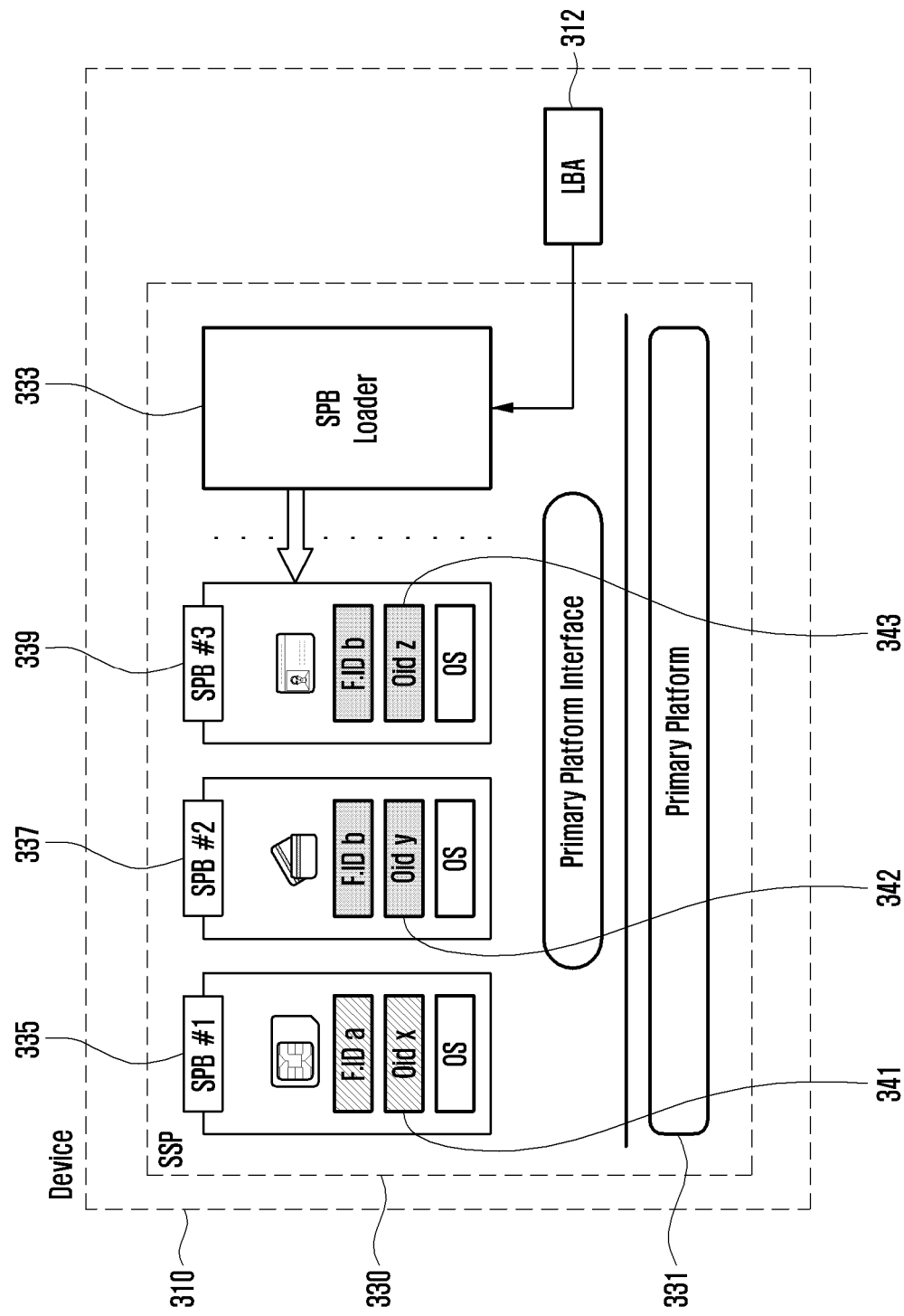
FIG. 3 is a diagram illustrating an example of components in a terminal used for the terminal to download and install a bundle to an SSP according to an embodiment of the disclosure.

FIG. 3 is a diagram illustrating an example of a terminal internal component for enabling a terminal to download a bundle to an SSP and to install a bundle in an SSP according to an embodiment of the disclosure.

According to various embodiments, as in an example of FIG. 3, a terminal 310 may include an SSP 330 and/or an LBA 312 for controlling the SSP 330. For example, the terminal 310 may be a terminal in which the SSP 330 is mounted and the LBA 312 for controlling the SSP 330 is installed. For example, the SSP 330 may be embedded in the terminal 310 or may be removable from the terminal 310.

According to various embodiments, the SSP 330 may include at least one of a primary platform 331, a secondary platform bundle loader (SPBL) 333, or one or more secondary platform bundles 335, 337, or 339.

According to various embodiments, the secondary platform bundle 335, 337, or 339 may be not installed inside the SSP 330 at the time of release of the terminal, but may be downloaded and installed remotely after release.

According to various embodiments, as in an example of FIG. 3, each bundle may have a different bundle family identifier and/or bundle family manager identifier 341, 342, or 343. These bundle family identifiers and bundle family manager identifiers may be used as information necessary for downloading and installing bundles. That is, the SSP 330 or the SPBL 333 may allow or deny the download and installation of a specific bundle according to the bundle family identifier and the bundle family manager identifier.

Figure 4:
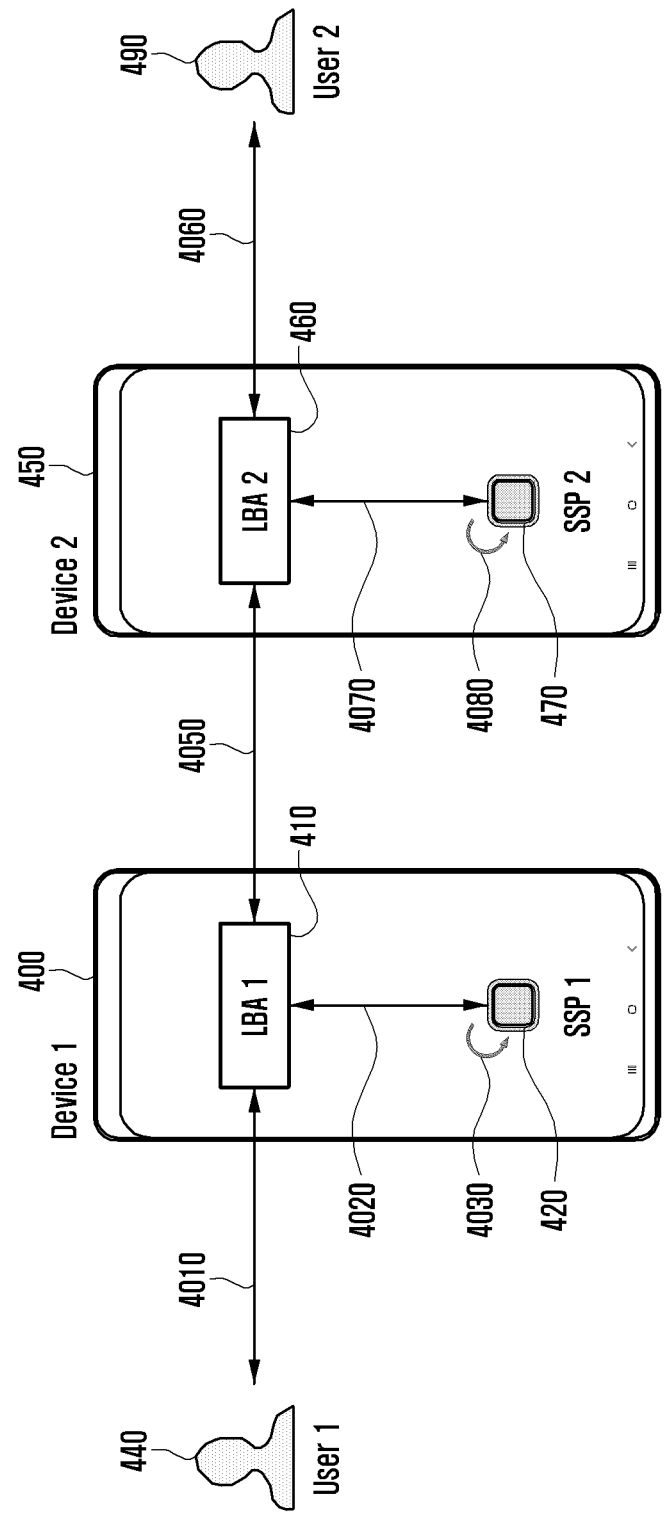
FIG. 4 is a diagram illustrating an example of a method in which two terminals mutually operate in order to transmit a bundle between two terminals according to an embodiment of the disclosure.

FIG. 4 is a diagram illustrating an example of a method in which two terminals mutually operate in order to transmit a bundle between two terminals according to an embodiment of the disclosure.

According to various embodiments, the terminal may include at least one LBA and at least one SSP. For example, as in an example of FIG. 4, a first terminal 400 may include an LBA 410 and an SSP 420, and a second terminal 450 may include an LBA 460 and an SSP 470.

According to various embodiments, a user may transmit a command to the terminal or may receive information in which the user should receive from the terminal. For example, as in operations 4010 and 4060, a first user 440 and a second user 490 may send commands to the LBAs 410 and 460 of the first terminal 400 and the second terminal 450 or may receive information in which the user should receive from the LBAs 410 and 460.

According to various embodiments, the above operation may include a process in which the user selects a bundle to be transmitted. Further, the above operation may further include a process of identifying information of a bundle to be transmitted by the user. Further, the above operation may further include operation of approving whether to transmit a bundle to be transmitted by the user. Further, the above operation may further include operation of approving whether to transmit a bundle to be received by the user.

Further, according to various embodiments, the above operation may include a process in which the user selects a bundle in order to re-use a suspended bundle. Further, the above operation may further include a process of identifying information on a bundle in which the user has received a request to resume use. Further, the above operation may further include operation of approving a bundle to be used again by the user. Further, the above operation may further include an operation in which the user approves resumption of use of a bundle in which a use resumption request has been received.

The operations of selection and approval described above may not all be operated as independent operations, and one or more operations may be selected and operated independently of each other.

Further, in operations 4020 and 4070, the LBAs 410 and 460 may give a command to the SSPs 420 and 470 or may transmit and receive data to and from the SSPs 420 and 470.

According to an example, in the above operation, the LBA may receive the user's command and transfer the command to the SSP. In the above operation, when the LBA receives the user's command and transfers the command to the SSP, the LBA may receive the result transferred by the SSP as a result.

According to another example, in the above operation, the LBA may transfer a command or data received from another terminal or an external server to the SSP. In the above operation, when the LBA transfers a command or data received from another terminal or an external server to the SSP, the LBA may receive the result transferred by the SSP as a result.

According to various embodiments, in the above operation, the LBA may define a new command and data based on a user's command or a command or data received from another terminal or an external server, and transfer it to the SSP. In the above operation, when the LBA defines a new command and data based on the user's command or a command or data received from another terminal or an external server and transfers it to the SSP, the LBA may receive the result transferred by the SSP as a result.

According to various embodiments, in the above operation, the LBA and the SSP may transmit and receive data to and from each other and install a bundle.

According to various embodiments, in operation 4050, the two LBAs 410 and 460 may be connected to each other to give a command to the counterpart or transmit and receive data to and from the counterpart. In this case, the connection in operation 4050 may be a direct device-to-device connection between the terminals, and although not illustrated, it may be an indirect connection between devices in which an external entity (e.g., external server) is connected between the two LBAs 410 and 460.

A more detailed description of the above-described connection method between the two LBAs refers to the following drawings.

According to various embodiments, in operations 4030 and 4080, the SSPs 420 and 470 may generate, process, or verify necessary data within the SSP.

According to various embodiments, in the above operation, the SSP may identify a bundle transfer configuration. Further, in the above operation, the SSP may generate and utilize a bundle transfer code. The above-described bundle transfer configuration related operation and bundle transfer code related operation are independent functions, and both functions may not be executed, either one of the two functions may be executed, or both functions may be executed. Even when both functions are executed, the two functions may be performed as completely independent functions.

According to various embodiments, in the above operation, the SSP may generate SSP information thereof or verify SSP information received from the counterpart terminal and/or the server. Further, in the above operation, the SSP may generate authentication data capable of verifying itself or may verify authentication data received from the counterpart terminal.

According to various embodiments, in the above operation, the SSP may generate an "attestation" to be described with reference to FIG. 5 and verify a received "attestation". Examples of various "attestations" that the SSP may generate/verify refer to FIGS. 10 to 15 and 22 to 27 to be described later.

According to various embodiments, in the above operation, the SSP may configure a state of the bundle. States and configuration conditions of various bundles that may be configured by the SSP refer to FIGS. 10 to 15 and 22 to 27 to be described later.

According to various embodiments, in the above operation, the SSP may generate a bundle.

Figure 5:
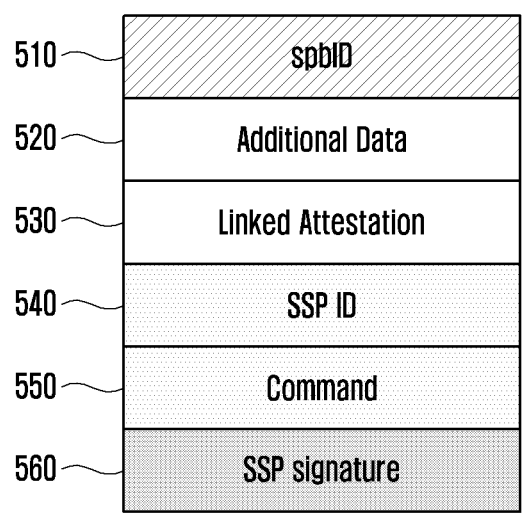
FIG. 5 is a diagram illustrating a configuration of "Attestation" according to some embodiments of the disclosure.

FIG. 5 is a diagram illustrating a configuration of "attestation" according to some embodiments of the disclosure.

According to various embodiments, the attestation may optionally include a "bundle delimiter" (510). For example, the attestation may optionally include a bundle identifier (SPB ID), which is one of bundle delimiters, as illustrated in FIG. 5.

According to various embodiments, the attestation may optionally further include another attestation (530). Various examples of another attestation included in the attestation refer to a description of FIGS. 10-15 to be described later.

According to various embodiments, the attestation may optionally further include an "SSP identifier (SSP ID)" (540).

According to various embodiments, the attestation may optionally further include information on an operation performed by the SSP (550). Various examples of operations performed by the SSP refer to a description of FIGS. 10 to 15 to be described later.

According to various embodiments, the attestation may optionally further include data other than the above-described information 530, 540, and 550 (520), if necessary. Various examples of other data that may be included in the attestation refer to a description of FIGS. 10-15 to be described later.

According to various embodiments, the attestation may include digital signature data for the above-described information (560). The signature data may be an electronic signature generated by a signing certificate of the SSP.

Figure 6:
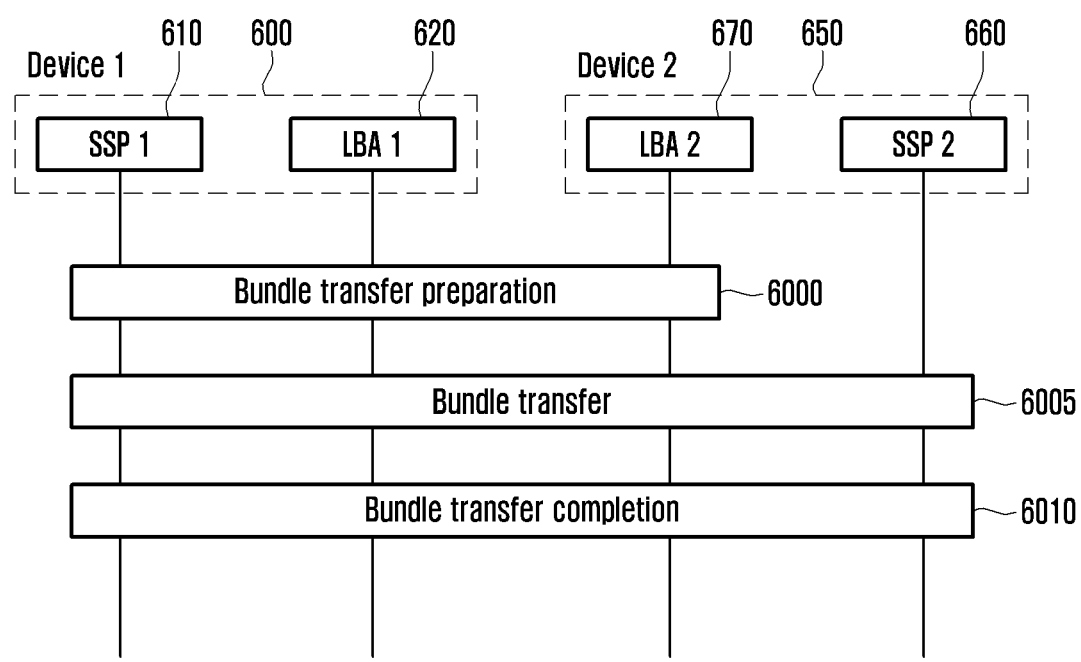
FIG. 6 is a diagram conceptually illustrating a procedure for transmitting a bundle from one terminal to another terminal according to an embodiment of the disclosure.

FIG. 6 is a diagram conceptually illustrating a procedure for transmitting a bundle from one terminal to another terminal according to an embodiment of the disclosure.

According to various embodiments, the terminal may include at least one LBA and at least one SSP. For example, as in an example of FIG. 6, a first terminal 600 may include a first LBA 620 and a first SSP 610, and a second terminal 650 may include a second LBA 670 and a second SSP 660. For example, the first terminal 600 may be a terminal in which the first SSP 610 is mounted and in which the first LBA 620 for controlling the first SSP 610 is installed, and the second terminal 650 may be a terminal in which the second SSP 660 is mounted and in which the second LBA 670 for controlling the second SSP 660 is installed.

With reference to FIG. 6, in step 6000, the first SSP 610 and the first LBA 620 of the first terminal 600, and the second LBA 670 of the second terminal 650 may perform a preparation procedure necessary for bundle transmission (bundle transmission preparation procedure). A more detailed description of the procedure refers to a detailed description of FIG. 7 to be described later.

With reference to FIG. 6, in step 6005, a procedure (bundle transmission procedure) in which a bundle is transmitted from the first terminal 600 to the second terminal 650 may be performed. A more detailed description of the procedure refers to a detailed description of FIG. 8 to be described later.

With reference to FIG. 6, in step 6010, the first terminal 600 and the second terminal 660 may perform an installation procedure of the transmitted bundle and a procedure (bundle transmission completion procedure) of configuring a state of the bundle. A detailed description of the procedure refers to a detailed description of FIGS. 9 to 12 to be described later.

Figure 7:
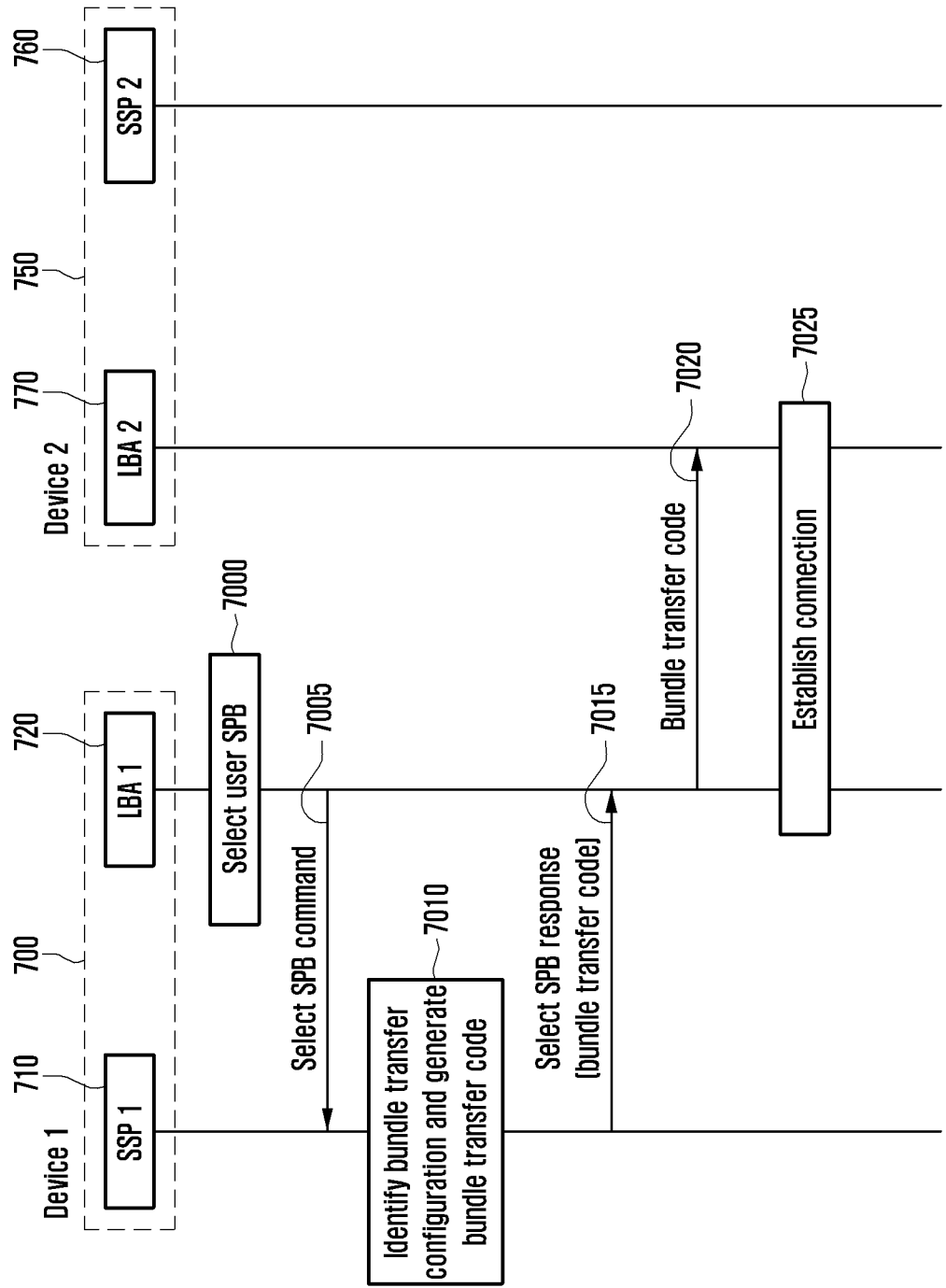
FIG. 7 is a diagram illustrating a detailed procedure of a procedure for preparing for bundle transmission among procedures presented in FIG. 6.

FIG. 7 is a diagram illustrating a detailed procedure of a procedure for preparing for bundle transmission among the procedures presented in FIG. 6. More specifically, FIG. 7 is a diagram exemplarily illustrating a procedure in which one terminal undergoes a preparation process necessary for transmitting a bundle to another terminal according to an embodiment of the disclosure. In this specification, the procedure of FIG. 7 may be referred to as a bundle transmission preparation procedure.

According to various embodiments, the terminal may include at least one LBA and at least one SSP. For example, as in an example of FIG. 7, a first terminal 700 may include a first LBA 720 and a first SSP 710, and a second terminal 750 may include a second LBA 770 and a second SSP 760. For example, the first terminal 700 may be a terminal in which the first SSP 710 is mounted and in which the first LBA 720 for controlling the first SSP 710 is installed, and the second terminal 750 may be a terminal in which the second SSP 760 is mounted and in which the second LBA 770 for controlling the second SSP 760 is installed.

According to various embodiments, the first terminal 700 may have a pre-installed bundle, and further have metadata associated with the bundle.

According to various embodiments, the first terminal 700 may be associated with a corresponding bundle to have at least one of a bundle identifier (SPB ID), a bundle family identifier (SPB Family ID), or a bundle family manager identifier (SPB Family Custodian Object ID).

According to various embodiments, the first terminal 700 may have a "bundle transfer configuration" in association with a corresponding bundle. The bundle transfer configuration may optionally include information related to whether the bundle may be transmitted between devices. Further, the bundle transfer configuration may optionally further include information on whether the bundle may be used repeatedly in a plurality of terminals. For example, when the bundle is "prohibited from being used simultaneously repeatedly in a plurality of terminals", that is, when "the bundle should be used only in one terminal at any one time", the bundle transfer configuration may include information on this.

With reference to FIG. 7, in step 7000, information on a bundle to be transmitted between devices may be transferred to the first LBA 720. The transfer process, for example, as illustrated in FIG. 7, may be made through a process in which the user directly selects a bundle through a UI provided by the first terminal 700 or may be input from a remote server to the first LBA 720 through a push input, or the first LBA 720 may access the remote server to read the corresponding information.

With reference to FIG. 7, in step 7005, information related to the bundle selected through step 7000 may be transferred from the first LBA 720 to the first SSP 710. For example, as illustrated in FIG. 7, information related to the selected bundle may be transferred from the first LBA 720 to the first SSP 710 through a select SPB command. In this case, the information transferred from the first LBA 720 to the first SSP 710 may include information for identifying the bundle selected in step 7000.

With reference to FIG. 7, in step 7010, the first SSP 710 may identify whether a bundle requested to be transmitted may be transmitted between devices. The process may be performed by identifying a bundle in which transmission is requested based on the information received in step 7005 and identifying a "bundle transfer configuration" associated with the bundle. In this process, when the "bundle transfer configuration" includes "information on whether the bundle may be used repeatedly in a plurality of terminals", the first SSP 710 may identify this fact.

Further, in step 7010, the first SSP 710 may selectively configure a "bundle transfer code". The "bundle transfer code" is a code used for referring to the bundle in the process of transmitting the bundle between devices, and should be a value that can identify the bundle. The first SSP 710 may bind the above-described "bundle transfer code" and information of a bundle to be transmitted.

With reference to FIG. 7, in step 7015, a response result to step 7005 may be transmitted from the first SSP 710 to the first LBA 720. For example, as illustrated in FIG. 7, a response to a select SPB command may be transferred from the first SPB 710 to the first LBA 720 through a select SPB response. A response value may include a "bundle transfer code" described in step 7010.

With reference to FIG. 7, in step 7020, information necessary for bundle transmission between devices may be transferred from the first LBA 720 of the first terminal 700 to the second LBA 770 of the second terminal 750. In this case, information transferred from the first LBA 720 to the second LBA 770 may include a "bundle transfer code". Further, information transferred from the first LBA 820 to the second LBA 870 may optionally further include information necessary for a connection to be established between the first LBA 720 and the second LBA 770 in future step 7025. Further, information transferred from the first LBA 720 to the second LBA 770 may optionally further include information indicating that a bundle transfer between devices is to be performed.

Information transferred from the first LBA 720 to the second LBA 770 through the above-described step 7020 may be transferred in various ways. For example, the first LBA 720 may provide information to be transferred to the second LBA 770 to the user through an UI of the first terminal 700, and the user may input the received information to the second LBA 770 using an UI of the second terminal 750. Alternatively, the first LBA 720 may make information to be transmitted to the second LBA 770 in the form of an image (e.g., QR code) to display the image on a screen of the first terminal 700, and the user may scan the image using the second terminal 750 to transfer information to the second LBA 770. However, a method of transferring information from the first LBA 720 to the second LBA 770 is not limited to the above methods.

With reference to FIG. 7, in step 7025, a connection may be established (or configured) between the first LBA 720 and the second LBA 770. When information necessary for connection is transmitted in step 7020, the first LBA 720 and the second LBA 770 may establish a connection using the information. The connection between the first LBA 820 and the second LBA 870 may be a direct device-to-device connection (e.g., NFC, Bluetooth, UWB, WiFi-Direct, LTE device-to-device (D2D), 5G D2D) or may be a remote connection in which a remote server (e.g., relay server) is positioned between the first LBA 720 and the second LBA 770.

With reference to FIG. 7, although step 7025 is illustrated as the last step, this step is independent of the above-described other steps, i.e., steps 7000, 7005, 7010, 7015, and 7020, and may be performed regardless of the order of other steps. For example, step 7025 may be performed between steps 7015 and 7020, and in this case, the information transmitted from the first LBA 720 to the second LBA 770 in step 7020 may be transmitted through the connection established in step 7025.

Figure 8:
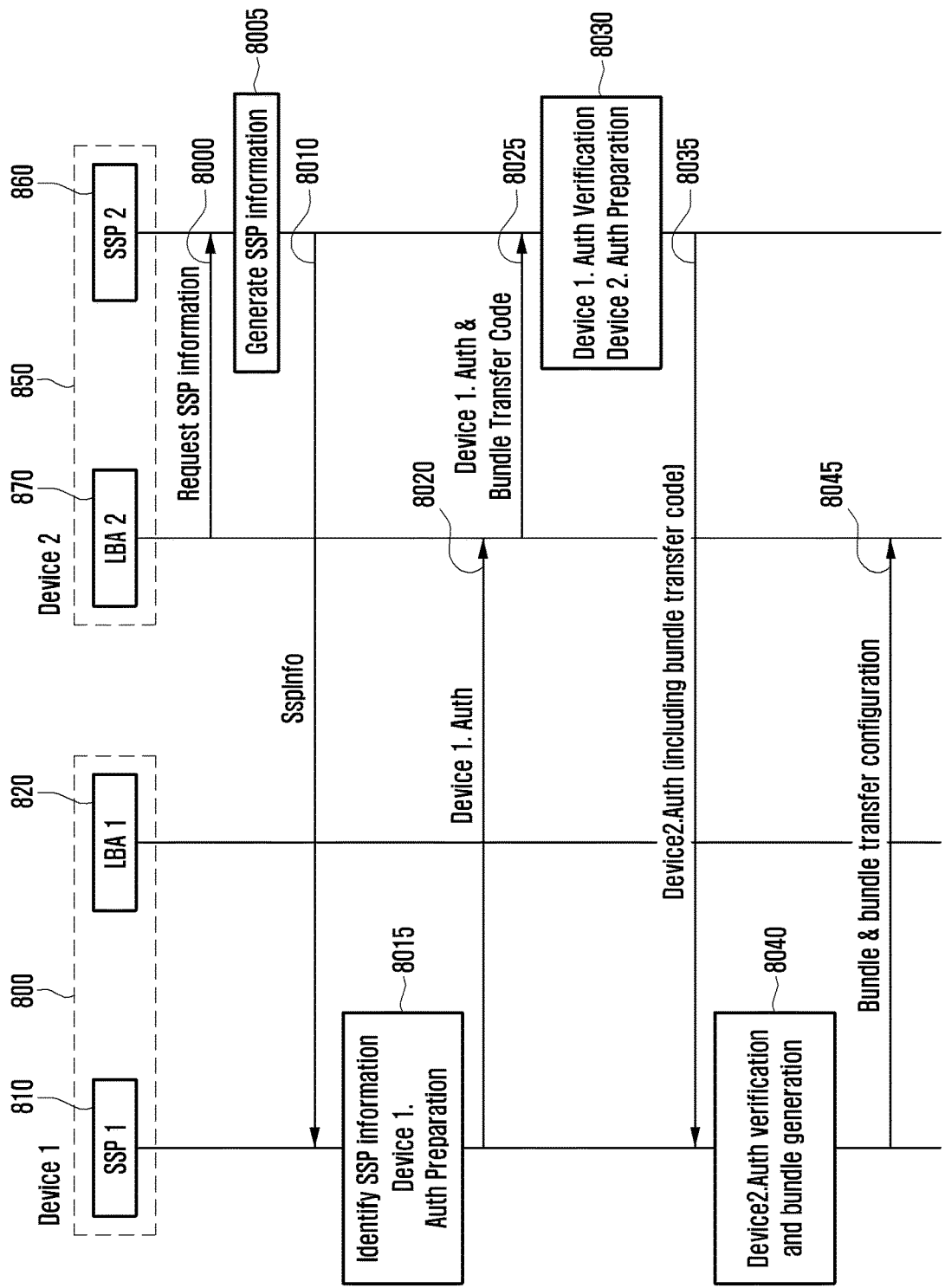
FIG. 8 is a diagram illustrating a detailed procedure of a procedure in which a bundle is transmitted among procedures presented in FIG. 6.

FIG. 8 is a diagram illustrating a detailed procedure of a procedure in which a bundle is transmitted among procedures presented in FIG. 6. More specifically, FIG. 8 is a diagram exemplarily illustrating a procedure in which one terminal transmits a bundle to another terminal according to an embodiment of the disclosure. In the disclosure, the procedure of FIG. 8 may be referred to as a bundle transmission procedure.

According to various embodiments, the terminal may include at least one LBA and at least one SSP. For example, as in an example of FIG. 8, a first terminal 800 may include a first LBA 820 and a first SSP 810, and a second terminal 850 may include a second LBA 870 and a second SSP 860. For example, the first terminal 800 may be a terminal in which the first SSP 810 is mounted and in which the first LBA 820 for controlling the first SSP 810 is installed, and the second terminal 850 may be a terminal in which the second SSP 860 is mounted and in which the second LBA 870 for controlling the second SSP 860 is installed.

With reference to FIG. 8, in step 8000, the second LBA 870 may request "SSP information (SspInfo)" to the second SSP 860. When the second LBA 870 requests "SspInfo" to the second SSP 860 in step 8000, the second LBA 870 may notify the second SSP 860 that a bundle movement between devices will be performed.

Further, step 8000 may be automatically performed immediately following the process illustrated in FIG. 8 or may be performed after receiving an external input. In this case, the "external input" may be made through a process in which the user directly selects a bundle to receive through an UI provided by the second terminal 850 or may be input from a remote server to the second LBA 870 through a push input, or the second LBA 870 may access the remote server to read the corresponding information.

With reference to FIG. 8, in step 8005, the second SSP 860 may generate "SspInfo" thereof. "SspInfo" may include information on the second SSP to be provided for bundle transmission. In this case, "SspInfo" may include information (certificate negotiation information) for a certificate negotiation process in which the second SSP 860 should undergo before receiving the bundle. The "certificate negotiation information" may include certificate information (SenderSpblVerification) that the second SSP 860 may use for verifying another SSP and certificate information (ReceiverSpblVerification) that may be used by the another SSP to verify itself. Further, the "certificate negotiation information" may optionally further include a list of key agreement algorithms supported by the second SSP 860, and optionally further include a list of encryption algorithms supported by the second SSP 860. Further, "SspInfo" may optionally further include SSP version information including at least one of version information of a standard specification supported by a loader and a primary platform included in the second SSP 960.

With reference to FIG. 8, in step 8010, the second SSP 860 may transfer the "SspInfo" generated in step 8005 to the first SSP 810 via the second LBA 870 and the first LBA 820.

According to steps 8000 to 8010 described above, the second LBA 870 may request "SspInfo" to the second SSP 860, and the second SSP 860 may generate "SspInfo" thereof and then transfer "SspInfo" to the first SSP 810 via the second LBA 870 and the first LBA 820. However, according to the embodiment, a process of transferring "SspInfo" from the second terminal 850 to the first terminal 800 may be as follows. For example, after the second LBA 870 generates "SspInfo" by itself, the second LBA may transfer "SspInfo" to the first SSP 810 via the first LBA 820.

With reference to FIG. 8, in step 8015, the first SSP 810 may identify the received "SspInfo" and generate "first terminal authentication information (Device1.Auth)" capable of authenticating itself based on the information. A more detailed procedure for this process is as follows.

The first SSP 810 may identify certificate information capable of verifying itself using the received "SenderSpblVerification" and select at least one key agreement certificate (ssp1.Cert.KA). Alternatively, the first SSP 810 may generate a public key "ssp1.ePK.KA" and a private key "ssp1.eSK.KA" as an asymmetric encryption key pair to be used for key agreement using the received "list of key agreement algorithms supported by the second SSP 860" and then select the public key (ssp1.ePK.KA) among the key pair. Further, the first SSP 810 may identify certificate information capable of verifying itself using the received "SenderSpblVerification" and further select at least one signing certificate (ssp1.Cert.DS).

Further, the first SSP 810 may select at least one certificate information of the second SSP 860 to perform verification using the received "ReceiverSpblVerification" and then configure the corresponding information to "CiPkIdToBeUsed".

Further, the first SSP 810 may select at least one encryption algorithm to be used in the future using the received "list of encryption algorithms supported by the second SSP 860" and then configure the corresponding information to "CryptoToBeUsed".

Further, the first SSP 810 may identify the received list of "version information of the standard specification supported by the loader and the primary platform included in the second SSP 860", and identify whether there is a version of the standard specification supported by itself among the list.

"First terminal authentication information (Device1.Auth)" may include at least one of "ssp1.Cert.KA", "ssp1.ePK.KA", "CiPkIdToBeUsed", or "CryptoToBeUsed" described above. Further, the "first terminal authentication information (Device1.Auth)" may optionally further include "ssp1.Cert.DS" described above. Further, the "first terminal authentication information (Device1.Auth)" may optionally further include at least one of a bundle family identifier (SPB Family ID) or a bundle family manager identifier (SPB Family Custodian Object ID) associated with a bundle to be transmitted in the future.

In this case, part or all of the above-mentioned "first terminal authentication information (Device1.Auth)" may be a digital signature capable of verifying using ssp1.Cert.DS so as to ensure the integrity of the information, and digital signature data may be added as part of "first terminal authentication information".

With reference to FIG. 8, in step 8020, the first SSP 810 may transfer the "first terminal authentication information (Device1.Auth)" generated in step 8015 to the second LBA 870 via the first LBA 820.

With reference to FIG. 8, in step 8025, the second LBA 870 may transfer "first terminal authentication information (Device1.Auth)" to the second SSP 860. Further, the second LBA 870 may further transfer a "bundle transfer code" to the second SSP 860.

With reference to FIG. 8, in step 8030, the second SSP 860 may verify the received "first terminal authentication information (Device1.Auth)". When the second SSP 860 receives "ssp1.Cert.KA", the second SSP 860 may identify a signature of the corresponding certificate to identify the validity of the certificate. Further, when the second SSP 860 receives "ssp1.ePK.KA" and a digital signature thereof, the second SSP 860 may first check the validity of ssp1.Cert.DS and then identify a digital signature using the certificate, thereby identifying the integrity of the received public key ssp1.ePK.KA. Further, the second SSP 860 may identify the received "CiPkIdToBeUsed" and select at least one signing certificate (ssp2.Cert.DS) capable of verifying itself.

Further, although not illustrated in the drawing, in step 8030, the second SSP 960 may generate a public key "ssp2.ePK.KA" and a private key "ssp2.eSK.KA" as a key pair for asymmetric encryption to be used for key agreement and then select the public key (ssp2.ePK.KA) among the key pair. Further, the second SSP 860 may select one of ssp1.ePK.KA or the public key for key agreement included in ssp1.Cert.KA, and then generate a session key ShKey01 to be used for encryption while communicating with the first terminal in the future using the value and ssp2.eSK.KA. ShKey01 should be a session key for encryption algorithm included in the received "CryptoToBeUsed".

Further, in step 8030, the second SSP 860 may generate "second terminal authentication information (Device2.Auth)" capable of authenticating itself. In this case, "second terminal authentication information (Device2.Auth)" may include "ssp2.Cert.DS". Further, the "second terminal authentication information (Device2.Auth)" may further include "ssp2.ePK.KA". Further, the "second terminal authentication information (Device2.Auth)" may further include a transaction ID indicating a current session generated by the second SSP 860. Further, the "second terminal authentication information (Device2.Auth)" may further include a "bundle transfer code". Further, the "second terminal authentication information (Device2.Auth)" may further include an SSP identifier of the second SSP 960. Further, the "second terminal authentication information (Device2.Auth)" may optionally further include at least one of a bundle family identifier (SPB Family ID) or a bundle family manager identifier (SPB Family Custodian Object ID) associated with a bundle to be transmitted in the future.

In this case, part or all of the above-mentioned "second terminal authentication information (Device2.Auth)" may be a digital signature capable of being verified using ssp2.Cert.DS so as to ensure the integrity of the information, and digital signature data may be added as part of "second terminal authentication information". Further, part or all of "second terminal authentication information (Device2.Auth)" may be encrypted using the previously generated session key ShKey01.

With reference to FIG. 8, in step 8035, the second SSP 860 may transfer"second terminal authentication information (Device2.Auth)" generated in step 8030 to the first SSP 810 via the second LBA 870 and the first LBA 820. In this case, a "bundle transfer code" may be optionally further transmitted.

With reference to FIG. 8, in step 8040, the first SSP 810 may verify the received "second terminal authentication information (Device2.Auth)". The first SSP 810 may verify a signature of the received "ssp2.Cert.DS" to verify the validity of the corresponding certificate. Further, the first SSP 810 may check whether the received bundle family identifier (SPB Family ID) and/or bundle family manager identifier (SPB Family Custodian Object ID) are/is a correctly configured value in association with a bundle to be transmitted by itself. Further, the first SSP 810 may store the received transaction ID and/or the SSP identifier of the second SSP 860. Further, the first SSP 810 may bind the received transaction ID or the SSP identifier of the second SSP 960 with a session currently in progress or a bundle to be transmitted.

In this process, when encrypted data is included in "second terminal authentication information (Device2.Auth)", the first SSP 810 may generate a session key ShKey01 using ssp1.eSK.KA or the private key corresponding to the public key for key agreement included in ssp1.Cert.KA thereof and the received ssp2.ePK.KA, decrypt encrypted data using the session key, and then perform a verification process. Further, in this process, when a digital signature is included in the "second terminal authentication information (Device2. Auth)", the first SSP 810 may verify the validity of the received digital signature using "ssp2.Cert.DS".

Further, in step 8040, although not illustrated in FIG. 8, the first SSP 810 may generate a public key "ssp1.bundle.ePK.KA" and a private key "ssp1.bundle.eSK.KA" as a key pair for asymmetric encryption to be used for key agreement. In this case, the key pair "ssp1.bundle.ePK.KA and ssp1.bundle.eSK.KA" may be configured to the same value as the previously generated "ssp1.ePK.KA and ssp1.eSK.KA". Alternatively, the key pair "ssp1.bundle.ePK.KA and ssp1.bundle.eSK.KA" may be configured to the same value as that of a "public key included in the previously used ssp1.Cert.KA and the corresponding private key". Further, the first SSP 810 may generate a session key ShKey02 using ssp1.bundle.eSK.KA and ssp2.ePK.KA. When a "private key corresponding to the public key included in ssp1.Cert.Ka" or ssp1.eSK.KA for ssp1.bundle.eSK.KA was reused, a value of the session key ShKey02 may be also configured to the value of the previously generated ShKey01.

Further, in step 8040, the first SSP 810 may configure a bundle to be transmitted to the second terminal 850 and/or metadata associated with the bundle. In this case, the first SSP 810 may identify a bundle to be transmitted by itself using the received "bundle transfer code". Further, the bundle to be configured may include "ssp1.Cert.DS". Further, the bundle to be configured may further include "ssp1.bundle.ePK.KA". Further, the bundle to be configured may further include a transaction ID for identifying a corresponding session. Further, the bundle to be configured may optionally further include at least one of a bundle identifier (SPB ID), a bundle family identifier (SPB Family ID), or a bundle family manager identifier (SPB Family Custodian Object ID) associated with the bundle to be transmitted. According to various embodiments, a "bundle transfer configuration" may be included in the bundle (or metadata associated with the bundle) configured in step 8040.

According to various embodiments, digital signature data generated using ssp1.Cert.DS may be added to a bundle to be configured in step 8040. That is, digital signature data generated for some or all of the components of the bundle specified above may be added as a part of the bundle. Further, some or all of the bundles to be configured may be encrypted using ShKey02.

With reference to FIG. 8, in step 8045, the first SSP 810 may transfer the bundle generated (configured) in step 8040 to the second LBA 870 via the first LBA 820. In this case, metadata associated with the transmitted bundle may be selectively further transmitted. Further, a "bundle transfer configuration" associated with the transmitted bundle may be further transmitted. For example, the "bundle transfer configuration" may be transmitted in a separate format (e.g., message) without being included in the bundle or metadata.

Figure 9:
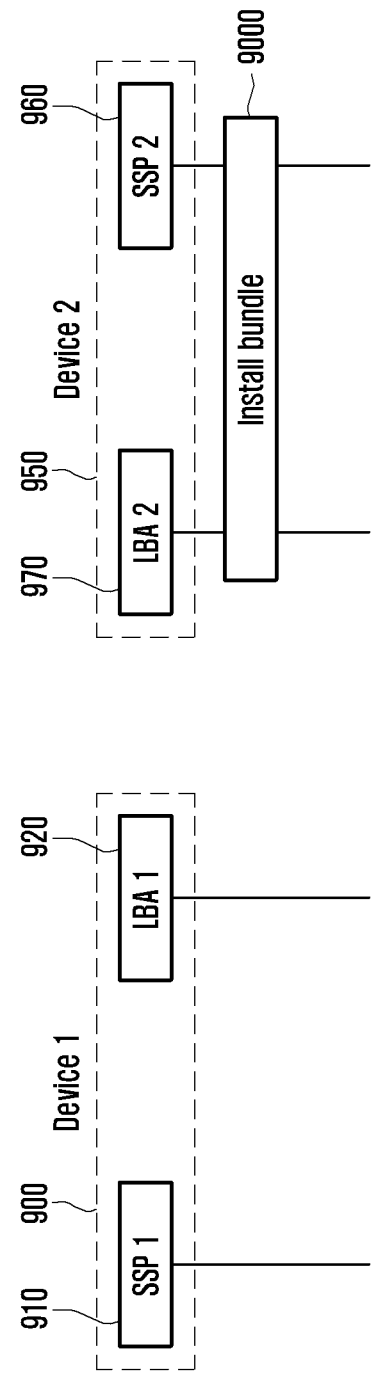
FIG. 9 is a diagram illustrating a detailed procedure of a procedure in which transmission of a bundle is completed among procedures presented in FIG. 6.

FIG. 9 is a diagram illustrating a detailed procedure of a procedure in which transmission of a bundle is completed among procedures presented in FIG. 6. More specifically, FIG. 9 illustrates one possible example of a diagram illustrating a process in which a bundle is installed in a terminal and a procedure in which a bundle state is configured after the bundle is transmitted according to an embodiment of the disclosure.

According to various embodiments, the terminal may include at least one LBA and at least one SSP. For example, as in an example of FIG. 9, a first terminal 900 may include a first LBA 920 and a first SSP 910, and a second terminal 950 may include a second LBA 970 and a second SSP 960. For example, the first terminal 900 may be a terminal in which the first SSP 910 is mounted and in which the first LBA 920 for controlling the first SSP 910 is installed, and the second terminal 950 may be a terminal in which the second SSP 960 is mounted and in which the second LBA 970 for controlling the second SSP 960 is installed.

1. Install the Bundle

With reference to FIG. 9, in step 9000, the second LBA 970 and the second SSP 960 may cooperate with each other to install a bundle in the second terminal 950. In this process, the following procedures may be performed together. When metadata is transmitted, the second LBA 970 or the second SSP 960 may verify the content included in the metadata. When a "bundle transfer configuration" is transmitted, the second LBA 970 may transfer the information to the second SSP 960. When a transaction ID is transmitted, the second LBA 970 or the second SSP 960 may check whether the transaction ID is the same as the transaction ID used in the current session. When at least one of a bundle identifier (SPB ID), a bundle family identifier (SPB Family ID), or a bundle family manager identifier (SPB Family Custodian Object ID) is transmitted, the second LBA 970 or the second SSP 960 may identify whether the information matches information of a bundle to be currently received. When ssp1.Cert.DS is transmitted, the second SSP 960 may verify the validity of the certificate to authenticate the first SSP 910. When the received data includes encrypted data, the second SSP 960 may generate a session key ShKey02 using the received ssp1.bundle.ePK.KA and ssp2.eSK.KA thereof, decrypt the encrypted data using the session key, and then perform verification. When the received data includes a digital signature, the second SSP 960 may verify the ssp1.Cer.DS and then verify the validity of a digital signature using the certificate.

2. Identify Whether the Bundle may be Used Repeatedly

Further, although not illustrated in the drawing, the second LBA 970 and/or the second SSP 960 may selectively determine whether the bundle may be used repeatedly in a plurality of terminals. Some possible methods of making the determination are as follows. As one possible example, when the bundle transfer configuration includes information on whether the bundle may be used repeatedly in a plurality of terminals, the second LBA 970 and/or the second SSP 960 may identify the information to make a determination. As another possible example, the second LBA 970 and/or the second SSP 960 may identify whether the bundle may be used repeatedly in a plurality of terminals using the received bundle family identifier (SPB Family ID) and/or bundle family manager identifier (SPB Family Custodian Object ID). This process is part of step 9000 and may be performed regardless of the order of procedures performed in step 9000 or may be performed after step 9000.

3. Configure Bundle State

If the bundle may be used repeatedly in a plurality of terminals, a process of additionally configuring the bundle state may not be necessary. Alternatively, even when the second LBA 970 and/or the second SSP 960 do/does not determine whether the bundle may be used repeatedly, a process of additionally configuring the bundle state may not be necessary according to the implementation of the second LBA 970 and/or the second SSP 960.

Figure 10:
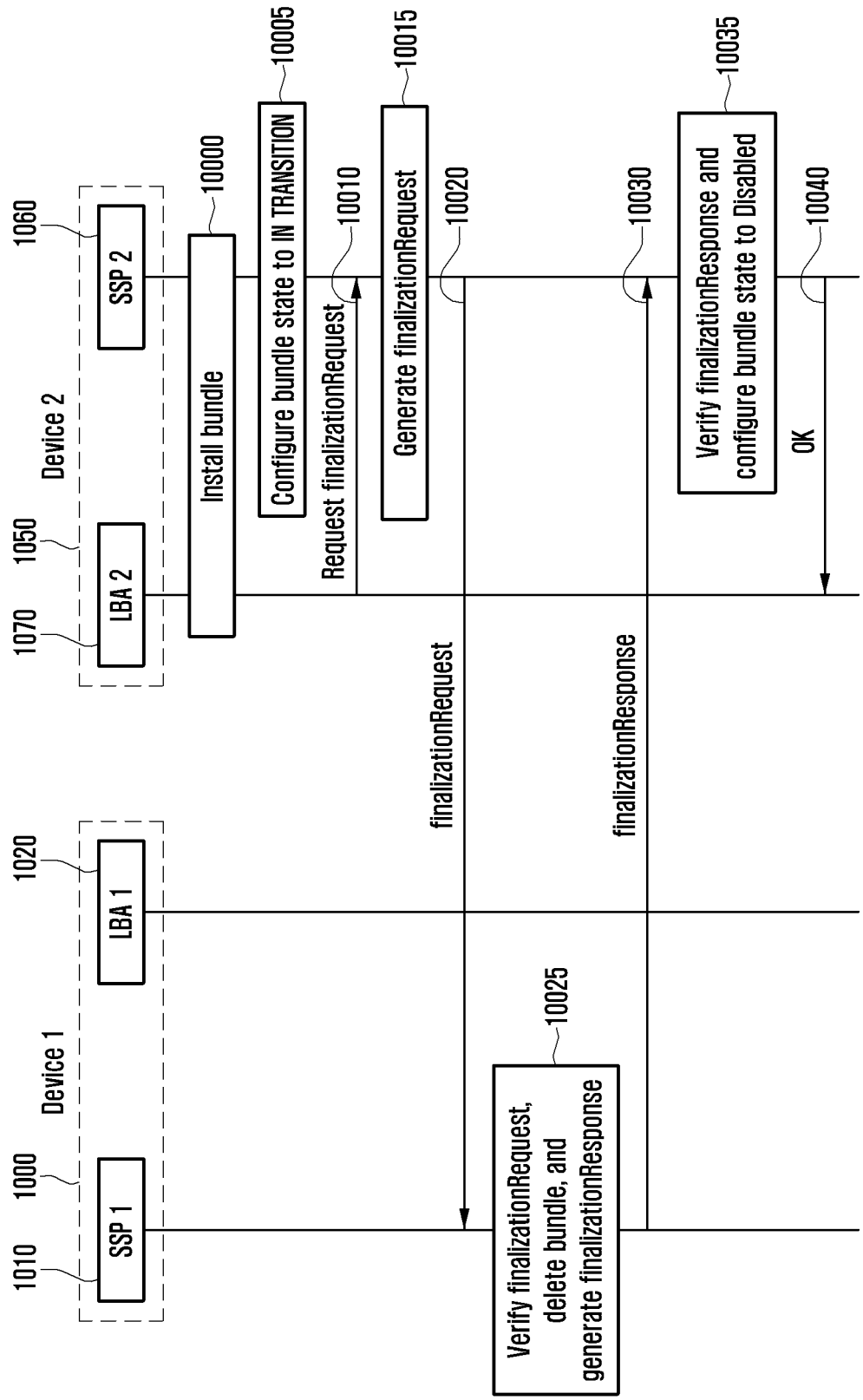
FIG. 10 is a diagram illustrating another detailed procedure of a procedure in which transmission of a bundle is completed among procedures presented in FIG. 6.

FIG. 10 is a diagram illustrating another detailed procedure of a procedure in which transmission of a bundle is completed among procedures presented in FIG. 6. More specifically, FIG. 10 is another example of a diagram illustrating a process in which a bundle is installed in a terminal and a procedure in which a bundle state is configured after the bundle is transmitted according to an embodiment of the disclosure.

According to various embodiments, the terminal may include at least one LBA and at least one SSP. For example, as in an example of FIG. 10, a first terminal 1000 may include a first LBA 1020 and a first SSP 1010, and a second terminal 1050 may include a second LBA 1070 and a second SSP 1060. For example, the first terminal 1000 may be a terminal in which the first SSP 1010 is mounted and in which the first LBA 1020 for controlling the first SSP 1010 is installed, and the second terminal 1050 may be a terminal in which the second SSP 1060 is mounted and in which the second LBA 1070 for controlling the second SSP 1060 is installed.

1. Install the Bundle

With reference to FIG. 10, in step 10000, the second LBA 1070 and the second SSP 1060 may cooperate with each other to install a bundle in the second terminal 1050. A detailed description thereof refers to the "bundle installation" process of FIG. 9.

2. Identify Whether the Bundle may be Used Repeatedly

Further, although not illustrated in the drawing, the second LBA 1070 and/or the second SSP 1060 may selectively determine whether the bundle may be used repeatedly in a plurality of terminals. A detailed description thereof refers to a process of "identifying whether the bundle may be used repeatedly" of FIG. 9.

3. Configure Bundle State

If the bundle may not be used repeatedly in a plurality of terminals, the bundle state is additionally configured as follows. Alternatively, even when the second LBA 1070 and/or the second SSP 1060 do/does not determine whether the bundle may be used repeatedly, a process of additionally configuring the bundle state may be performed according to the implementation of the second LBA 1070 and/or the second SSP 1060 as follows.

With reference to FIG. 10, in step 10005, the second SSP 1060 may configure the bundle state to "IN TRANSITION". "IN TRANSITION" means a state that the bundle has been successfully installed but is not yet available (also, a state that may be changed to an available state (disabled, enable, active state) only by an additional operation such as a "request from another terminal (e.g., a request made by transmitting a "finalizationResponse or recoveryRequest")

and/or a "request from an external server (although not described in the disclosure)").

With reference to FIG. 10, in step 10010, the second LBA 1070 may request an "attestation" to the second SSP 1060.

With reference to FIG. 10, in step 10015, the second SSP 1060 may generate an "attestation". In FIG. 10, the attestation may be referred to as a finalizationRequest. A structure of the attestation may follow the structure disclosed in FIG. 5.

In this case, one example of a possible attestation configuration is as follows.

The finalizationRequest may include a "bundle delimiter" of the bundle in 510.
The finalizationRequest may include an "SSP identifier" of the second SSP in 540.
The finalizationRequest may include information indicating that the second SSP has configured the bundle state to an "IN TRANSITION" state in 550.
The finalizationRequest may optionally include a time in which the second SSP changed the bundle state to an "IN TRANSITION" state or a time in which the attestation was generated in 520.
The finalizationRequest may include signature information of the second SSP in 560. The signature may be signature information obtained by digitally signing the above-described information with a signing certificate of the second SSP.

With reference to FIG. 10, in step 10020, the second SSP 1060 may transfer a finalizationRequest to the first SSP 1010. For example, the second SSP 1060 may transfer the finalizationRequest to the first SSP 1010 through the following process. That is, the second SSP 1060 may transfer the finalizationRequest to the second LBA 1070 in response to step 10010, and the second LBA may transfer the finalizationRequest to the first SSP through the first LBA 1020.

With reference to FIG. 10, in step 10025, the first SSP 1010 may verify the received finalizationRequest. The verification process may include step of checking the validity of the signature of the second SSP included in the finalizationRequest. Further, the verification process may further include a process of checking whether a "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to an "IN TRANSITION" state.

Further, in step 10025, the first SSP 1010 may delete the bundle after verification is completed.

Further, in step 10025, the first SSP 1010 may generate an "attestation". In FIG. 10, the attestation may be referred to as a finalizationResponse. A structure of the attestation may follow the structure disclosed in FIG. 5.

In this case, one example of a possible attestation configuration is as follows.

The finalizationResponse may include a "bundle delimiter" of the bundle in 510.
The finalizationResponse may include an "SSP identifier" of the first SSP in 540.
The finalizationResponse may include information indicating that the first SSP has deleted the bundle in 550.
The finalizationResponse may optionally include a time in which the first SSP deleted the bundle or a time in which the attestation was generated in 520.
The finalizationResponse may include signature information of the first SSP in 560. The signature may be signature information obtained by digitally signing the above-described information with a signing certificate of the first SSP.

Further, another example of a possible attestation configuration is as follows.

The finalizationResponse may include the received finalizationRequest in 530. In this case, some information of the received finalizationRequest may be omitted, as needed. For example, signature information of the second SSP included in the finalizationRequest may be omitted in some cases. Further, for example, time information included in the finalizationRequest may be omitted in some cases.
The finalizationResponse may include an "SSP identifier" of the first SSP in 540.
The finalizationResponse may include information indicating that the first SSP has deleted the bundle in 550.
The finalizationResponse may optionally include a time in which the first SSP deleted the bundle or a time in which the attestation was generated in 520.
The finalizationResponse may include signature information of the first SSP in 560. The signature may be signature information obtained by digitally signing the above-described information with a signing certificate of the first SSP.

With reference to FIG. 10, in step 10030, the first SSP 1010 may transfer a finalizationResponse to the second SSP 1060. For example, the first SSP 1010 may transfer a finalizationResponse to the second SSP 1060 via the first LBA 1020 and the second LBA 1070.

With reference to FIG. 10, in step 10035, the second SSP 1060 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may optionally further include a process of checking whether the finalizationRequest included in the finalizationResponse matches information that has transmitted by itself. Further, the verification process may further include a process of identifying the "SSP identifier" included in the finalizationResponse. Further, the verification process may further include a process of identifying whether instruction information included in the finalizationResponse is instruction information that deletes the bundle.

Further, in step 10035, the second SSP 1060 may change the bundle state to one of available states (one of disabled, enable, and active) after verification is completed. For example, as illustrated in the drawing, the second SSP 1060 may convert the bundle state to the disabled state.

With reference to FIG. 10, in step 10040, the second SSP 1060 may transmit a result (e.g., whether success or failure) of the operation performed in step 10035 to the second LBA 1070.

Figure 11:
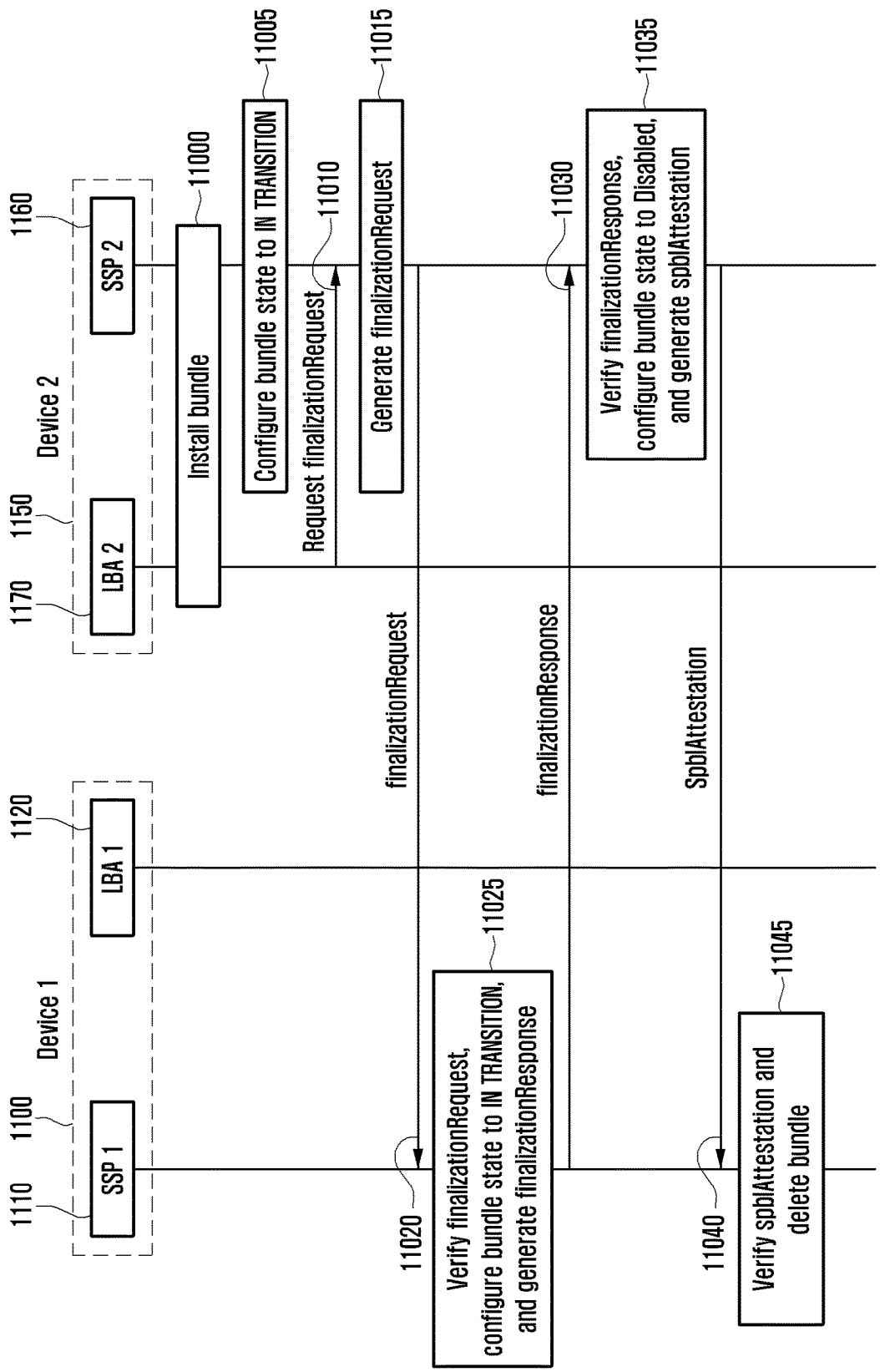
FIG. 11 is a diagram illustrating another detailed procedure of a procedure in which transmission of a bundle is completed among procedures presented in FIG. 6.

FIG. 11 is a diagram illustrating another detailed procedure of a procedure in which transmission of a bundle is completed among procedures presented in FIG. 6. More specifically, FIG. 11 is another example of a diagram illustrating a process in which a bundle is installed in a terminal and a procedure in which a bundle state is configured after the bundle is transmitted according to an embodiment of the disclosure.

According to various embodiments, the terminal may include at least one LBA and at least one SSP. For example, as in an example of FIG. 11, a first terminal 1100 may include a first LBA 1120 and a first SSP 1110, and a second terminal 1150 may include a second LBA 1170 and a second SSP 1160. For example, the first terminal 1100 may be a terminal in which the first SSP 1110 is mounted and in which the first LBA 1120 for controlling the first SSP 1110 is installed, and the second terminal 1150 may be a terminal in which the second SSP 1160 is mounted and in which the second LBA 1170 for controlling the second SSP 1160 is installed.

1. Install the Bundle

With reference to FIG. 11, in step 11000, the second LBA 1170 and the second SSP 1160 may cooperate with each other to install a bundle in the second terminal 1150. A detailed description thereof refers to the "bundle installation" process of FIG. 9.

2. Identify Whether the Bundle may be Used Repeatedly

Further, although not illustrated in the drawing, the second LBA 1170 and/or the second SSP 1160 may selectively determine whether the bundle may be used repeatedly in a plurality of terminals. A detailed description thereof refers to a process of "identifying whether the bundle may be used repeatedly of FIG. 9.

3. Configure Bundle State

If the bundle may not be used repeatedly in a plurality of terminals, the bundle state is additionally configured as follows. Alternatively, even when the second LBA 1170 and/or the second SSP 1160 do/does not determine whether the bundle may be used repeatedly, a process of additionally configuring the bundle state may be performed according to the implementation of the second LBA 1170 and/or the second SSP 1160 as follows.

With reference to FIG. 11, in step 11005, the second SSP 1160 may configure the bundle state to "IN TRANSITION". A description of the "IN TRANSITION" state refers to the description of step 10005.

With reference to FIG. 11, in step 11010, the second LBA 1170 may request an "attestation" to the second SSP 1160.

With reference to FIG. 11, in step 11015, the second SSP 1160 may generate an "attestation". In FIG. 11, the attestation may be referred to as a finalizationRequest. A structure of the attestation may follow the structure disclosed in FIG. 5.

In this case, one example of a possible attestation configuration is as follows.

The finalizationRequest may include a "bundle delimiter" of the bundle in 510.

The finalizationRequest may include an "SSP identifier" of the second SSP in 540.

The finalizationRequest may include information indicating that the second SSP has configured the bundle state to an "IN TRANSITION" state in 550.

The finalizationRequest may optionally include a time in which the second SSP changed the bundle state to the "IN TRANSITION" state or a time in which the attestation was generated in 520.

The finalizationRequest may include signature information of the second SSP in 560. The signature may be signature information obtained by digitally signing the above-described information with a signing certificate of the second SSP.

With reference to FIG. 11, in step 11020, the second SSP 1160 may transfer a finalizationRequest to the first SSP 1110. For example, the second SSP 1160 may transfer the finalizationRequestto the first SSP 1110 through the following process. That is, the second SSP 1160 may transfer the finalizationRequest to the second LBA 1170 in response to step 11010, and the second LBA may transfer the finalizationRequestto the first SSP through the first LBA 1120.

With reference to FIG. 11, in step 11025, the first SSP 1110 may verify the received finalizationRequest. The verification process may include step of checking the validity of the signature of the second SSP included in the finalizationRequest. Further, the verification process may further include a process of checking whether a "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to the "IN TRANSITION" state.

Further, in step 11025, the first SSP 1110 may configure the bundle state to an "IN TRANSITION" state after verification is completed.

Further, in step 11025, the first SSP 1110 may generate an "attestation". In FIG. 11, the attestation may be referred to as a finalizationResponse. A structure of the attestation may follow the structure disclosed in FIG. 5.

In this case, one example of a possible attestation configuration is as follows.

The finalizationResponse may include a "bundle delimiter" of the bundle in 510.

The finalizationResponse may include an "SSP identifier" of the first SSP in 540.

The finalizationResponse may include information indicating that the first SSP has changed the bundle state to the "IN TRANSITION" state in 550.

The finalizationResponse may optionally include a time in which the first SSP changed the bundle state or a time in which the attestation was generated in 520.

The finalizationResponse may include signature information of the first SSP in 560. The signature may be signature information obtained by digitally signing the above-described information with a signing certificate of the first SSP.

Further, another example of a possible attestation configuration is as follows.

The finalizationResponse may include the received finalizationRequest in 530. In this case, some information of the received finalizationRequest may be omitted, as needed. For example, signature information of the second SSP included in the finalizationRequest may be omitted in some cases. Further, for example, time information included in the finalizationRequest may be omitted in some cases.

The finalizationResponse may include an "SSP identifier" of the first SSP in 540.

The finalizationResponse may include information indicating that the first SSP has changed the bundle state to the "IN TRANSITION" state in 550.

The finalizationResponse may optionally include a time in which the first SSP changed the bundle state or a time in which the attestation was generated in 520.

The finalizationResponse may include signature information of the first SSP in 560. The signature may be signature information obtained by digitally signing the above-described information with a signing certificate of the first SSP.

With reference to FIG. 11, in step 11030, the first SSP 1110 may transfer a finalizationResponse to the second SSP 1160. For example, the first SSP 1110 may transfer a finalizationResponse to the second SSP 1160 via the first LBA 1120 and the second LBA 1170.

With reference to FIG. 11, in step 11035, the second SSP 1160 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may optionally further include a process of checking whether the finalizationRequest included in the finalizationResponse matches information that has transmitted by the second SSP 1160. Further, the verification process may further include a process of identifying the "SSP identifier" included in the finalizationResponse. Further, the verification process may further include a process of identifying whether instruction information included in the finalizationResponse is correct.

Further, in step 11035, the second SSP 1160 may change the bundle state to one of available states (one of disabled, enable, and active) after verification is completed. For example, as illustrated in the drawing, the second SSP 1160 may convert the bundle state to the disabled state.

Further, in step 11035, the second SSP 1160 may generate an "attestation". In FIG. 10, the attestation may be referred to as spblAttestation. A structure of the attestation may follow the structure disclosed in FIG. 5.

In this case, one example of a possible attestation configuration is as follows.

The spblAttestation may include a "bundle delimiter" of the bundle in 510.

The spblAttestation may include an "SSP identifier" of the second SSP in 540.

The spblAttestation may include information indicating that the second SSP has changed the bundle state to an available state in 550.

The spblAttestation may optionally include a time in which the second SSP changed the bundle state or a time in which the attestation was generated in 520.

The spblAttestation may include signature information of the second SSP in 560. The signature may be signature information obtained by digitally signing the above-described information with a signing certificate of the second SSP.

Further, another example of a possible attestation configuration is as follows.

The spblAttestation may include the received finalizationResponse in 530. In this case, some information of the received finalizationResponse may be omitted, as needed. For example, part of the signature information included in finalizationResponse may be omitted in some cases. Further, for example, part of time information included in finalizationResponse may be omitted in some cases.

The spblAttestation may include an "SSP identifier" of the second SSP in 540.

The spblAttestation may include information indicating that the second SSP has changed the bundle state to an available state in 550.

The spblAttestation may optionally include a time in which the second SSP changed the bundle state or a time in which the attestation was generated in 520.

The spblAttestation may include signature information of the second SSP in 560. The signature may be signature information obtained by digitally signing the above-described information with a signing certificate of the second SSP.

With reference to FIG. 11, in step 11040, the second SSP 1160 may transfer spblAttestation to the first SSP 1110. For example, the second SSP 1160 may transfer spblAttestation to the first SSP via the second LBA 1170 and the first LBA 1120.

With reference to FIG. 11, in step 11045, the first SSP 1110 may verify the received spblAttestation. A verification process may include step of checking the validity of the signature of the second SSP included in spblAttestation. Further, the verification process may further include a process of checking whether a "bundle delimiter" included in spblAttestation matches a bundle delimiter of the corresponding bundle. Further, the verification process may optionally further include a process of checking whether the finalizationResponse included in spblAttestation matches the information that has transmitted by the first SSP 1110. Further, the verification process may further include step of checking whether an "SSP identifier" included in spblAttestation is a valid identifier of the second SSP. Further, the verification process may further include a process of identifying whether instruction information included in spblAttestation is instruction information that changes the bundle state to an available state.

Further, in step 11045, the first SSP 1110 may delete the bundle after verification is completed.

Figure 12:
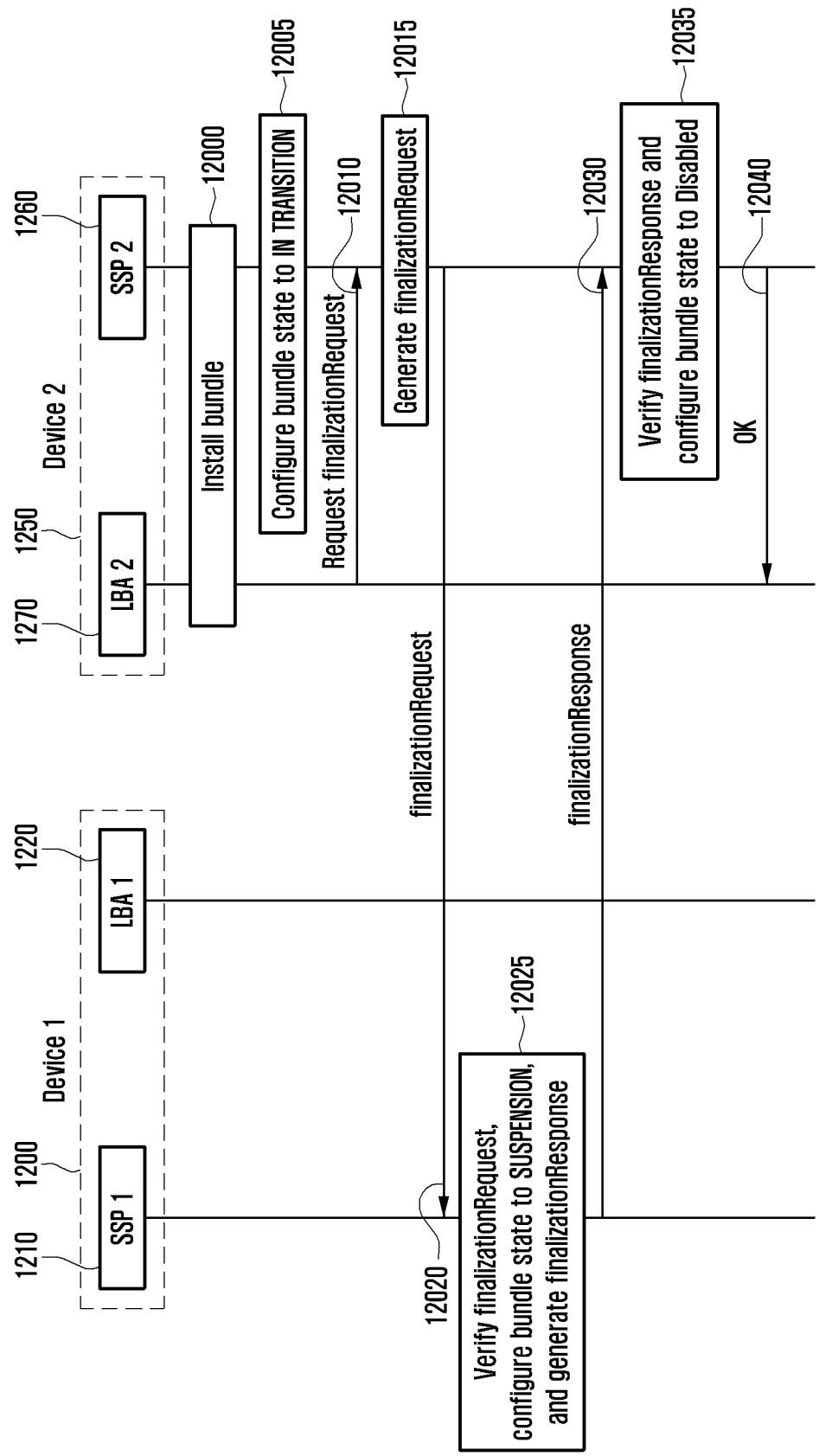
FIG. 12 is a diagram illustrating another detailed procedure of a procedure in which transmission of a bundle is completed among procedures illustrated in FIG. 6.

FIG. 12 is a diagram illustrating another detailed procedure of a procedure in which transmission of a bundle is completed among procedures presented in FIG. 6. More specifically, FIG. 12 is another example of a diagram illustrating a process in which a bundle is installed in a terminal and a procedure in which a bundle state is configured after the bundle is transmitted according to an embodiment of the disclosure.

According to various embodiments, the terminal may include at least one LBA and at least one SSP. For example, as in an example of FIG. 12, a first terminal 1200 may include a first LBA 1220 and a first SSP 1210, and a second terminal 1250 may include a second LBA 1270 and a second SSP 1260. For example, the first terminal 1200 may be a terminal in which the first SSP 1210 is mounted and in which the first LBA 1220 for controlling the first SSP 1210 is installed, and the second terminal 1250 may be a terminal in which the second SSP 1260 is mounted and in which the second LBA 1270 for controlling the second SSP 1260 is installed.

1. Install the Bundle

With reference to FIG. 12, in step 12000, the second LBA 1270 and the second SSP 1260 may cooperate with each other to install a bundle in the second terminal 1250. A detailed description thereof refers to the "bundle installation" process of FIG. 9.

2. Identify Whether the Bundle may be Used Repeatedly

Further, although not illustrated in the drawing, the second LBA 1270 and/or the second SSP 1260 may selectively determine whether the bundle may be used repeatedly in a plurality of terminals. A detailed description thereof refers to a process of "identifying whether the bundle may be used repeatedly" of FIG. 9.

3. Configure Bundle State

If the bundle may not be used repeatedly in a plurality of terminals, the bundle state is additionally configured as follows. Alternatively, even when the second LBA 1270 and/or the second SSP 1260 do/does not determine whether the bundle may be used repeatedly, a process of additionally configuring the bundle state may be performed according to the implementation of the second LBA 1270 and/or the second SSP 1260 as follows.

With reference to FIG. 12, in step 12005, the second SSP 1260 may configure the bundle state to "IN TRANSITION". A description of the "IN TRANSITION" state refers to the description of step 10005.

With reference to FIG. 12, in step 12010, the second LBA 1270 may request an "attestation" to the second SSP 1260.

With reference to FIG. 12, in step 12015, the second SSP 1260 may generate an "attestation". In FIG. 12, the attestation may be referred to as a finalizationRequest. A structure of the attestation may follow the structure disclosed in FIG. 5.

In this case, one example of a possible attestation configuration is as follows.
- The finalizationRequest may include a "bundle delimiter" of the bundle in 510.
- The finalizationRequest may include an "SSP identifier" of the second SSP in 540.
- The finalizationRequest may include information indicating that the second SSP has configured the bundle state to the "IN TRANSITION" state in 550.
- The finalizationRequest may optionally include a time in which the second SSP changed the bundle state to the "IN TRANSITION" state or a time in which the attestation was generated in 520.
- The finalizationRequest may include signature information of the second SSP in 560. The signature may be signature information obtained by digitally signing the above-described information with a signing certificate of the second SSP.

With reference to FIG. 12, in step 12020, the second SSP 1260 may transfer a finalizationRequest to the first SSP 1210. For example, the second SSP 1260 may transfer the finalizationRequest to the first SSP 1210 through the following process. That is, the second SSP 1260 may transfer the finalizationRequest to the second LBA 1270 in response to step 12010, and the second LBA may transfer the finalizationRequestto the first SSP through the first LBA 1220.

With reference to FIG. 12, in step 12025, the first SSP 1210 may verify the received finalizationRequest. The verification process may include step of checking the validity of the signature of the second SSP included in the finalizationRequest. Further, the verification process may further include a process of checking whether a "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to the "IN TRANSITION" state.

Further, in step 12025, the first SSP 1210 may configure the bundle state to a "SUSPENSION" state after verification is completed. "SUSPENSION" means a state that the bundle is unavailable (also, a state that may be changed to an available state (disabled, enable, and active state) by only a "request from another terminal (e.g., a request made by transmitting recoveryRequest)" and/or a "request from an external server (although not described in the disclosure)").

Further, although not illustrated in the drawing, the above-described "SUSPENSION" state may be replaced with the "IN TRANSITION" state.

Further, in step 12025, the first SSP 1210 may generate an "attestation". In FIG. 12, the attestation may be referred to as a finalizationResponse. A structure of the attestation may follow the structure disclosed in FIG. 5.

In this case, one example of a possible attestation configuration is as follows.
- The finalizationResponse may include a "bundle delimiter" of the bundle in 510.
- The finalizationResponse may include an "SSP identifier" of the first SSP in 540.
- The finalizationResponse may include information indicating that the first SSP has changed the bundle state to the "SUSPENSION" (or IN TRANSITION) state in 550.
- The finalizationResponse may optionally include a time in which the first SSP changed the bundle state or a time in which the attestation was generated in 520.
- The finalizationResponse may include signature information of the first SSP in 560. The signature may be signature information obtained by digitally signing the above-described information with a signing certificate of the first SSP.

Further, another example of a possible attestation configuration is as follows.
- The finalizationResponse may include the received finalizationRequest in 530. In this case, some information of the received finalizationRequest may be omitted, as needed. For example, signature information of the second SSP included in the finalizationRequest may be omitted in some cases. Further, for example, time information included in the finalizationRequest may be omitted in some cases.
- The finalizationResponse may include an "SSP identifier" of the first SSP in 540.
- The finalizationResponse may include information indicating that the first SSP has changed the bundle state to the "SUSPENSION" (or IN TRANSITION) state in 550.
- The finalizationResponse may optionally include a time in which the first SSP changed the bundle state or a time in which the attestation was generated in 520.
- The finalizationResponse may include signature information of the first SSP in 560. The signature may be signature information obtained by digitally signing the above-described information with a signing certificate of the first SSP.

With reference to FIG. 12, in step 12030, the first SSP 1210 may transfer a finalizationResponse to the second SSP 1260. For example, the first SSP 1210 may transfer a finalizationResponse to the second SSP 1260 via the first LBA 1220 and the second LBA 1270.

With reference to FIG. 12, in step 12035, the second SSP 1260 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may optionally further include a process of checking whether the finalizationRequest included in the finalizationResponse matches the information that has transmitted by the second SSP 1260. Further, the verification process may further include a process of identifying the "SSP identifier" included in the finalizationResponse. Further, the verification process may further include a process of identifying whether instruction information included in the finalizationResponse is correct.

Further, in step 12035, the second SSP 1260 may change the bundle state to one of available states (one of disabled, enable, and active) after verification is completed. For example, as illustrated in the drawing, the second SSP 1260 may convert the bundle state to the disabled state.

With reference to FIG. 12, in step 12040, the second SSP 1260 may transmit a result (e.g., whether success or failure) of the operation performed in step 12035 to the second LBA 1270.

Figure 13:
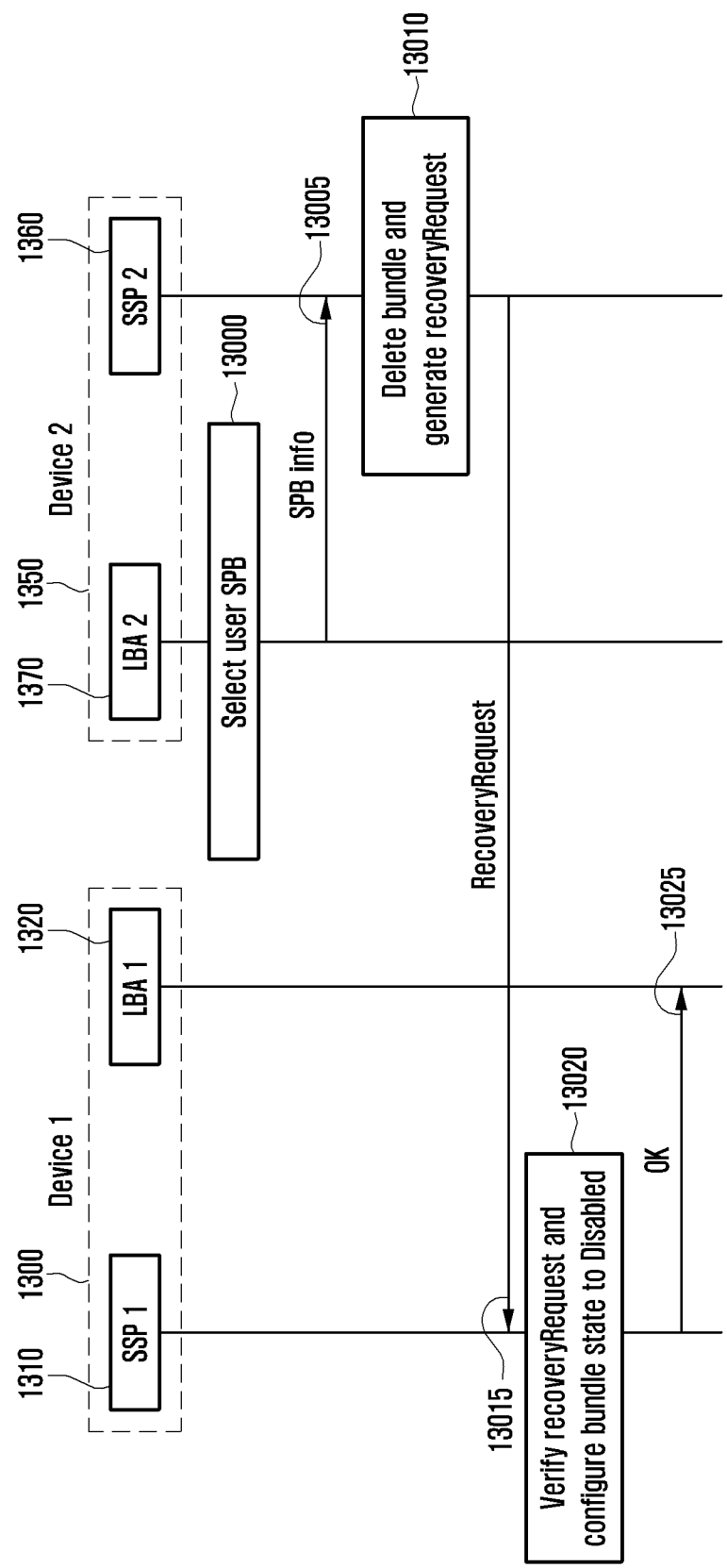
FIG. 13 is a diagram illustrating an example of a procedure for making a bundle that has been suspended from use available again.

FIG. 13 is a diagram illustrating an example of a procedure for making a bundle that has been suspended from use available again. More specifically, FIG. 13 is an example of a diagram illustrating a procedure for configuring a bundle in an "IN TRANSITION" state or a "SUSPENSION" state to an available state again.

According to various embodiments, the terminal may include at least one LBA and at least one SSP. For example, as in an example of FIG. 13, a first terminal 1300 may include a first LBA 1320 and a first SSP 1310, and a second terminal 1350 may include a second LBA 1370 and a second SSP 1360. For example, the first terminal 1300 may be a terminal in which the first SSP 1310 is mounted and in which the first LBA 1320 for controlling the first SSP 1310 is installed, and the second terminal 1350 may be a terminal in which the second SSP 1360 is mounted and in which the second LBA 1370 for controlling the second SSP 1360 is installed.

Possible examples of a case in which the bundle state is configured to the "IN TRANSITION" state or the "SUSPENSION" state before the procedure disclosed in FIG. 13 is performed are as follows. For example, in step in which transmission of the bundle disclosed in FIG. 11 is completed, when step 11025 was performed but step 11045 is not performed, the bundle state in the first terminal 1300 will be configured to the "IN TRANSITION" state. As another example, when step 12025 is performed in step in which transmission of the bundle disclosed in FIG. 12 is completed, the bundle state in the first terminal 1300 will be configured to the "IN TRANSITION" state or the "SUSPENSION" state.

With reference to FIG. 13, in step 13000, information on a bundle to request resumption of use may be transferred to the second LBA 1370. The transfer process may be made through a process in which the user directly selects a bundle through an UI provided by the second terminal 1350 or may be input from a remote server to the second LBA 1370 through a push input, or the second LBA 1370 may access the remote server to read the corresponding information.

With reference to FIG. 13, in step 13005, information on the bundle selected in step 13000 may be transferred from the second LBA 1370 to the second SSP 1360. In this case, the information transferred from the second LBA 1370 to the second SSP 1360 may include information for identifying the bundle selected in step 13000.

With reference to FIG. 13, in step 13010, the second SSP 1360 may delete the corresponding bundle. Further, the second SSP 1360 may generate an "attestation". In FIG. 13, the attestation may be referred to as recoveryRequest. A structure of the attestation may follow the structure disclosed in FIG. 5.

In this case, one example of a possible attestation configuration is as follows.

The recoveryRequest may include a "bundle delimiter" of the bundle in 510.

The recoveryRequest may include an "SSP identifier" of the second SSP in 540.

The recoveryRequest may include information indicating that the second SSP has deleted the bundle in 550.

The recoveryRequest may optionally include a time in which the second SSP deleted the bundle or a time in which the attestation was generated in 520.

The recoveryRequest may include signature information of the second SSP in 560. The signature may be signature information obtained by digitally signing the above-described information with a signing certificate of the second SSP.

With reference to FIG. 13, in step 13015, the second SSP 1360 may transfer a recoveryRequest to the first SSP 1310. For example, the second SSP 1360 may transfer the recoveryRequest to the first SSP 1310 through the following process. That is, the second SSP 1360 may transfer the recoveryRequest to the second LBA 1370 in response to step 13005, and the second LBA 1370 may transfer the recoveryRequest to the first SSP 1310 via the first LBA 1320.

With reference to FIG. 13, in step 13020, the first SSP 1310 may verify the received recoveryRequest. The verification process may include step of checking the validity of the signature of the second SSP 1360 included in the recoveryRequest. Further, the verification process may further include a process of identifying a "bundle delimiter" included in the recoveryRequest. Further, the verification process may further include a process of checking an "SSP identifier" included in the recoveryRequest. Further, the verification process may further include a process of identifying whether instruction information included in the recoveryRequest is instruction information that deletes the bundle.

Further, in step 13020, the first SSP 1310 may change the bundle state to one of available states (one of disabled, enable, and active) after verification is completed. For example, as illustrated in the drawing, the first SSP 1310 may convert the bundle state to the disabled state.

With reference to FIG. 13, in step 13025, the first SSP 1310 may transmit a result (e.g., whether success or failure) of the operation performed in step 13020 to the first LBA 1320.

Figure 14:
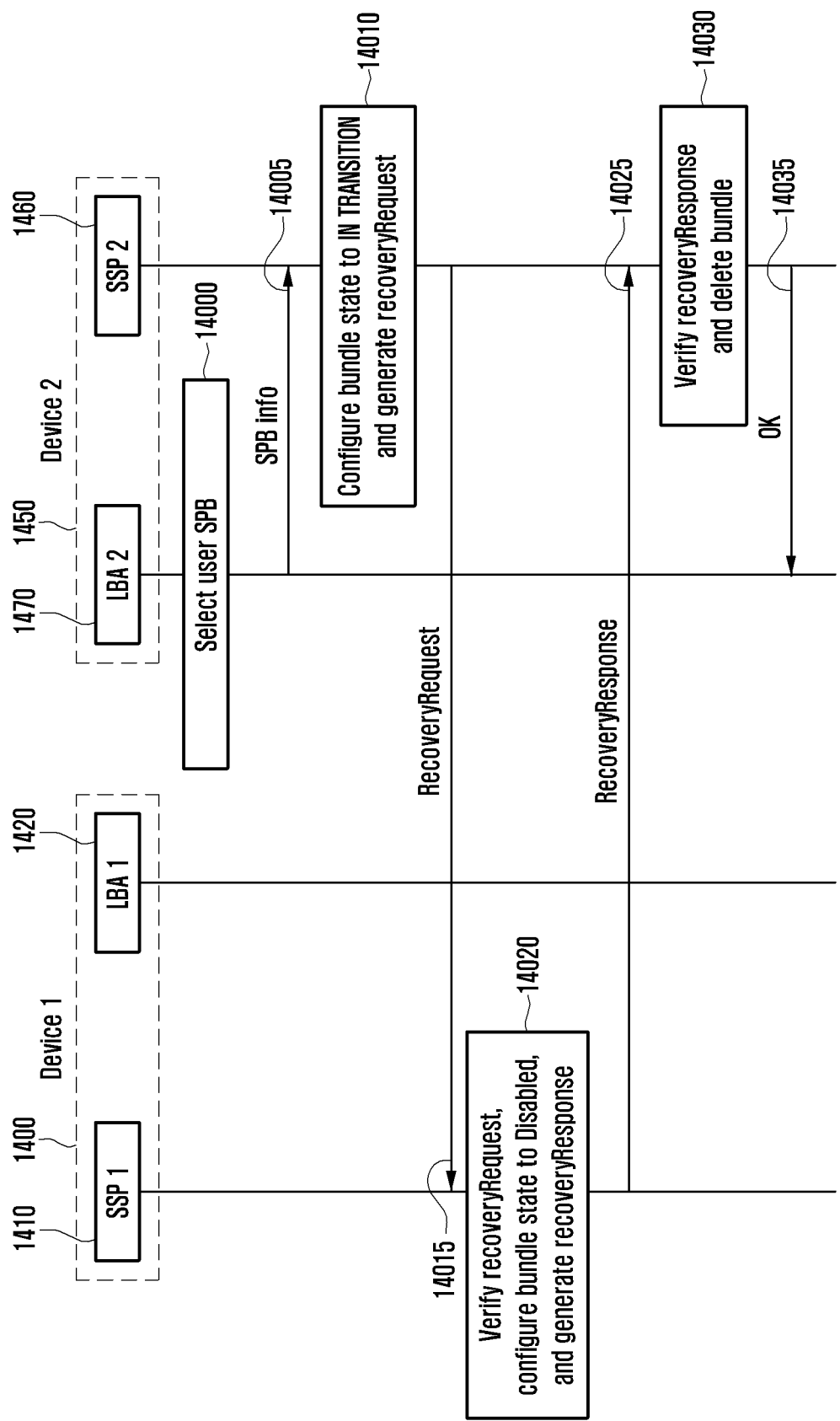
FIG. 14 is a diagram illustrating an example of another procedure for making a bundle that has been suspended from use available again.

FIG. 14 is a diagram illustrating an example of another procedure for making a bundle that has been suspended from use available again.

According to various embodiments, the terminal may include at least one LBA and at least one SSP. For example, as in an example of FIG. 14, a first terminal 1400 may include a first LBA 1420 and a first SSP 1410, and a second terminal 1450 may include a second LBA 1470 and a second SSP 1460. For example, the first terminal 1400 may be a terminal in which the first SSP 1410 is mounted and in which the first LBA 1420 for controlling the first SSP 1410 is installed, and the second terminal 1450 may be a terminal in which the second SSP 1460 is mounted and in which the second LBA 1470 for controlling the second SSP 1460 is installed.

A possible example of a case in which the bundle state is configured to the "IN TRANSITION" state or the "SUSPENSION" state before the procedure disclosed in FIG. 14 is performed is as follows. For example, in step in which transmission of the bundle disclosed in FIG. 11 is completed, when step 11025 was performed but step 11045 is not performed, the state of the bundle in the first terminal 1400 will be configured to the "IN TRANSITION" state. As another example, in step in which transmission of the bundle disclosed in FIG. 12 is completed, when step 12025 was performed, the state of the bundle in the first terminal 1400 will be configured to the "IN TRANSITION" state or the "SUSPENSION" state.

With reference to FIG. 14, in step 14000, information on a bundle to request resumption of use may be transferred to the second LBA 1470. The transfer process may be made through a process in which the user directly selects a bundle through a UI provided by the second terminal 1450 or may be input from a remote server to the second LBA 1470 through a push input, or the second LBA 1470 may access the remote server to read the corresponding information.

With reference to FIG. 14, in step 14005, information on the bundle selected in step 14000 may be transferred from the second LBA 1470 to the second SSP 1460. In this case, the information transferred from the second LBA 1470 to the second SSP 1460 may include information for identifying the bundle selected in step 14000.

With reference to FIG. 14, in step 14010, the second SSP 1460 may configure the bundle state to the "IN TRANSITION" state. Further, the second SSP 1460 may generate an "attestation" related to the bundle state change. In FIG. 14, the attestation may be referred to as recoveryRequest. A structure of the attestation may follow the structure disclosed in FIG. 5.

In this case, one example of a possible attestation configuration is as follows.
  The recoveryRequest may include a "bundle delimiter" of the bundle in 510.
  The recoveryRequest may include an "SSP identifier" of the second SSP in 540.
  The recoveryRequest may include information indicating that the second SSP has configured the bundle state to the "IN TRANSITION" state in 550.
  The recoveryRequest may optionally include a time in which the second SSP changed the bundle state or a time in which the attestation was generated in 520.
  The recoveryRequest may include signature information of the second SSP in 560. The signature may be signature information obtained by digitally signing the above-described information with a signing certificate of the second SSP.

With reference to FIG. 14, in step 14015, the second SSP 1460 may transfer a recoveryRequest to the first SSP 1410. For example, the second SSP 1460 may transfer the recoveryRequest to the first SSP 1410 through the following process. That is, the second SSP 1460 may transfer the recoveryRequest to the second LBA 1470 in response to step 14005, and the second LBA 1470 may transfer the recoveryRequest to the first SSP 1410 via the first LBA 1420.

With reference to FIG. 14, in step 14020, the first SSP 1410 may verify the received recoveryRequest. The verification process may include step of checking the validity of the signature of the second SSP 1460 included in the recoveryRequest. Further, the verification process may further include a process of identifying a "bundle delimiter" included in the recoveryRequest. Further, the verification process may further include a process of identifying an "SSP identifier" included in the recoveryRequest. Further, the verification process may further include a process of identifying whether instruction information included in the recoveryRequest is instruction information that changes the bundle state to the "IN TRANSITION" state.

Further, in step 14020, the first SSP 1410 may change the bundle state to one of available states (one of disabled, enable, and active) after verification is completed. For example, as illustrated in the drawing, the first SSP 1410 may convert the bundle state to the disabled state.

Further, in step 14020, the first SSP 1410 may generate an "attestation". In FIG. 14, the attestation may be referred to as a recoveryResponse. A structure of the attestation may follow the structure disclosed in FIG. 5.

In this case, one example of a possible attestation configuration is as follows.
  The recoveryResponse may include a "bundle delimiter" of the corresponding bundle in 510.
  The recoveryResponse may include an "SSP identifier" of the first SSP in 540.
  The recoveryResponse may include information indicating that the first SSP has changed the bundle state to an available state in 550.
  The recoveryResponse may optionally include a time in which the first SSP changed the bundle state or a time in which the attestation was generated in 520.
  The recoveryResponse may include signature information of the first SSP in 560. The signature may be signature information obtained by digitally signing the above-described information with a signing certificate of the first SSP.

Further, another example of a possible attestation configuration is as follows.
  The recoveryResponse may include the received recoveryRequest in 530. In this case, some information of the received recoveryRequest may be omitted, as needed. For example, signature information of the second SSP included in the recoveryRequest may be omitted in some cases. Further, for example, time information included in the recoveryRequest may be omitted in some cases.
  The recoveryResponse may include an "SSP identifier" of the first SSP in 540.
  The recoveryResponse may include information indicating that the first SSP has changed the bundle state to an available state in 550.
  The recoveryResponse may optionally include a time in which the first SSP changed the bundle state or a time in which the attestation was generated in 520.
  The recoveryResponse may include signature information of the first SSP in 560. The signature may be signature information obtained by digitally signing the above-described information with a signing certificate of the first SSP.

With reference to FIG. 14, in step 14025, the first SSP 1410 may transfer a recoveryResponse to the second SSP 1460. For example, the first SSP 1410 may transfer a recoveryResponse to the second SSP 1460 via the first LBA 1420 and the second LBA 1470.

With reference to FIG. 14, in step 14030, the second SSP 1460 may verify the received recoveryResponse. The verification process may include step of checking the validity of the signature of the first SSP 1460 included in the recoveryResponse. Further, the verification process may optionally further include a process of checking whether a "bundle delimiter" included in the recoveryResponse matches a bundle delimiter of the corresponding bundle. Further, the verification process may optionally further include a process of checking whether the recoveryRequest included in the recoveryResponse matches the information that has transmitted by the second SSP 1460. Further, the verification process may further include a process of identifying an "SSP identifier" included in the recoveryResponse. Further, the verification process may further include a process of identifying whether instruction information included in the recoveryResponse is correct instruction information.

Further, in step 14030, the second SSP 1460 may delete the bundle after verification is completed.

With reference to FIG. 14, in step 14035, the second SSP 1460 may transmit a result (e.g., whether success or failure) of the operation performed in step 14030 to the second LBA 1470.

Figure 15:
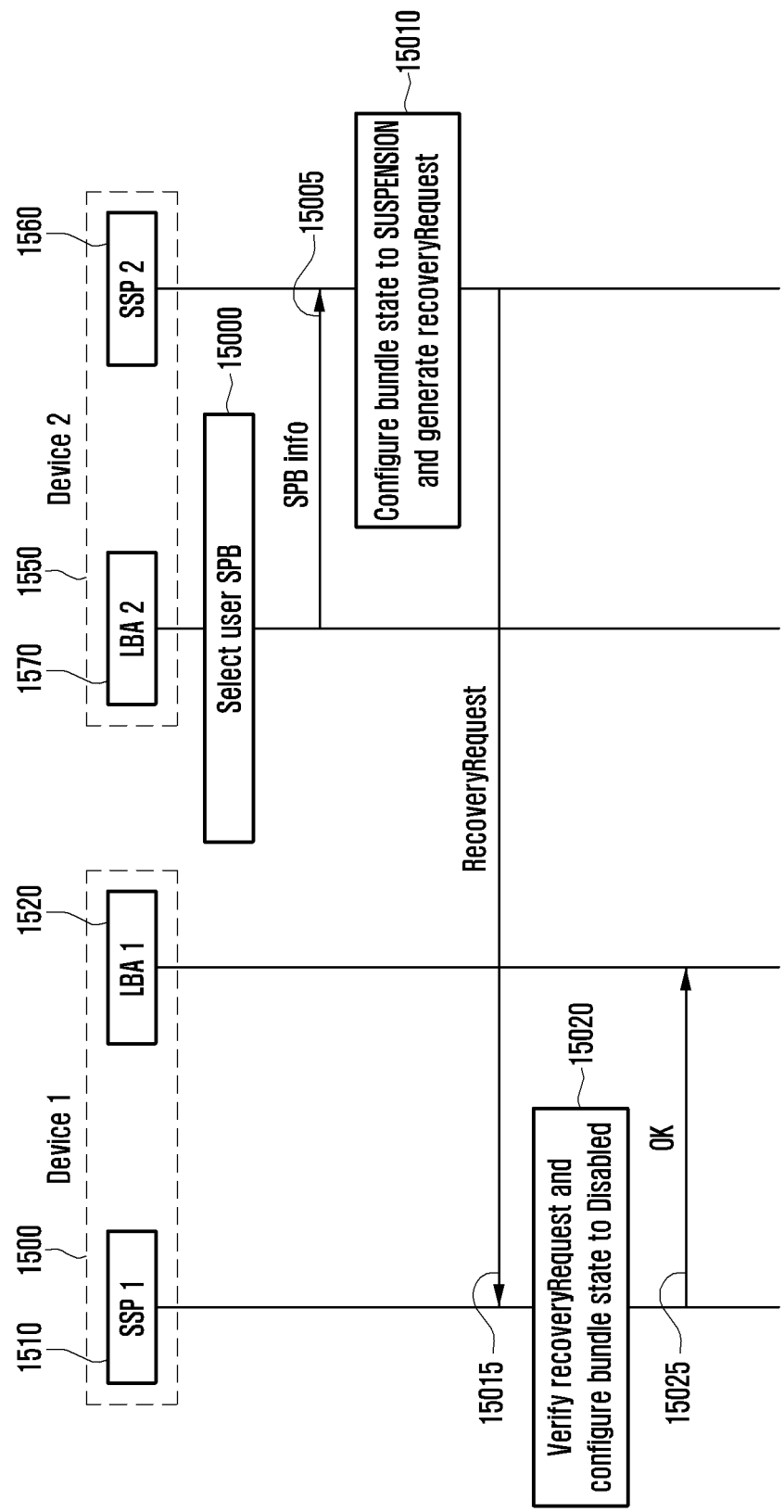
FIG. 15 is a diagram illustrating an example of another procedure for making a bundle that has been suspended from use available again.

FIG. 15 is a diagram illustrating an example of another procedure for making a bundle that has been suspended from use available again.

According to various embodiments, the terminal may include at least one LBA and at least one SSP. For example, as in an example of FIG. 15, a first terminal 1500 may include a first LBA 1520 and a first SSP 1510, and a second terminal 1550 may include a second LBA 1570 and a second SSP 1560. For example, the first terminal 1500 may be a terminal in which the first SSP 1510 is mounted and in which the first LBA 1520 for controlling the first SSP 1510 is installed, and the second terminal 1550 may be a terminal in which the second SSP 1560 is mounted and in which the second LBA 1570 for controlling the second SSP 1560 is installed.

A possible example of a case in which the bundle state is configured to the "IN TRANSITION" state or the "SUSPENSION" state before the procedure disclosed in FIG. 15 is performed is as follows. For example, in step in which transmission of the bundle disclosed in FIG. 11 is completed, when step 11025 was performed but step 11045 is not performed, the state of the bundle in the first terminal 1500 will be configured to the "IN TRANSITION" state. As another example, in step in which transmission of the bundle disclosed in FIG. 12 is completed, when step 12025 was performed, the state of the bundle in the first terminal 1500 will be configured to the "IN TRANSITION" state or "SUSPENSION" state.

With reference to FIG. 15, in step 15000, information on a bundle to request resumption of use may be transferred to the second LBA. The transfer process may be made through a process in which the user directly selects a bundle through a UI provided by the second terminal 1550 or may be input from a remote server to the second LBA 1570 through a push input, or the second LBA 1570 may access the remote server to read the corresponding information.

With reference to FIG. 15, in step 15005, information on the bundle selected in step 15000 may be transferred from the second LBA 1570 to the second SSP 1560. In this case, the information transferred from the second LBA 1570 to the second SSP 1560 may include information for identifying the bundle selected in step 15000.

With reference to FIG. 15, in step 15010, the second SSP 1560 may change the bundle state to "SUSPENSION". In this case, although not illustrated in the drawing, the above-described "SUSPENSION" state may be replaced with an "IN TRANSITION" state.

Further, the second SSP 1560 may generate an "attestation". In FIG. 15, the attestation may be referred to as recoveryRequest. A structure of the attestation may follow the structure disclosed in FIG. 5.

In this case, one example of a possible attestation configuration is as follows.

The recoveryRequest may include a "bundle delimiter" of the bundle in 510.

The recoveryRequest may include an "SSP identifier" of the second SSP in 540.

The recoveryRequest may include information indicating that the second SSP has changed the bundle state to "SUSPENSION" or "IN TRANSITION" in 550.

The recoveryRequest may optionally include a time in which the second SSP changed the bundle state or a time in which the attestation was generated in 520.

The recoveryRequest may include signature information of the second SSP in 560. The signature may be signature information obtained by digitally signing the above-described information with a signing certificate of the second SSP.

With reference to FIG. 15, in step 15015, the second SSP 1560 may transfer a recoveryRequest to the first SSP 1510. For example, the second SSP 1560 may transfer the recoveryRequest to the first SSP 1510 through the following process. That is, the second SSP 1560 may transfer the recoveryRequest to the second LBA 1570 in response to step 15005, and the second LBA 1570 may transfer the recoveryRequest to the first SSP 1510 via the first LBA 1520.

With reference to FIG. 15, in step 15020, the first SSP 1510 may verify the received recoveryRequest. The verification process may include step of checking the validity of the signature of the second SSP 1560 included in the recoveryRequest. Further, the verification process may further include a process of identifying a "bundle delimiter" included in the recoveryRequest. Further, the verification process may further include a process of identifying an "SSP identifier" included in the recoveryRequest. Further, the verification process may further include a process of identifying whether instruction information included in the recoveryRequest is instruction information that correctly changes the bundle state.

Further, in step 15020, the first SSP 1510 may change the bundle state to one of available states (one of disabled, enable, and active) after verification is completed. For example, as illustrated in the drawing, the first SSP 1510 may change the bundle state to the disabled state.

With reference to FIG. 15, in step 15025, the first SSP 1510 may transmit a result (e.g., whether success or failure) of the operation performed in step 15020 to the first LBA 1520.

Figure 16:
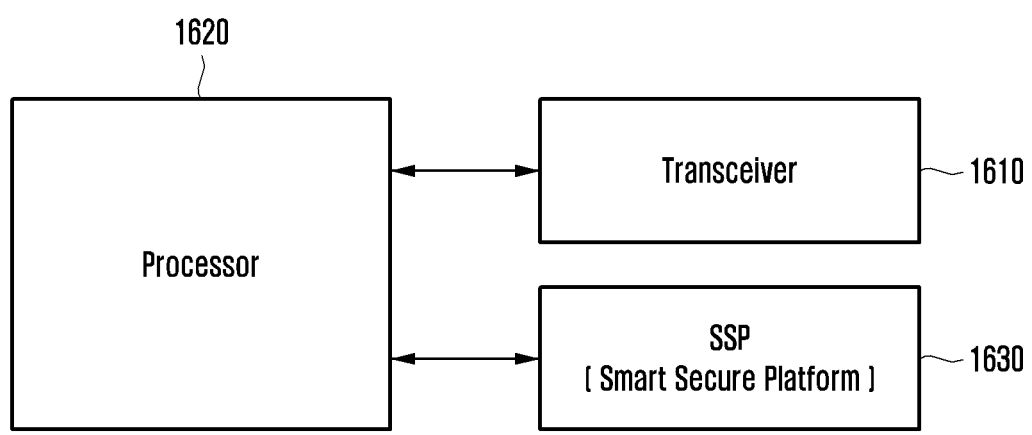
FIG. 16 is a diagram illustrating a configuration of a terminal according to some embodiments of the disclosure.

FIG. 16 is a diagram illustrating a configuration of a terminal according to an embodiment of the disclosure.

As illustrated in FIG. 16, the terminal may include a transceiver 1610 and at least one processor 1620. Further, the terminal may further include an SSP 1630. For example, the SSP 1630 may be inserted into the terminal or may be embedded in the terminal. The at least one processor 1620 may be referred to as a "controller". However, a configuration of the terminal is not limited to that illustrated in FIG. 16, and may include more or fewer components than the components illustrated in FIG. 16. According to some embodiments, the transceiver 1610, at least one processor 1620, and a memory (not illustrated) may be implemented in the form of a single chip. Further, when the SSP 1630 is embedded in the terminal, the transceiver 1610, at least one processor 1620, and the memory (not illustrated) may be implemented in the form of a single chip including the SSP 1630.

According to various embodiments, the transceiver 1610 may transmit and receive signals, information, data, and the like according to various embodiments of the disclosure to and from a transceiver of another terminal or an external server. The transceiver 1610 may include an RF transmitter for up-converting and amplifying a frequency of a signal to be transmitted, and an RF receiver for low-noise amplifying a received signal and down-converting a frequency thereof.

However, this is only an embodiment of the transceiver 1610, and components of the transceiver 1610 are not limited to the RF transmitter and the RF receiver. Further, the transceiver 1610 may receive a signal through a wireless channel, output the signal to the at least one processor 1620, and transmit a signal output from the at least one processor 1620 through a wireless channel.

According to various embodiments, the transceiver 1610 may transmit or receive information of an SSP included in another terminal from a transceiver of the another terminal or an external server, authentication information capable of authenticating another terminal, authentication information capable of authenticating itself, a bundle transfer code, a bundle transfer configuration, a bundle, and various attestations described in FIGS. 10 to 15.

At least one processor 1620 is a component for overall controlling the terminal. At least one processor 1620 may control the overall operation of the terminal according to various embodiments of the disclosure, as described above.

The SSP 1630 may include a processor or a controller for installing and controlling a bundle, or an application may be installed therein.

According to various embodiments, at least one processor or controller in the SSP 1630 may identify the bundle transfer configuration to determine whether to transmit a specific bundle. Further, at least one processor or controller may identify the bundle transfer configuration to identify whether the bundle may be used repeatedly in a plurality of terminals.

Further, according to various embodiments, at least one processor or controller in the SSP may generate a bundle transfer code to control a transmission process of a specific bundle.

Further, according to various embodiments, at least one processor or controller in the SSP may generate SSP information thereof, and identify and verify SSP information of another SSP received from the outside.

Further, according to various embodiments, at least one processor or controller in the SSP may generate authentication information capable of verifying itself, and verify authentication information of another SSP received from the outside.

Further, according to various embodiments, the SSP 1330 may generate a bundle and install the bundle alone or in cooperation with one or more processors 1620. Further, the SSP 1630 may manage the bundle.

Further, according to various embodiments, the SSP 1630 may generate various types of attestations described with reference to FIGS. 10 to 15 and verify the received attestation.

Further, according to various embodiments, the SSP 1630 may change a state of the bundle based on contents of the received attestation, as described with reference to FIGS. 10 to 15.

Further, according to various embodiments, the SSP 1630 may operate under the control of the processor 1620. Alternatively, the SSP 1630 may include a processor or a controller for installing and controlling a bundle or an application may be installed therein. Some or all of the application may be installed in the SSP 1630 or the memory (not illustrated).

The terminal may further include a memory (not illustrated), and the memory (not illustrated) may store data such as a basic program, an application program, and configuration information for an operation of the terminal. Further, the memory may include at least one storage medium of a flash memory type, a hard disk type, a multimedia card micro type, a card type memory (e.g., SD or XD memory), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Further, the processor 1620 may perform various operations using various programs, contents, data, and the like stored in the memory.

Figure 17:
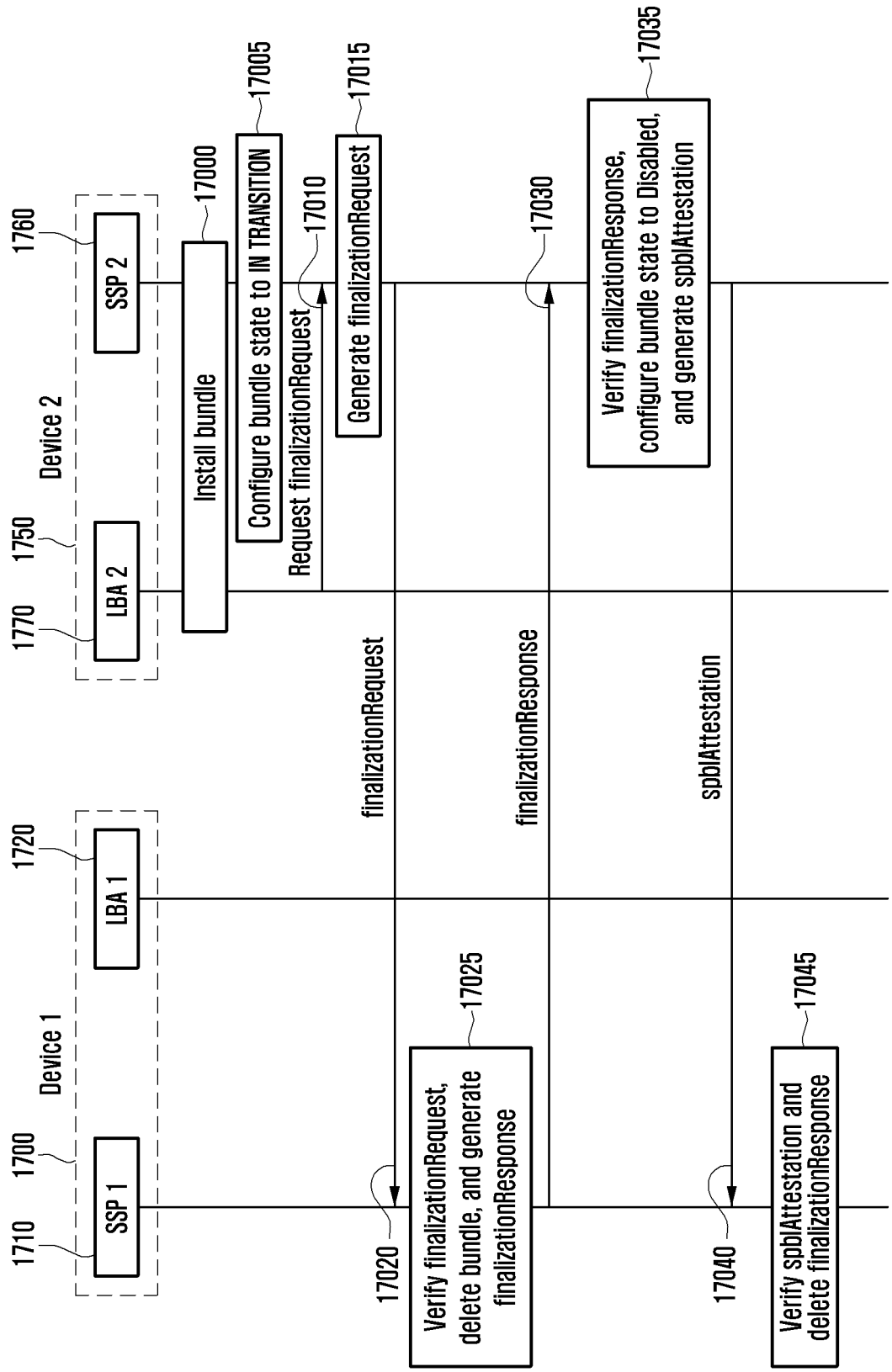
FIG. 17 is a diagram illustrating another detailed procedure of a procedure in which transmission of a bundle is completed among procedures presented in FIG. 6.

FIG. 17 is a diagram illustrating another detailed procedure of a procedure in which transmission of a bundle is completed among procedures presented in FIG. 6. More specifically, FIG. 17 is another example of a diagram illustrating a process in which a bundle is installed in a terminal and a procedure in which a bundle state is configured after the bundle is transmitted according to an embodiment of the disclosure.

According to various embodiments, the terminal may include at least one LBA and at least one SSP. For example, as in an example of FIG. 17, a first terminal 1700 may include a first LBA 1720 and a first SSP 1710, and a second terminal 1750 may include a second LBA 1770 and a second SSP 1760. For example, the first terminal 1700 may be a terminal in which the first SSP 1710 is mounted and in which the first LBA 1720 for controlling the first SSP 1710 is installed, and the second terminal 1750 may be a terminal in which the second SSP 1760 is mounted and in which the second LBA 1770 for controlling the second SSP 1760 is installed.

1. Install the Bundle

With reference to FIG. 17, in step 17000, the second LBA 1770 and the second SSP 1760 may cooperate with each other to install a bundle in the second terminal 1750. A detailed description thereof refers to the "bundle installation" process of FIG. 9.

2. Identify Whether the Bundle may be Used Repeatedly

Further, although not illustrated in the drawing, the second LBA 1770 and/or the second SSP 1760 may selectively determine whether the bundle may be used repeatedly in a plurality of terminals. A detailed description thereof refers to a process of "identifying whether the bundle may be used repeatedly" of FIG. 9.

3. Configure Bundle State

If the bundle may not be used repeatedly in a plurality of terminals, the bundle state is additionally configured as follows. Alternatively, even when the second LBA 1770 and/or the second SSP 1760 do/does not determine whether the bundle may be used repeatedly, a process of additionally configuring the bundle state may be performed according to the implementation of the second LBA 1770 and/or the second SSP 1760 as follows.

With reference to FIG. 17, in step 17005, the second SSP 1760 may configure the bundle state to "IN TRANSITION". "IN TRANSITION" means a state that the bundle has been successfully installed but not available (also, a state that may be changed to an available state (disabled, enable, and active state) only by an additional operation such as a "request from another terminal (e.g., a request made by transmitting a 'finalizationResponse or recoveryRequest')" and/or a "request from an external server").

With reference to FIG. 17, in step 17010, the second LBA 1770 may request an "attestation" to the second SSP 1760.

With reference to FIG. 17, in step 17015, the second SSP 1760 may generate an "attestation". In FIG. 17, the attestation may be referred to as a finalizationRequest. A structure of the attestation may follow the structure disclosed in FIG. 5.

In this case, one example of a possible attestation configuration is as follows.

The finalizationRequest may include a "bundle delimiter" of the bundle in 510.

The finalizationRequest may include an "SSP identifier" of the second SSP in 540.

The finalizationRequest may include information indicating that the second SSP has configured the bundle state to the "IN TRANSITION" state in 550.

The finalizationRequest may optionally include a time in which the second SSP changed the bundle state to the "IN TRANSITION" state or a time in which the attestation was generated in 520. Alternatively, the finalizationRequest may optionally further include information on a certificate to be used for digital signature later.

The finalizationRequest may include signature information of the second SSP in 560. The signature may be signature information obtained by digitally signing the above-described information with a signing certificate of the second SSP.

With reference to FIG. 17, in step 17020, the second SSP 1760 may transfer a finalizationRequest to the first SSP 1710. For example, the second SSP 1760 may transfer the finalizationRequest to the first SSP 1710 through the following process. That is, the second SSP 1760 may transfer the finalizationRequest to the second LBA 1770 in response to step 17010, and the second LBA may transfer the finalizationRequestto the first SSP through the first LBA 1720.

With reference to FIG. 17, in step 17025, the first SSP 1710 may verify the received finalizationRequest. The verification process may include step of checking the validity of the signature of the second SSP included in the finalizationRequest. Further, the verification process may further include a process of checking whether a "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to the "IN TRANSITION" state.

Further, in step 17025, the first SSP 1710 may delete the bundle.

Further, in step 17025, the first SSP 1710 may generate an "attestation". In FIG. 17, the attestation may be referred to as a finalizationResponse. A structure of the attestation may follow the structure disclosed in FIG. 5.

In this case, one example of a possible attestation configuration is as follows.

The finalizationResponse may include a "bundle delimiter" of the bundle in 510.

The finalizationResponse may include an "SSP identifier" of the first SSP in 540.

The finalizationResponse may include information indicating that the first SSP has deleted the bundle in 550.

The finalizationResponse may optionally include a time in which the first SSP deleted the bundle or a time in which the attestation was generated in 520. Alternatively, the finalizationResponse may optionally further include information on a certificate to be used for digital signature later.

The finalizationResponse may include signature information of the first SSP in 560. The signature may be signature information obtained by digitally signing the above-described information with a signing certificate of the first SSP.

Further, another example of a possible attestation configuration is as follows.

The finalizationResponse may include part and/or all data of finalizationRequest in 530.

The finalizationResponse may include an "SSP identifier" of the first SSP in 540.

The finalizationResponse may include information indicating that the first SSP has deleted the bundle in 550.

The finalizationResponse may optionally include a time in which the first SSP deleted the bundle or a time in which the attestation was generated in 520. Alternatively, the finalizationResponse may optionally further include information on a certificate to be used for digital signature later.

The finalizationResponse may include signature information of the first SSP in 560. The signature may be signature information obtained by digitally signing the above-described information with a signing certificate of the first SSP.

With reference to FIG. 17, in step 17030, the first SSP 1710 may transfer a finalizationResponse to the second SSP 1760. For example, the first SSP 1710 may transfer a finalizationResponse to the second SSP 1760 via the first LBA 1720 and the second LBA 1770.

With reference to FIG. 17, in step 17035, the second SSP 1760 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may optionally further include a process of checking whether some and/or all information of the finalizationRequest included in the finalizationResponse matches the information that has transmitted by the second SSP 1760. Further, the verification process may further include a process of identifying the "SSP identifier" included in the finalizationResponse. Further, the verification process may further include a process of identifying whether instruction information included in the finalizationResponse is instruction information that deletes the bundle.

Further, in step 17035, the second SSP 1760 may change the bundle state to one of available states (one of disabled, enable, and active). For example, as illustrated in the drawing, the second SSP 1760 may convert the bundle state to the disabled state.

Further, in step 17035, the second SSP 1760 may generate an "attestation". In FIG. 17, the attestation may be referred to as spblAttestation. A structure of the attestation may follow the structure disclosed in FIG. 5.

In this case, one example of a possible attestation configuration is as follows.

The spblAttestation may include a "bundle delimiter" of the bundle in 510.

The spblAttestation may include an "SSP identifier" of the second SSP in 540.

The spblAttestation may include information indicating that the second SSP has changed the bundle state to an available state in 550.

The spblAttestation may optionally include a time in which the second SSP changed the bundle state or a time in which the attestation was generated in 520.

Alternatively, the spblAttestation may optionally further include information on a certificate to be used for digital signature later.

The spblAttestation may include signature information of the second SSP in 560. The signature may be signature information obtained by digitally signing the above-described information with a signing certificate of the second SSP.

Further, another example of a possible attestation configuration is as follows.

The spblAttestation may include part and/or all data of "finalizationRequest and/or finalizationResponse" in 530.

The spblAttestation may include an "SSP identifier" of the second SSP in 540.

The spblAttestation may include information indicating that the second SSP has changed the bundle state to an available state in 550.

The spblAttestation may optionally include a time in which the second SSP changed the bundle state or a time in which the attestation was generated in 520. Alternatively, the spblAttestation may optionally further include information on a certificate to be used for digital signature later.

The spblAttestation may include signature information of the second SSP in 560. The signature may be signature information obtained by digitally signing the above-described information with a signing certificate of the second SSP.

With reference to FIG. 17, in step 17040, the second SSP 1760 may transfer spblAttestation to the first SSP 1710. For example, the second SSP 1760 may transfer spblAttestation to the first SSP 1710 via the second LBA 1770 and the first LBA 1720.

With reference to FIG. 17, in step 17045, the first SSP 1710 may verify the received spblAttestation. The verification process may include step of checking the validity of the signature of the second SSP included in spblAttestation. Further, the verification process may further include a process of checking whether a "bundle delimiter" included in spblAttestation matches a bundle delimiter of the corresponding bundle. Further, the verification process may optionally further include a process of checking whether some and/or all information of finalizationRequest and/or finalizationResponse included in spblAttestation matches the information transmitted by the first SSP 1710. Further, the verification process may further include a process of checking whether an "SSP identifier" included in spblAttestation is a valid identifier of the second SSP. Further, the verification process may further include a process of identifying whether instruction information included in spblAttestation is instruction information that changes the bundle state to an available state.

Further, in step 17045, the first SSP 1710 may delete the finalizationResponse.

Step of generating spblAttestation in step 17035 and/or step 17040 and/or step 17045 may be omitted, as needed.

When the attestation transmission fails in step 17020, step 17030, and/or step 17040, the corresponding attestation may be retransmitted to the counterpart device.

In this case, retransmission may be attempted as many as the preconfigured maximum number of retransmissions. Alternatively, repeated attempts may be made until it is identified that the corresponding attestation has been transmitted to the other terminal. Alternatively, according to the implementation of the terminal, the attestation may be repeatedly retransmitted until the corresponding attestation is deleted. For example, until the finalizationResponse is deleted in step 17045, the first terminal may repeatedly attempt to retransmit the finalizationResponse.

When retransmission is attempted, if the connection between the two devices is broken, the two devices may establish a new connection and then transmit and receive the corresponding attestation. In this case, the two terminals may select and/or verify a target of a newly established connection using records transmitted and received during past communication, determine what data to transmit and receive with a newly established connection target, and verify the validity and/or contents of data received from the another terminal.

In this case, retransmission may be automatically initiated by an operation inside the terminal, may be initiated by a request from an external server, or may be initiated by a user input.

Figure 18:
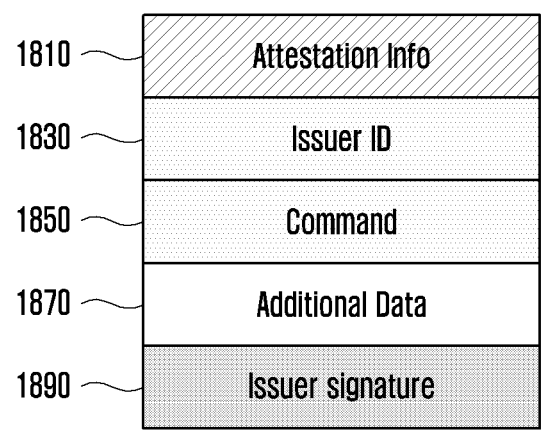
FIG. 18 is a diagram illustrating a configuration of "Attestation" according to some embodiments of the disclosure.

FIG. 18 is a diagram illustrating a configuration of "attestation" according to some embodiments of the disclosure.

According to various embodiments, the attestation may optionally include "attestation Info" (1810). Various examples of data included in the attestation information refer to a description of FIGS. 22 to 27 to be described later.

According to various embodiments, the attestation may optionally further include an "issuer ID of a subject issued the attestation" (1830). Various examples of the subject issuing the attestation refer to a description of FIGS. 22 to 27 to be described later.

According to various embodiments, the attestation may optionally further include a "command on an operation performed by an attestation issuer" (1850). Various examples of operations performed by the attestation issuer refer to a description of FIGS. 22 to 27 to be described later.

According to various embodiments, the attestation may optionally further include other data in addition to the above-described information (1870). Various examples of other data that may be included in the attestation refer to a description of FIGS. 22 to 27 to be described later.

According to various embodiments, the attestation may include digital signature data for the above-described information (1890). The signature data may be an electronic signature generated by a certificate for signing of an attestation issuer.

Figure 19:
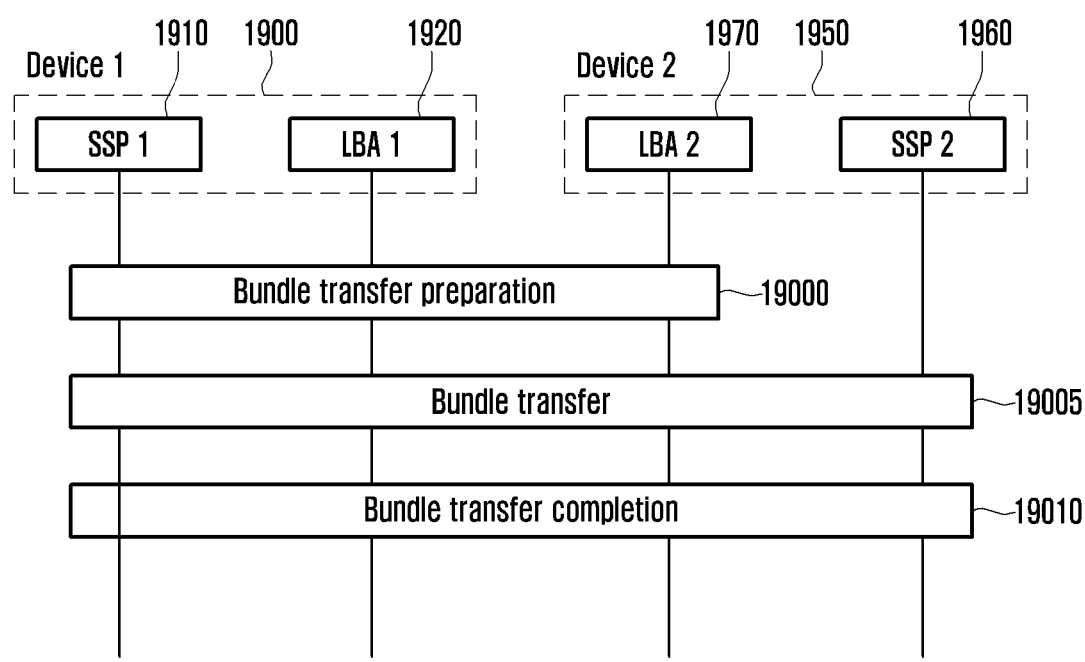
FIG. 19 is a diagram conceptually illustrating a procedure for transmitting a bundle from one terminal to another terminal according to an embodiment of the disclosure.

FIG. 19 is a diagram conceptually illustrating a procedure for transmitting a bundle from one terminal to another terminal according to an embodiment of the disclosure.

According to various embodiments, the terminal may include at least one LBA and at least one SSP. For example, as in an example of FIG. 19, a first terminal 1900 may include a first LBA 1920 and a first SSP 1910, and a second terminal 1950 may include a second LBA 1970 and a second SSP 1960. For example, the first terminal 1900 may be a terminal in which the first SSP 1910 is mounted and in which the first LBA 1920 for controlling the first SSP 1910 is installed, and the second terminal 1950 may be a terminal in which the second SSP 1960 is mounted and in which the second LBA 1970 for controlling the second SSP 1960 is installed.

With reference to FIG. 19, in step 19000, the first SSP 1910 and the first LBA 1920 of the first terminal 1900, and the second LBA 1970 of the second terminal 1950 may perform a preparation procedure (bundle transmission preparation procedure) necessary for bundle transmission. A more detailed description of the procedure refers to a detailed description of FIG. 20 to be described later.

With reference to FIG. 19, a procedure (bundle transmission procedure) for transmitting a bundle from the first terminal 1900 to the second terminal 1950 may be performed in step 19005. A more detailed description of the procedure refers to a detailed description of FIG. 21 to be described later.

With reference to FIG. 19, in step 19010, the first terminal 1900 and the second terminal 1960 may perform a procedure for installing a transmitted bundle and a procedure for configuring the bundle state (bundle transmission completion procedure). A detailed description of the procedure refers to detailed descriptions of FIGS. 22, 24 and 26 to be described later.

Figure 20:
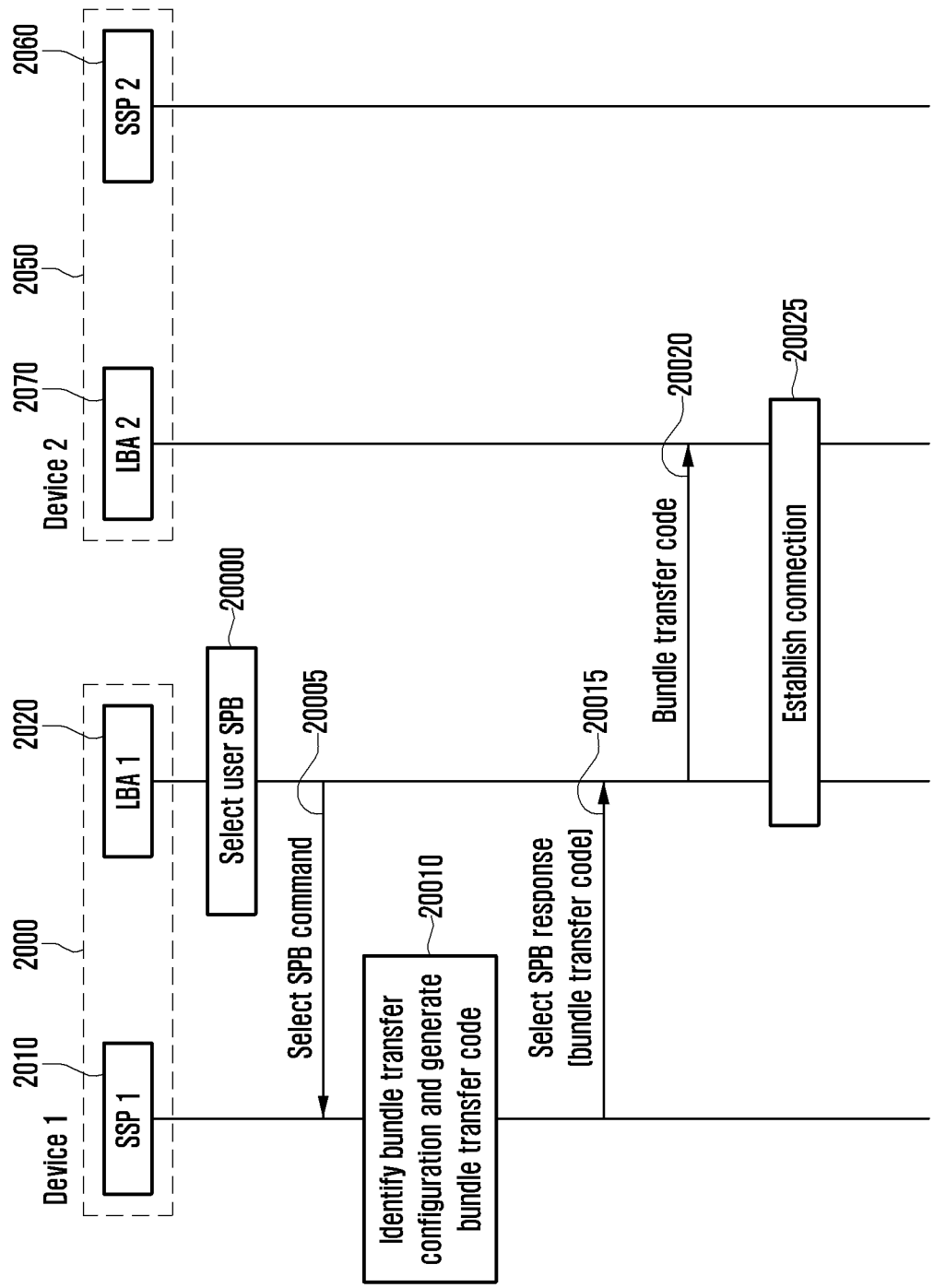
FIG. 20 is a diagram illustrating a detailed procedure of a procedure for preparing for bundle transmission among procedures presented in FIG. 19.

FIG. 20 is a diagram illustrating a detailed procedure of a procedure for preparing for bundle transmission among procedures presented in FIG. 19. More specifically, FIG. 20 is a diagram exemplarily illustrating a procedure in which one terminal undergoes a preparation process necessary for transmitting a bundle to another terminal according to an embodiment of the disclosure. In this specification, the procedure of FIG. 20 may be referred to as a bundle transmission preparation procedure.

According to various embodiments, the terminal may include at least one LBA and at least one SSP. For example, as in an example of FIG. 20, a first terminal 2000 may include a first LBA 2020 and a first SSP 2010, and a second terminal 2050 may include a second LBA 2070 and a second SSP 2060. For example, the first terminal 2000 may be a terminal in which the first SSP 2010 is mounted and in which the first LBA 2020 for controlling the first SSP 2010 is installed, and the second terminal 2050 may be a terminal in which the second SSP 2060 is mounted and in which the second LBA 2070 for controlling the second SSP 2060 is installed.

According to various embodiments, the first terminal 2000 may have a pre-installed bundle, and further have metadata associated with the bundle.

According to various embodiments, the first terminal 2000 may have at least one of a bundle identifier (SPB ID), a bundle family identifier (SPB Family ID), or a bundle family manager identifier (SPB Family Custodian Object ID) associated with a corresponding bundle.

According to various embodiments, the first terminal 2000 may have a "bundle transfer configuration" in association with a corresponding bundle. The bundle transfer configuration may optionally include information related to whether the bundle may be transmitted between devices.

Further, the bundle transfer configuration may optionally further include a "registration configuration" for a process of registering the transmission result of the bundle between devices in the server. Various examples of possible "registration configurations" are as follows.

Whether a notification is required: a configuration on whether to notify the server of the bundle transmission result between devices Whether a pre-notification is required: after the bundle is transmitted from one device to a new device, before the bundle is used in a new device, a configuration on whether a transmission hi story should be notified to the server or whether a transmission hi story may be used in a new device before it is notified to the server Whether encryption of the notification content is required: a configuration on whether data transmitted in a process of a notification needs to be encrypted so that only a server receiving the notification and an SSP making a notification may view the content The "registration configuration" may be configured by a service provider, configured by a bundle management server, or configured by collaboration between the service provider and the bundle management server. Further, the bundle transfer configuration may be included as data inside the bundle, be included in metadata of the bundle, or may exist as independent data. Further, the bundle transfer configuration may include an electronic signature of a service provider and/or a bundle management server.

With reference to FIG. 20, in step 20000, information on a bundle to be transmitted between devices may be transferred to the first LBA 2020. The transfer process, for example, as illustrated in FIG. 20, may be performed through a process in which the user directly selects a bundle through a UI provided by the first terminal 2000 or may be input from a remote server to the first LBA 2020 through a push input, or the first LBA 2020 may access the remote server to read the corresponding information.

With reference to FIG. 20, in step 20005, information related to the bundle selected through step 20000 may be transferred from the first LBA 2020 to the first SSP 2010. For example, as illustrated in FIG. 20, information related to the selected bundle may be transferred from the first LBA 2020 to the first SSP 2010 through a select SPB command. In this case, the information transferred from the first LBA 2020 to the first SSP 2010 may include information for identifying the bundle selected in step 20000.

With reference to FIG. 20, in step 20010, the first SSP 2010 may identify whether a bundle in which transmission is requested may be transmitted between devices. The process may be performed by identifying a bundle in which transmission is requested based on the information received in step 20005, and identifying a "bundle transfer configuration" associated with the bundle.

Further, in step 20010, the first SSP 2010 may optionally configure a "bundle transfer code". The "bundle transfer code" is a code used for referring to the bundle in the process of transmitting the bundle between devices, and should be a value that can identify the bundle. The first SSP 2010 may bind the above-described "bundle transfer code" and information of a bundle to be transmitted.

With reference to FIG. 20, in step 20015, a response result to step 20005 may be transmitted from the first SSP 2010 to the first LBA 2020. For example, as illustrated in FIG. 20, a response to the select SPB command may be transferred from the first SPB 2010 to the first LBA 2020 through the select SPB response. The response value may include a "bundle transfer code" described in step 20010.

With reference to FIG. 20, in step 20020, information necessary for bundle transmission between devices may be transferred from the first LBA 2020 of the first terminal 2000 to the second LBA 2070 of the second terminal 2050. In this case, information transferred from the first LBA 2020 to the second LBA 2070 may include a "bundle transfer code". Further, information transferred from the first LBA 2020 to the second LBA 2070 may optionally further include information necessary for a connection to be established between the first LBA 720 and the second LBA 2070 in future step 20025.

Information transferred from the first LBA 2020 to the second LBA 2070 through the above-described step 20020 may be transferred in various ways. For example, the first LBA may provide information to be transferred to the second LBA to the user through an UI of the first terminal 2000, and the user may input the received information to the second LBA using an UI of the second terminal 2050. Alternatively, the first LBA may make information to be transferred to the second LBA in the form of an image (e.g., QR code) to display the image on a screen of the first terminal, and the user may scan the image using the second terminal 2050 to transfer information to the second LBA 2070. However, a method of transferring information from the first LBA 2020 to the second LBA 2070 is not limited to the above methods.

With reference to FIG. 20, in step 20025, a connection may be established (or configured) between the first LBA 2020 and the second LBA 2070. When information necessary for connection has been transmitted in step 20020, the first LBA 2020 and the second LBA 2070 may establish a connection using the information. The connection between the first LBA 2020 and the second LBA 2070 may be a direct device-to-device connection (e.g., NFC, Bluetooth, UWB, WiFi-Direct, LTE device-to-device (D2D), 5G D2D) or may be a remote connection in which a remote server (e.g., relay server) is positioned between the first LBA 2020 and the second LBA 2070.

With reference to FIG. 20, although step 20025 is illustrated as the last step, the step is independent of the above-described other steps, i.e., steps 20000, 20005, 20010, 20015, and 20020, and may be performed regardless of the order of other steps. For example, step 20025 may be performed between steps 20015 and 20020, and in this case, information transmitted from the first LBA 2020 to the second LBA 2070 in step 20020 may be transmitted through the connection established in step 20025.

Figure 21:
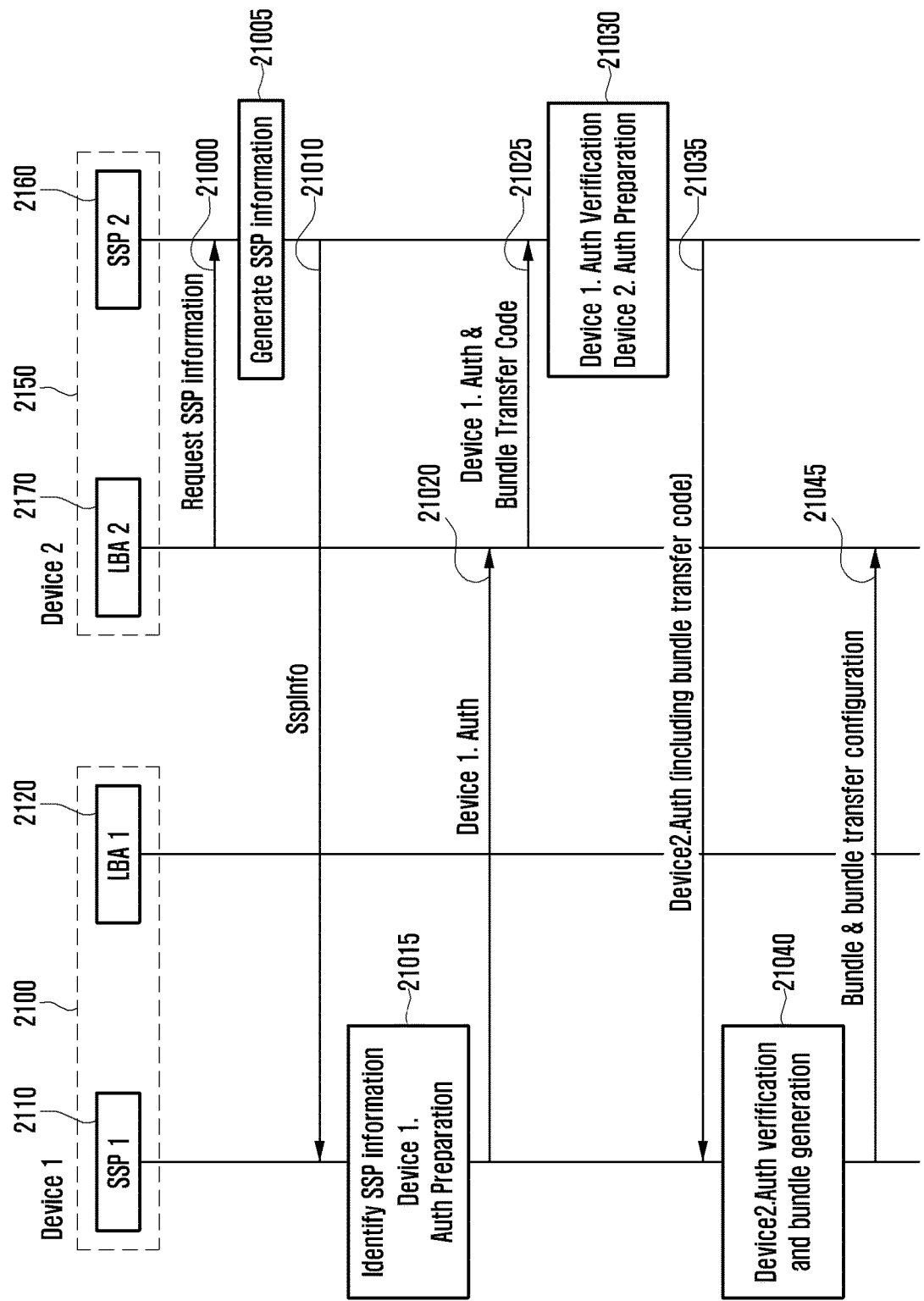
FIG. 21 is a diagram illustrating a detailed procedure of a procedure in which a bundle is transmitted among procedures presented in FIG. 19.

FIG. 21 is a diagram illustrating a detailed procedure of a procedure in which a bundle is transmitted among procedures presented in FIG. 19. More specifically, FIG. 21 is a diagram exemplarily illustrating a procedure in which one terminal transmits a bundle to another terminal according to an embodiment of the disclosure. In the disclosure, the procedure of FIG. 21 may be referred to as a bundle transmission procedure.

According to various embodiments, the terminal may include at least one LBA and at least one SSP. For example, as in an example of FIG. 21, a first terminal 2100 may include a first LBA 2120 and a first SSP 2110, and a second terminal 2150 may include a second LBA 2170 and a second SSP 2160. For example, the first terminal 2100 may be a terminal in which the first SSP 2110 is mounted and in which the first LBA 2120 for controlling the first SSP 2110 is installed, and the second terminal 2150 may be a terminal in which the second SSP 2160 is mounted and in which the second LBA 2170 for controlling the second SSP 2160 is installed.

With reference to FIG. 21, in step 21000, the second LBA 2170 may request "Sspinfo" to the second SSP 2160. When the second LBA 2170 requests "Sspinfo" to the second SSP 2160 in step 21000, the second LBA 2170 may notify the second SSP 2160 that a bundle transfer between devices will be performed.

Further, step 21000 may be automatically performed immediately following the process described with reference to FIG. 21, or may be performed after receiving an external input. In this case, the "external input" may be performed through a process in which the user directly selects a bundle to receive through a UI provided by the second terminal 2150 or may be input from a remote server to the second LBA 2170 through a push input, or the second LBA 2170 may access the remote server to read the corresponding information.

With reference to FIG. 21, in step 21005, the second SSP 2160 may generate "Sspinfo" thereof. The "SspInfo" may include information on the second SSP to be provided for bundle transmission. In this case, the "SspInfo" may include information (certificate negotiation information) for a certificate negotiation process that the second SSP 2160 should undergo before receiving the bundle. The "certificate negotiation information" may include certificate information (SenderSpblVerification) that the second SSP 2160 may use for verifying another SSP and certificate information (ReceiverSpblVerification) that may be used by the other SSP to verify itself. Further, the "certificate negotiation information" may optionally further include a list of key agreement algorithms supported by the second SSP 2160, and optionally further include a list of encryption algorithms supported by the second SSP 2160. Further, "SspInfo" may optionally further include SSP version information including at least one of version information of a standard specification supported by the primary platform and the loader included in the second SSP 2160.

With reference to FIG. 21, in step 21010, the second SSP 2160 may transfer the "SspInfo" generated in step 21005 to the first SSP 2110 via the second LBA 2170 and the first LBA 2120.

According to steps 21000 and 21010 described above, the second LBA 2170 may request "SspInfo" to the second SSP 2160, and the second SSP 2160 may generate "SspInfo" thereof and then transfer "SspInfo" to the first SSP 2110 via the second LBA 2170 and the first LBA 2120. However, according to an embodiment, a process of transferring "SspInfo" from the second terminal 2150 to the first terminal 2100 may be as follows. For example, after the second LBA 2170 generates "SspInfo" by itself, the second LBA 2170 may transfer "SspInfo" to the first SSP 2110 via the first LBA 2120.

With reference to FIG. 21, in step 21015, the first SSP 2110 may identify the received "SspInfo" and generate "first terminal authentication information (Device1.Auth)" capable of authenticating itself based on the information. A more detailed procedure for this process is as follows.

The first SSP 2110 may identify certificate information capable of verifying itself using the received "SenderSpblVerification" and select at least one key agreement certificate (ssp1.Cert.KA). Alternatively, the first SSP 2110 may generate a public key "ssp1.ePK.KA" and a private key "ssp1.eSK.KA" as a key pair for asymmetric encryption to be used for key agreement using the received "list of key agreement algorithms supported by the second SSP 2160" and then select the public key (ssp1.ePK.KA) among the key pair. Further, the first SSP 2110 may identify certificate information capable of verifying itself using the received "SenderSpblVerification" and further select at least one signing certificate (ssp1.Cert.DS).

Further, the first SSP 2110 may select at least one certificate information of the second SSP 2160 to perform verification using the received "ReceiverSpblVerification" and configure the corresponding information to "CiPkIdToBeUsed".

Further, the first SSP 2110 may select at least one encryption algorithm to be used in the future using the received "list of encryption algorithms supported by the second SSP 2160" and then configure the corresponding information to "CryptoToBeUsed".

Further, the first SSP 2110 may identify the received list of "version information of the standard specification supported by the primary platform and loader included in the second SSP 2160" and identify whether there is a version of the standard specification supported by itself among them.

"First terminal authentication information (Device1.Auth)" may include at least one of "ssp1.Cert.KA", "ssp1.ePK.KA", "CiPkIdToBeUsed", or "CryptoToBeUsed" described above. Further, the "first terminal authentication information (Device1.Auth)" may optionally further include "ssp1.Cert.DS" described above. Further, the "first terminal authentication information (Device1.Auth)" may optionally further include at least one of a bundle family identifier (SPB Family ID) or a bundle family manager identifier (SPB Family Custodian Object ID) associated with a bundle to be transmitted in the future.

In this case, part or all of the above-mentioned "first terminal authentication information (Device1.Auth)" may be a digital signature capable of being verified using ssp1.Cert.DS to ensure the integrity of the information, and the digital signature data may be added as part of "first terminal authentication information".

With reference to FIG. 21, in step 21020, the first SSP 2110 may transfer the "first terminal authentication information (Device1.Auth)" generated in step 21015 to the second LBA 2170 via the first LBA 2120.

With reference to FIG. 21, in step 21025, the second LBA 2170 may transfer "first terminal authentication information (Device1.Auth)" to the second SSP 2160. Further, the second LBA 2170 may further transfer a "bundle transfer code" to the second SSP 2160.

With reference to FIG. 21, in step 21030, the second SSP 2160 may verify the received "first terminal authentication information (Device1.Auth)". When the second SSP 2160 receives "ssp1.Cert.KA", the second SSP 2160 may identify the signature of the corresponding certificate to identify the validity of the certificate. Further, when the second SSP 2160 receives "ssp1.ePK.KA" and a digital signature thereof, the second SSP 2160 may first check the validity of ssp1.Cert.DS, and then to identify a digital signature using the certificate to identify the integrity of the received public key ssp1.ePK.KA. Further, the second SSP 2160 may identify the received "CiPkIdToBeUsed" and select at least one signing certificate (ssp2.Cert.DS) capable of verifying itself.

Further, although not illustrated in the drawing, in step 21030, the second SSP 2160 may generate a public key "ssp2.ePK.KA" and a private key "ssp2.eSK.KA" as a key pair for asymmetric encryption to be used for key agreement and then select the public key (ssp2.ePK.KA) among the key pair. Further, the second SSP 2160 may select one of ssp1.ePK.KA and the public key for key agreement included in ssp1.Cert.KA, and then generate a session key ShKey01 to be used for encryption during communication with the first terminal in the future using the value and ssp2.eSK.KA. ShKey01 should be a session key for encryption algorithm included in the received "CryptoToBeUsed".

Further, in step 21030, the second SSP 2160 may generate "second terminal authentication information (Device2.Auth)" capable of authenticating itself. In this case, "second terminal authentication information (Device2.Auth)" may include "ssp2.Cert.DS". Further, the "second terminal authentication information (Device2.Auth)" may further include "ssp2.ePK.KA". Further, the "second terminal authentication information (Device2.Auth)" may further include a transaction ID indicating a current session generated by the second SSP 2160. Further, the "second terminal authentication information (Device2.Auth)" may further include a "bundle transfer code". Further, the "second terminal authentication information (Device2.Auth)" may further include an SSP identifier of the second SSP 2160. Further, the "second terminal authentication information (Device2.Auth)" may optionally further include at least one of a bundle family identifier (SPB Family ID) or a bundle family manager identifier (SPB Family Custodian Object ID) associated with a bundle to be transmitted in the future.

In this case, part or all of the above-mentioned "second terminal authentication information (Device2.Auth)" may be a digital signature capable of being verified using ssp2.Cert.DS so as to ensure the integrity of the information, and the digital signature data may be added as part of "second terminal authentication information". Further, part or all of "second terminal authentication information (Device2.Auth)" may be encrypted using the previously generated session key ShKey01.

With reference to FIG. 21, in step 21035, the second SSP 2160 may transfer the "second terminal authentication information (Device2.Auth)" generated in step 21030 to the first SSP 2110 via the second LBA 2170 and the first LBA 2120. In this case, a "bundle transfer code" may be optionally further transmitted.

With reference to FIG. 21, in step 21040, the first SSP 2110 may verify the received "second terminal authentication information (Device2.Auth)". The first SSP 2110 may verify the signature of the received "ssp2.Cert.DS" to verify the validity of the corresponding certificate. Further, the first SSP 2110 may check whether the received bundle family identifier (SPB Family ID) and/or bundle family manager identifier (SPB Family Custodian Object ID) are/is a correctly configured value in association with the bundle to be transmitted by itself. Further, the first SSP 2110 may store the received transaction ID and/or the SSP identifier of the second SSP 2160. Further, the first SSP 2110 may bind the received transaction ID or the SSP identifier of the second SSP 2160 with a session currently in progress or a bundle to be transmitted.

In this process, when encrypted data is included in "second terminal authentication information (Device2.Auth)", the first SSP 2110 may generate a session key ShKey01 using ssp1.eSK.KA or the private key corresponding to the public key for key agreement included in ssp1.Cert.KA thereof and the received ssp2.ePK.KA, decrypt encrypted data using the session key, and then perform a verification process. Further, in this process, when the digital signature is included in the "second terminal authentication information (Device2.Auth)", the first SSP 2110 may verify the validity of the received digital signature using "ssp2.Cert.DS".

Further, in step 21040, although not illustrated in FIG. 21, the first SSP 2110 may generate a public key "ssp1.bundle.ePK.KA", and a private key "ssp1.bundle.eSK.KA" as a key pair for asymmetric encryption to be used for key agreement. In this case, the key pair "ssp1.bundle.ePK.KA and ssp1.bundle.eSK.KA" may be configured to the same value as the previously generated "ssp1.ePK.KA and ssp1.eSK.KA". Alternatively, the key pair "ssp1.bundle.ePK.KA and ssp1.bundle.eSK.KA" may be configured to the same value as the previously used "public key included in ssp1.Cert.KA and a corresponding private key". Further, the first SSP 2110 may generate a session key ShKey02 using ssp1.bundle.eSK.KA and ssp2.ePK.KA. When the "private key corresponding to the public key included in ssp1.eSK.KA or ssp1.Cert.Ka" is reused for ssp1.bundle.eSK.KA, a value of the session key ShKey02 may be also configured to the value of the previously generated ShKey01.

Further, in step 21040, the first SSP 2110 may configure a bundle to be transmitted to the second terminal 2150 and/or metadata associated with the bundle. In this case, the first SSP 2110 may identify a bundle to be transmitted by itself using the received "bundle transfer code". Further, the bundle to be configured may include "ssp1.Cert.DS". Further, the bundle to be configured may further include "ssp1.bundle.ePK.KA". Further, the bundle to be configured may further include a transaction ID for identifying a corresponding session. Further, the bundle to be configured may optionally further include at least one of a bundle identifier (SPB ID), a bundle family identifier (SPB Family ID), or a bundle family manager identifier (SPB Family Custodian Object ID) associated with the bundle to be transmitted. According to various embodiments, a "bundle transfer configuration" may be included in the bundle (or metadata associated with the bundle) configured in step 21040.

According to various embodiments, digital signature data generated using ssp1.Cert.DS may be added to the bundle to be configured in step 21040. That is, digital signature data generated for some or all of components of the bundle specified above may be added as a part of the bundle. Further, some or all of bundles to be configured may be encrypted using ShKey02.

With reference to FIG. 21, in step 21045, the first SSP 2110 may transfer the bundle generated (configured) in step 21040 to the second LBA 2170 via the first LBA 2120. In this case, metadata associated with the transmitted bundle may be selectively further transmitted. Further, a "bundle transfer configuration" associated with the transmitted bundle may be further transmitted. For example, the "bundle transfer configuration" may be transmitted in a separate format (e.g., message) without being included in the bundle or metadata.

Figure 22:
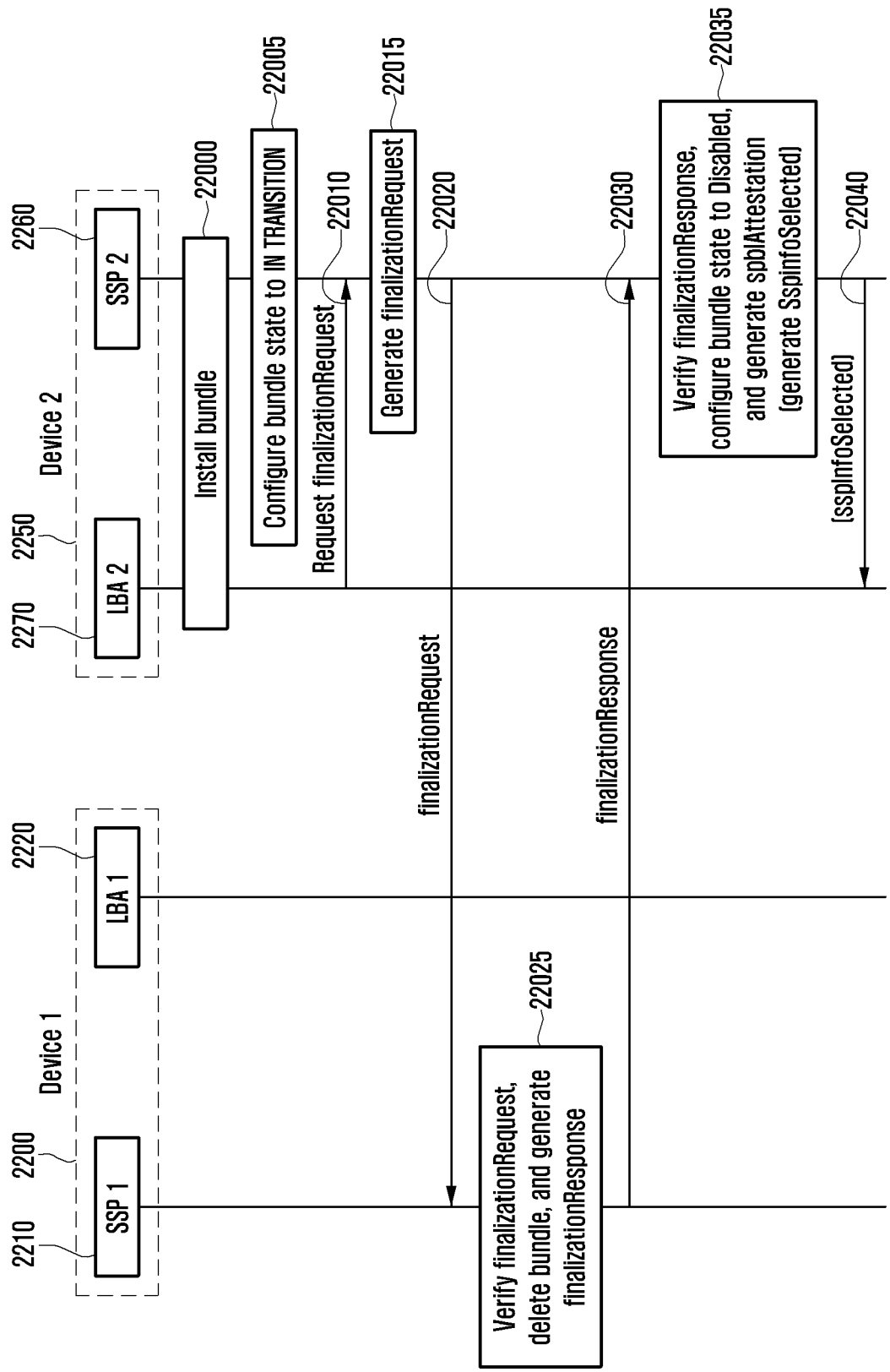
FIG. 22 is a diagram illustrating a detailed procedure of a procedure in which transmission of a bundle is completed among procedures illustrated in FIG. 19.

FIG. 22 is a diagram illustrating a detailed procedure of a procedure in which transmission of a bundle is completed among procedures illustrated in FIG. 19.

FIG. 22 illustrates a procedure applied when a transmission history of a bundle between devices is
  pre-notification is not required
   encryption of the notification content is required or not required According to various embodiments, the terminal may include at least one LBA and at least one SSP. For example, as in an example of FIG. 22, a first terminal 2200 may include a first LBA 2220 and a first SSP 2210, and a second terminal 2250 may include a second LBA 2270 and a second SSP 2260. For example, the first terminal 2200 may be a terminal in which the first SSP 2210 is mounted and in which the first LBA 2220 for controlling the first SSP 2210 is installed, and the second terminal 2250 may be a terminal in which the second SSP 2260 is mounted and in which the second LBA 2270 for controlling the second SSP 2260 is installed.

With reference to FIG. 22, the following procedures may be performed in step 22000.
1. Install the Bundle With reference to FIG. 22, in step 22000, the second LBA 2270 and the second SSP 2260 may cooperate with each other to install a bundle in the second terminal 2250. In this process, the following procedures may be performed together. When metadata is transmitted, the second LBA 2270 or the second SSP 2260 may verify the content included in the metadata. When the "bundle transfer configuration" is transmitted, the second LBA 2270 may transfer the information to the second SSP 2260. When a transaction ID is transmitted, the second LBA 2270 or the second SSP 2260 may check whether the transaction ID is the same as the transaction ID used in the current session. When at least one of a bundle identifier (SPB ID), a bundle family identifier (SPB Family ID), or a bundle family manager identifier (SPB Family Custodian Object ID) is transmitted, the second LBA 2270 or the second SSP 2260 may identify whether the information matches information of the bundle to be currently received. When ssp1.Cert.DS is transmitted, the second SSP 2260 may verify the validity of the certificate to authenticate the first SSP 2210. When the received data includes encrypted data, the second SSP 2260 may generate a session key ShKey02 using the received ssp1.bundle.ePK.KA and ssp2.eSK.KA thereof, and decrypt the encrypted data using the session key and then perform verification. When the received data includes a digital signature, the second SSP 2260 may verify ssp1.Cer.DS and then verify the validity of the digital signature using the certificate.
2. Identify "Registration Configuration"

Further, although not illustrated in the drawing, the second LBA 2270 and/or the second SSP 2260 may identify whether a "notification is required", whether a "pre-notification is required", and/or whether the notification content needs to be encrypted using the "registration configuration" of the bundle. This process is part of step 22000 and may be performed independently of regardless of the order of other procedures performed in step 22000. Alternatively, after step 22000, before step 22035 is completed, the process may be performed at a moment when a determination is required. A procedure to be described later in the drawing may be a procedure to be applied when, as a result of identifying the "registration configuration", a transmission history of the bundle between devices does not need to be pre-notified.

With reference to FIG. 22, in step 22005, the second SSP 2260 may configure the bundle state to "IN TRANSITION". "IN TRANSITION" means a state that the bundle has been successfully installed but is not yet available (also, a state that may be changed to an available state (disabled, enable, active state) only by an "additional operation to be described later in this drawing" and/or an additional operation such as a "request from an external server (although not described in the disclosure)").

With reference to FIG. 22, in step 22010, the second LBA 2270 may request an "attestation" to the second SSP 2260.

With reference to FIG. 22, in step 22015, the second SSP 2260 may generate an "attestation". In FIG. 22, the attestation may be referred to as a finalizationRequest. A structure of the attestation may follow the structure disclosed in FIG. 18.

In this case, one example of a possible attestation configuration is as follows.
  The finalizationRequest may include a "bundle delimiter" of the corresponding bundle in 1810 of FIG. 18.
  The finalizationRequest may include an "SSP identifier" of the second SSP in 1830 of FIG. 18.
  The finalizationRequest may include information indicating that the second SSP configured the bundle state to the "IN TRANSITION" state in 1850 of FIG. 18.
  The finalizationRequest may optionally include a time in which the second SSP changed the bundle state to the "IN TRANSITION" state or a time in which the attestation was generated in 1870 of FIG. 18. Alternatively, the finalizationRequest may include information on a certificate for signing used for an electronic signature to be described later, and information on a certificate chain related thereto.
  The finalizationRequest may include signature information of the second SSP in 1890 of FIG. 18. The signature may be signature information obtained by digitally signing the above-described information with a signing certificate of the second SSP.

With reference to FIG. 22, in step 22020, the second SSP 2260 may transfer a finalizationRequest to the first SSP

2210. For example, the second SSP 2260 may transfer the finalizationRequestto the first SSP 2210 through the following process. That is, the second SSP 2260 may transfer the finalizationRequest to the second LBA 2270 in response to step 22010, and the second LBA 2270 may transfer the finalizationRequest to the first SSP 2210 via the first LBA 2220.

With reference to FIG. 22, in step 22025, the first SSP 2210 may verify the received finalizationRequest. The verification process may include step of checking the validity of the signature of the second SSP included in the finalizationRequest. Further, the verification process may further include a process of checking whether a "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to the "IN TRANSITION" state.

Further, in step 22025, the first SSP 2210 may delete the bundle after verification is completed.

Further, in step 22025, the first SSP 2210 may generate an "attestation". In FIG. 22, the attestation may be referred to as a finalizationResponse. A structure of the attestation may follow the structure disclosed in FIG. 18.

In this case, one example of a possible attestation configuration is as follows.

The finalizationResponse may include a "bundle delimiter" of the corresponding bundle in 1810 of FIG. 18. Alternatively, the finalizationResponse may include part and/or all data of the finalizationRequest received in the previous step.

The finalizationResponse may include an "SSP identifier" of the first SSP in 1830 of FIG. 18.

The finalizationResponse may include information indicating that the first SSP has deleted the bundle in 1850 of FIG. 18.

The finalizationResponse may optionally include a time in which the first SSP deleted the bundle or a time in which the attestation was generated in 1870 of FIG. 18. Alternatively, the finalizationResponse may include information on a certificate for signing used for an electronic signature to be described later, and information on a certificate chain related thereto.

The finalizationResponse may include signature information of the first SSP in 1890 of FIG. 18. The signature may be signature information obtained by digitally signing the above-described information with a signing certificate of the first SSP.

With reference to FIG. 22, in step 22030, the first SSP 2210 may transfer a finalizationResponse to the second SSP 2260. For example, the first SSP 2210 may transfer a finalizationResponse to the second SSP 2260 via the first LBA 2220 and the second LBA 2270.

With reference to FIG. 22, in step 22035, the second SSP 2260 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may include a process of checking whether part or all data of the finalizationRequest included in the finalizationResponse matches the information that has transmitted by the second SSP 2260. Further, the verification process may further include a process of identifying an "SSP identifier" included in the finalizationResponse. The verification process may further include a process of identifying whether instruction information included in the finalizationResponse is instruction information that deletes the bundle.

Further, in step 22035, the second SSP 2260 may change the bundle state to one of available states (one of disabled, enable, and active) after verification is completed. For example, as illustrated in the drawing, the second SSP 2260 may convert the bundle state to the disabled state.

Further, in step 22035, the second SSP 2260 may generate an "attestation". In FIG. 22, the attestation may be referred to as spblAttestation. A structure of the attestation may follow the structure disclosed in FIG. 18.

In this case, one example of a possible attestation configuration is as follows.

The spblAttestation may include a "bundle delimiter" of the corresponding bundle in 1810 of FIG. 18. Alternatively, the spblAttestation may include part and/or all data of finalizationRequest and/or finalizationResponse.

The spblAttestation may include an "SSP identifier" of the second SSP in 1830 of FIG. 18.

The spblAttestation may include information indicating that the second SSP has changed the bundle state to one of available states in 1850 of FIG. 18.

The spblAttestation may optionally include a time in which the second SSP changed the bundle state to one of available states or a time in which the attestation was generated in 1870 of FIG. 18. Alternatively, the spblAttestation may include information on a certificate for signing used for an electronic signature to be described later, and information on a certificate chain related thereto.

The spblAttestation may include signature information of the second SSP in 1890 of FIG. 18. The signature may be signature information obtained by digitally signing the above-described information with a signing certificate of the second SSP.

Further, in step 22035, the second SSP 2260 may generate "selected SSP information (sspInforSelected)" thereof. The "selected SSP information" may include information on the second SSP to be provided in order to notify the server of the result of bundle transmission between devices.

In this case, "selected SSP information" may include information for a certificate negotiation process (certificate negotiation information). The "certificate negotiation information" may optionally include information such as certificate information that the second SSP 2260 may use for verifying the server (spbmVerification)

certificate information that the server may use for verifying the first SSP 2210 (SenderSpblVerification)

certificate information that the server may use for verifying the second SSP 2260 (ReceiverSpblVerification)

Further, the "certificate negotiation information" may optionally further include a list of key agreement algorithms supported by the second SSP 2260, and optionally further include a list of encryption algorithms supported by the second SSP 2260.

Further, the "selected SSP information" may optionally further include SSP version information including at least one of the version information of the standard specification supported by the primary platform and the loader included in the second SSP 2260.

With reference to FIG. 22, in step 22040, the second SSP 2260 may transmit a result (e.g., whether success or failure) of the operation performed in step 22035 to the second LBA 2270. Further, the "selected SSP information" generated in step 22035 may be transmitted together.

A process of generating "selected SSP information" in step 22035 and a process of transferring "selected SSP information" in step 22040 may be omitted.

Figure 23:
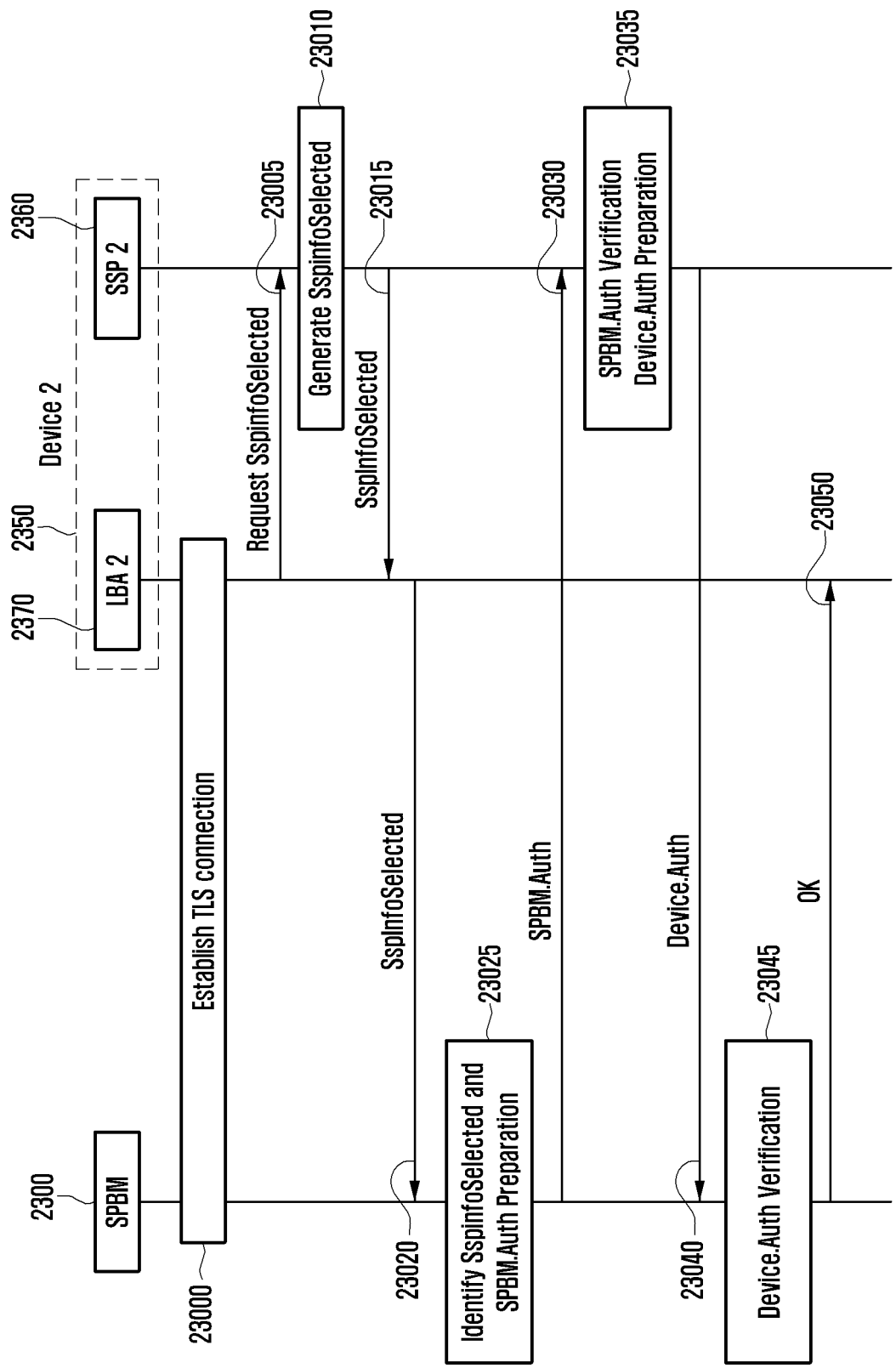
FIG. 23 is a diagram illustrating a procedure in which a bundle transmission result is registered in a server after the procedure presented in FIG. 22.

FIG. 23 is a diagram illustrating a procedure in which a bundle transmission result is registered in a server after the procedure presented in FIG. 22.

According to various embodiments, the terminal may include at least one LBA and at least one SSP. For example, as in an example of FIG. 23, a second terminal 2350 may include a second LBA 2370 and a second SSP 2360. For example, the second terminal 2350 may be a terminal in which the second SSP 2360 is mounted and in which the second LBA 2370 for controlling the second SSP 2360 is installed.

Further, according to various embodiments, a server 2300 may be a server operated by a service provider, a bundle management server, a server operated by collaboration between the service provider and the bundle management server, or any server operated in association with the service provider and/or the bundle management server. In the description of the drawing, although the term SPBM, which is one of possible examples of a server, is sometimes used for referring to the server 2300, the type of the server is not limited to SPBM, as described above.

With reference to FIG. 23, in step 23000, a transport layer security (TLS) connection may be established between the SPBM 2300 and the LBA 2370. Although it is described with reference to the drawing that step 23000 is performed before steps 23005 to 23015, step 23000 may be performed independently of steps 23005 to 23015 before step 23020 is performed. For example, step 23000 may be performed between steps 23015 and 23020.

With reference to FIG. 23, in step 23005, the second LBA 2370 may request "selected SSP information (SspInfoSelected)" to the second SSP 2360. In this case, step 23005 may be performed automatically or may be performed after receiving an external input. In this case, the "external input" may be given from the user through a UI provided by the second terminal 2350 or may be given from a remote server to the second terminal 2350 through a push input.

With reference to FIG. 23, in step 23010, the second SSP 2360 may generate "selected SSP information" thereof. A description of "selected SSP information" refers to the description described with reference to FIG. 22.

With reference to FIG. 23, in step 23015, the second SSP 2360 may transmit "selected SSP information" generated in step 23010 to the second LBA 2370.

Steps 23005 to 23015 may not be selectively performed.

With reference to FIG. 23, in step 23020, the second LBA 2370 may transmit "selected SSP information" to the server 2300. When the second LBA 2370 has received "selected SSP information" through steps 22035 to 22040 of FIG. 22, or "selected SSP information" through steps 23005 to 23015 of FIG. 23, the second LBA 2370 may transmit the received "selected SSP information" to the server 2300. When the second LBA 2370 has not received the "selected SSP information", the second LBA 2370 may generate "selected SSP information" and transmit the SSP information to the server 2300.

With reference to FIG. 23, in step 23025, the server 2300 may identify the received "selected SSP information" and generate "server authentication information (SPBM.Auth)" capable of authenticating itself based on the information. A more detailed procedure for the process is as follows.

The server 2300 may identify certificate information capable of verifying itself using the received "spbmVerification" and select at least one key agreement certificate (spbm.Cert.KA). Alternatively, the server 2300 may generate a public key "spbm.ePK.KA" and a private key "spbm.eSK.KA" as a key pair for asymmetric encryption to be used for key agreement using the received "list of key agreement algorithms supported by the second SSP 2360" and then select the public key (spbm.ePK.KA) among the key pair. Further, the server 2300 may identify certificate information capable of verifying by itself using the received "spbmVerification" and further select at least one signing certificate (spbm.Cert.DS).

Further, the server 2300 may identify whether certificate information of the first SSP 2210 to perform verification is verifiable by itself using the received "SenderSpblVerification". The process may not be selectively performed.

Further, the server 2300 may identify whether certificate information of the second SSP 2360 to perform verification is verifiable by itself using the received "ReceiverSpblVerification". Alternatively, the server 2300 may select at least one certificate information of the second SSP 2360 capable of be verified by itself using "ReceiverSpblVerification", and then configure the corresponding information to "CiPkIdToBeUsed".

Further, the server 2300 may select at least one encryption algorithm to be used in the future using the received "list of encryption algorithms supported by the second SSP 2360" and configure corresponding information to "CryptoToBeUsed".

Further, the server 2300 may identify the received list of "version information of the standard specification supported by the primary platform and the loader included in the second SSP 2360", and identify whether there is a version of the standard specification supported by itself among them.

"Server authentication information (SPBM.Auth)" may include at least one of "spbm.Cert.KA", "spbm.ePK.KA", "CiPkIdToBeUsed", or "CryptoToBeUsed" described above. Further, "server authentication information (SPBM.Auth)" may optionally further include "spbm.Cert.DS" described above.

In this case, part or all of the above-mentioned "server authentication information (SPBM.Auth)" may be digitally signed so that it may be verified using spbm.Cert.DS so as to ensure the integrity of the information, and digital signature data may be added as part of "server authentication information".

With reference to FIG. 23, in step 23030, the server 2300 may transfer "server authentication information (SPBM.Auth)" generated in step 23025 to the second SSP 2360 via the second LBA 2370.

With reference to FIG. 23, in step 23035, the second SSP 2360 may verify the received "server authentication information (SPBM.Auth)". When the second SSP 2360 receives "spbm.Cert.KA", the second SSP 2360 may identify the signature of the corresponding certificate to identify the validity of the certificate. Further, when the second SSP 2360 receives "spbm.Cert.DS", the second SSP 2360 may identify the signature of the corresponding certificate to identify the validity of the certificate. Further, when the second SSP 2360 receives "spbm.ePK.KA" and a digital signature thereof, the second SSP 2360 may identify the digital signature using spbm.Cert.DS to identify the integrity of the received public key spbm.ePK.KA. Further, when receiving "CiPkIdToBeUsed", the second SSP 2360 may identify "CiPkIdToBeUsed" to select at least one signature certificate (ssp2.Cert.DS) capable of verifying itself.

Further, although not illustrated in the drawing, in step 23035, the second SSP 2360 may generate a public key "ssp2.ePK.KA" and a private key "ssp2.eSK.KA" as a key pair for asymmetric encryption to be used for key agreement and then select the public key (ssp2.ePK.KA) among the key pair. Further, the second SSP 2360 may select one of spbm.ePK.KA or the public key for key agreement included in spbm.Cert.KA, and then generate a session key ShKey03 to be used for encryption during communication with the server in the future using the value and ssp2.eSK.KA. ShKey03 should be a session key for encryption algorithm included in the received "CryptoToBeUsed".

Further, in step 23035, the second SSP 2360 may generate "terminal authentication information (Device.Auth)" capable of authenticating itself. In this case, "terminal authentication information (Device.Auth)" may include "ssp2.Cert.DS". Further, the "terminal authentication information (Device.Auth)" may optionally further include "ssp1.Cert.DS". Further, "terminal authentication information (Device.Auth)" may further include certificate chain information associated with "ssp2.Cert.DS" and/or "ssp1.Cert.DS". Further, "terminal authentication information (Device.Auth)" may include part and/or all of spblAttestation. Further, "terminal authentication information (Device.Auth)" may include part and/or all of the finalizationRequest. Further, "terminal authentication information (Device.Auth)" may include part and/or all of the finalizationResponse. Further, the "terminal authentication information (Device.Auth)" may further include "ssp2.ePK.KA".

In this case, some or all of the above-mentioned "terminal authentication information (Device.Auth)" may be digitally signed so that it may be verified using ssp2.Cert.DS so as to ensure the integrity of the information, and digital signature data may be added as part of "terminal authentication information". Further, part or all of "terminal authentication information (Device.Auth)" may be encrypted using the previously generated session key ShKey03.

With reference to FIG. 23, in step 23040, the second SSP 2360 may transfer the "terminal authentication information (Device.Auth)" generated in step 23035 to the server 2300 via the second LBA 2370.

With reference to FIG. 23, in step 23045, the server 2300 may verify the received "terminal authentication information (Device.Auth)". A specific procedure of the verification process is as follows. The server 2300 may verify the received signature of "ssp1.Cert.DS" and/or "ssp2.Cert.DS" to verify the validity of the corresponding certificate. Further, the server 2300 may verify the signature of the received spblAttestation, finalizationRequest, and/or finalizationResponse. Further, the server 2300 may verify contents of the received spblAttestation, finalizationRequest, and/or finalizationResponse. Further, the server 2300 may update the details of bundles transmitted between devices based on the verified contents. For example, the server 2300 may update a mapping relationship that has existed between the bundle and the first SSP 2210 to a mapping relationship between the bundle and the second SSP 2360.

In this process, when encrypted data is included in the "terminal authentication information (Device.Auth)", the server 2300 may generate a session key ShKey03 using spbm.eSK.KA or the private key corresponding to the public key for key agreement included in the received ssp2.ePK.KA and spbm.Cert.KA thereof, decrypt encrypted data using the session key, and then perform a verification process.

With reference to FIG. 23, in step 23050, the server 2300 may transmit a result (e.g., whether success or failure) of the operation performed in step 23045 to the second LBA 2370.

Figure 24:
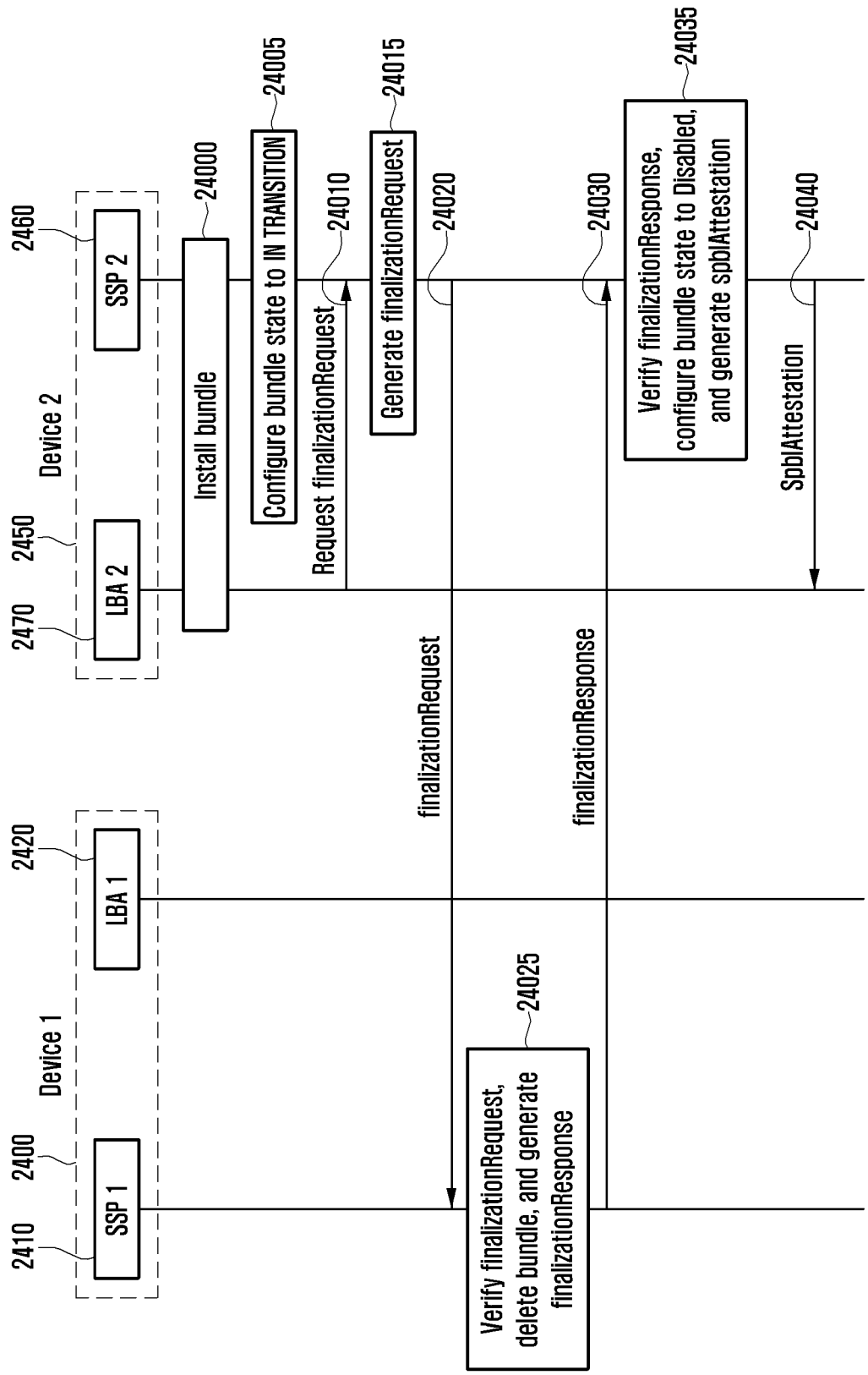
FIG. 24 is a diagram illustrating another detailed procedure of a procedure in which transmission of a bundle is completed among procedures illustrated in FIG. 19.

FIG. 24 is a diagram illustrating another detailed procedure of a procedure in which transmission of a bundle is completed among procedures presented in FIG. 19.

FIG. 24 illustrates a procedure applied when a transmission history of a bundle between devices is
pre-notification is not required and
encryption of the notification content is not required.

According to various embodiments, the terminal may include at least one LBA and at least one SSP. For example, as in an example of FIG. 24, a first terminal 2400 may include a first LBA 2420 and a first SSP 2410, and a second terminal 2450 may include a second LBA 2470 and a second SSP 2460. For example, the first terminal 2400 may be a terminal in which the first SSP 2410 is mounted and in which the first LBA 2420 for controlling the first SSP 2410 is installed, and the second terminal 2450 may be a terminal in which the second SSP 2460 is mounted and in which the second LBA 2470 for controlling the second SSP 2460 is installed.

With reference to FIG. 24, the following procedures may be performed in step 24000.
1. Install the Bundle With reference to FIG. 24, in step 24000, the second LBA 2470 and the second SSP 2460 may cooperate with each other to install a bundle in the second terminal 2450. In this process, the following procedures may be performed together. When metadata is transmitted, the second LBA 2470 or the second SSP 2460 may verify the content included in the metadata. When the "bundle transfer configuration" is transmitted, the second LBA 2470 may transfer the information to the second SSP 2460. When a transaction ID is transmitted, the second LBA 2470 or the second SSP 2460 may check whether the transaction ID is the same as the transaction ID used in the current session. When at least one of a bundle identifier (SPB ID), a bundle family identifier (SPB Family ID), or a bundle family manager identifier (SPB Family Custodian Object ID) is transmitted, the second LBA 2470 or the second SSP 2460 may identify whether the information matches information of the bundle to be currently received. When ssp1.Cert.DS is transmitted, the second SSP 2460 may verify the validity of the certificate to authenticate the first SSP 2410. When the received data includes encrypted data, the second SSP 2460 may generate a session key ShKey02 using the received ssp1.bundle.ePK.KA and ssp2.eSK.KA thereof, decrypt the encrypted data using the session key, and then perform verification. When the received data includes a digital signature, the second SSP 2460 may verify ssp1.Cer.DS and then verify the validity of the digital signature using the certificate.
2. Identify "Registration Configuration"

Further, although not illustrated in the drawing, the second LBA 2470 and/or the second SSP 2460 may identify whether a "notification is required", whether a "pre-notification is required", and/or whether the notification content needs to be encrypted using the "registration configuration" of the bundle. This process is part of step 24000 and may be performed independently of regardless of the order of other procedures performed in step 24000. Alternatively, after step 24000, before step 24035 is completed, the process may be performed at a moment when a determination is required. A procedure to be described later in the drawing may be a procedure to be applied when, as a result of identifying a "registration configuration", a transmission history of the bundle between devices does not need to be pre-notified and the notification content does not need to be encrypted.

With reference to FIG. 24, in step 24005, the second SSP 2460 may configure the bundle state to "IN TRANSITION". "IN TRANSITION" means a state that the bundle has been successfully installed but is not yet available (also, a state that may be changed to an available state (disabled, enable, active state) only by an "additional operation to be described later in this drawing" and/or an additional operation such as a "request from an external server (although not described in the disclosure)").

With reference to FIG. 24, in step 24010, the second LBA 2470 may request an "attestation" to the second SSP 2460.

With reference to FIG. 24, in step 24015, the second SSP 2460 may generate an "attestation". In FIG. 24, the attestation may be referred to as a finalizationRequest. A structure of the attestation may follow the structure disclosed in FIG. 18.

In this case, one example of a possible attestation configuration is as follows.
- The finalizationRequest may include a "bundle delimiter" of the corresponding bundle in 1810 of FIG. 18.
- The finalizationRequest may include an "SSP identifier" of the second SSP in 1830 of FIG. 18.
- The finalizationRequest may include information indicating that the second SSP configured the bundle state to the "IN TRANSITION" state in 1850 of FIG. 18.
- The finalizationRequest may optionally include a time in which the second SSP changed the bundle state to the "IN TRANSITION" state or a time in which the attestation was generated in 1870 of FIG. 18. Alternatively, the finalizationRequest may include information on a certificate for signing used for an electronic signature to be described later, and information on a certificate chain related thereto.
- The finalizationRequest may include signature information of the second SSP in 1890 of FIG. 18. The signature may be signature information obtained by digitally signing the above-described information with a signing certificate of the second SSP.

With reference to FIG. 2, in step 24020, the second SSP 2460 may transfer a finalizationRequest to the first SSP 2410. For example, the second SSP 2460 may transfer the finalizationRequestto the first SSP 2410 through the following process. That is, the second SSP 2460 may transfer the finalizationRequest to the second LBA 2470 in response to step 24010, and the second LBA 2470 may transfer the finalizationRequest to the first SSP 2410 via the first LBA 2420.

With reference to FIG. 24, in step 24025, the first SSP 2410 may verify the received finalizationRequest. The verification process may include step of checking the validity of the signature of the second SSP included in the finalizationRequest. Further, the verification process may further include a process of checking whether a "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to the "IN TRANSITION" state.

Further, in step 24025, the first SSP 2410 may delete the bundle after verification is completed.

Further, in step 24025, the first SSP 2410 may generate an "attestation". In FIG. 24, the attestation may be referred to as a finalizationResponse. A structure of the attestation may follow the structure disclosed in FIG. 18.

In this case, one example of a possible attestation configuration is as follows.
- The finalizationResponse may include a "bundle delimiter" of the corresponding bundle in 1810 of FIG. 18. Alternatively, the finalizationResponse may include part and/or all data of the finalizationRequest received in the previous step.
- The finalizationResponse may include an "SSP identifier" of the first SSP in 1830 of FIG. 18.
- The finalizationResponse may include information indicating that the first SSP has deleted the bundle at 1850 of FIG. 18.
- The finalizationResponse may optionally include a time in which the first SSP deleted the bundle or a time in which the attestation was generated in 1870 of FIG. 18. Alternatively, the finalizationResponse may include information on a certificate for signing used for an electronic signature to be described later, and information on a certificate chain related thereto.
- The finalizationResponse may include signature information of the first SSP in 1890 of FIG. 18. The signature may be signature information obtained by digitally signing the above-described information with a signing certificate of the first SSP.

With reference to FIG. 24, in step 24030, the first SSP 2410 may transfer a finalizationResponse to the second SSP 2460. For example, the first SSP 2410 may transfer a finalizationResponse to the second SSP 2460 via the first LBA 2420 and the second LBA 2470.

With reference to FIG. 24, in step 24035, the second SSP 2460 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may include a process of checking whether part or all data of the finalizationRequest included in the finalizationResponse matches the information that has transmitted by itself. Further, the verification process may further include a process of identifying an "SSP identifier" included in the finalizationResponse. Further, the verification process may further include a process of identifying whether instruction information included in the finalizationResponse is instruction information that deletes the bundle.

Further, in step 24035, the second SSP 2460 may change the bundle state to one of available states (one of disabled, enable, and active) after verification is completed. For example, as illustrated in the drawing, the second SSP 2460 may convert the bundle state to the disabled state.

Further, in step 24035, the second SSP 2460 may generate an "attestation". In FIG. 24, the attestation may be referred to as spblAttestation. A structure of the attestation may follow the structure disclosed in FIG. 18.

In this case, one example of a possible attestation configuration is as follows.
- The spblAttestation may include a "bundle delimiter" of the corresponding bundle in 1810 of FIG. 18. Alternatively, the spblAttestation may include part and/or all data of the finalizationRequest and/or the finalizationResponse.

The spblAttestation may include an "SSP identifier" of the second SSP in 1830 of FIG. 18.

The spblAttestation may include information indicating that the second SSP has changed the bundle state to one of available states in 1850 of FIG. 18.

The spblAttestation may optionally include a time in which the second SSP changed the bundle state to one of available states or a time in which the attestation was generated in 1870 of FIG. 18. Alternatively, the spblAttestation may include information on a certificate for signing used for an electronic signature to be described later, and information on a certificate chain related thereto.

The spblAttestation may include signature information of the second SSP in 1890 of FIG. 18. The signature may be signature information obtained by digitally signing the above-described information with a signing certificate of the second SSP.

With reference to FIG. 24, in step 24040, the second SSP 2460 may transmit the spblAttestation generated in step 24035.

Figure 25:
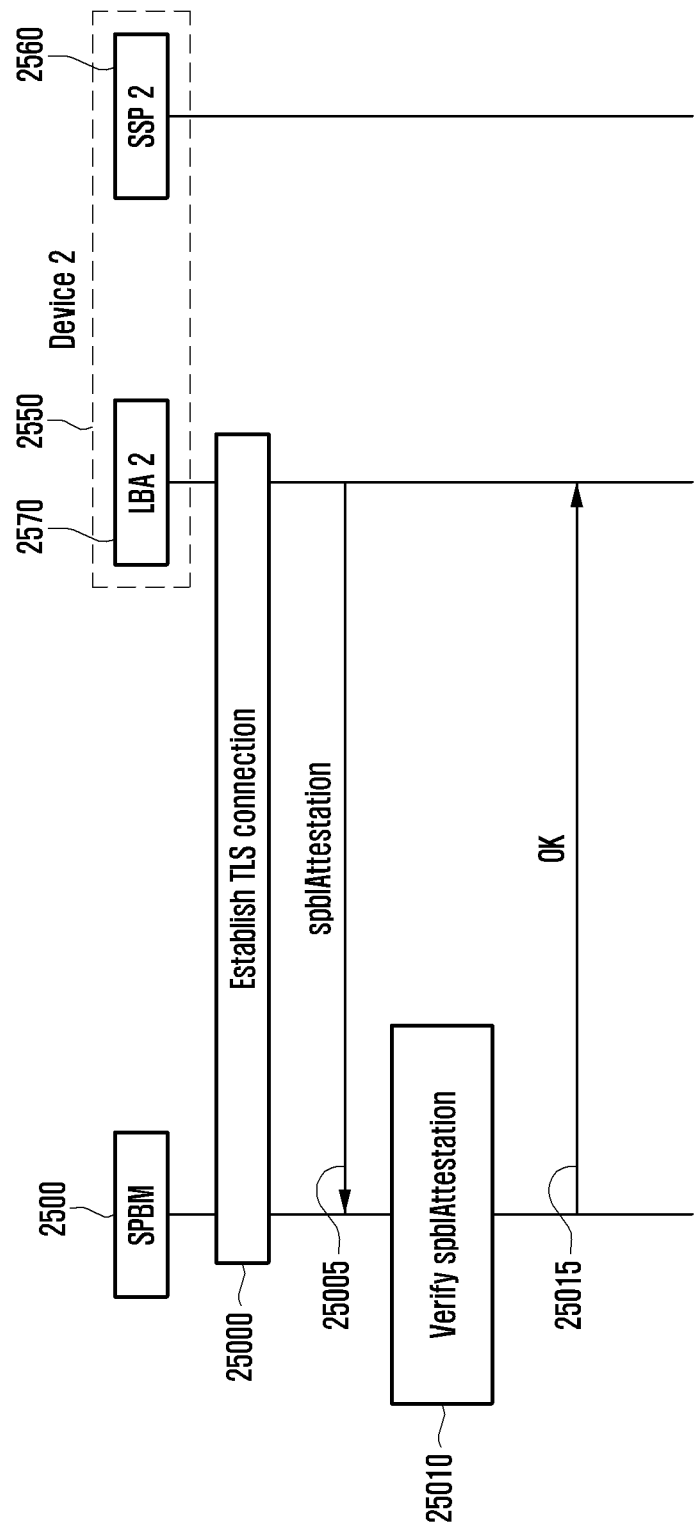
FIG. 25 is a diagram illustrating a procedure in which a bundle transmission result is registered in a server after the procedure presented in FIG. 24.

FIG. 25 is a diagram illustrating a procedure in which a bundle transmission result is registered in a server after the procedure presented in FIG. 24.

According to various embodiments, the terminal may include at least one LBA and at least one SSP. For example, as in an example of FIG. 25, a second terminal 2550 may include a second LBA 2570 and a second SSP 2560. For example, the second terminal 2550 may be a terminal in which the second SSP 2560 is mounted and in which the second LBA 2570 for controlling the second SSP 2560 is installed.

Further, according to various embodiments, a server 2500 may be a server operated by a service provider, a bundle management server, a server operated by collaboration between the service provider and the bundle management server, or any server operated in association with the service provider and/or the bundle management server. In the description of the drawing, although the term SPBM, which is one of possible examples of the server, is sometimes used for referring to the server 2500, the type of the server is not limited to SPBM, as described above.

With reference to FIG. 25, in step 25000, a transport layer security (TLS) connection may be established between the SPBM 2500 and the LBA 2570.

With reference to FIG. 25, in step 25005, the second LBA 2570 may transmit part and/or all of spblAttestation, finalizationRequest, and/or finalizationResponse to the server 2500. In this case, the second LBA 2570 may further transmit "selected SSP information" to the server 2500. A description of "selected SSP information" refers to the description of FIG. 22. Further, the second LBA 2570 may selectively further transmit "ssp2.Cert.DS" to the server 2500. Further, the second LBA 2570 may selectively further transmit "ssp1.Cert.DS" to the server 2500. Further, the second LBA 2570 may further include certificate chain information associated with "ssp2.Cert.DS" and/or "ssp1.Cert.DS" to the server 2500. The above information may be configured and transmitted by the second LBA 2570 itself, and although not illustrated in the drawing, after requesting the corresponding information to the second SSP 2560, the second LBA 2570 may transmit the received information, or although not illustrated in the drawing, the second LBA 2570 may request a portion of the corresponding information to the second SSP 2560, and then combine and transmit the received information and the information thereof.

With reference to FIG. 25, in step 25010, the server 2500 may verify information received in step 25005. A specific procedure of the verification process is as follows. The server 2500 may verify the received signature of "ssp1.Cert.DS" and/or "ssp2.Cert.DS" to verify the validity of the corresponding certificate. Further, the server 2500 may verify the signature of the received spblAttestation, finalizationRequest, and/or finalizationResponse. Further, the server 2700 may verify the contents of the received spblAttestation, finalizationRequest, and/or finalizationResponse. Further, the server 2500 may update the details of bundles transmitted between devices based on the verified contents. For example, the server 2500 may update a mapping relationship that has existed between the bundle and the first SSP 2410 to a mapping relationship between the bundle and the second SSP 2560.

With reference to FIG. 25, in step 25015, the server 2500 may transmit the result of the verification operation performed in step 25010 to the second LBA 2570. For example, the server 2500 may transmit whether the verification succeeds or fails to the second LBA 2570.

Figure 26:
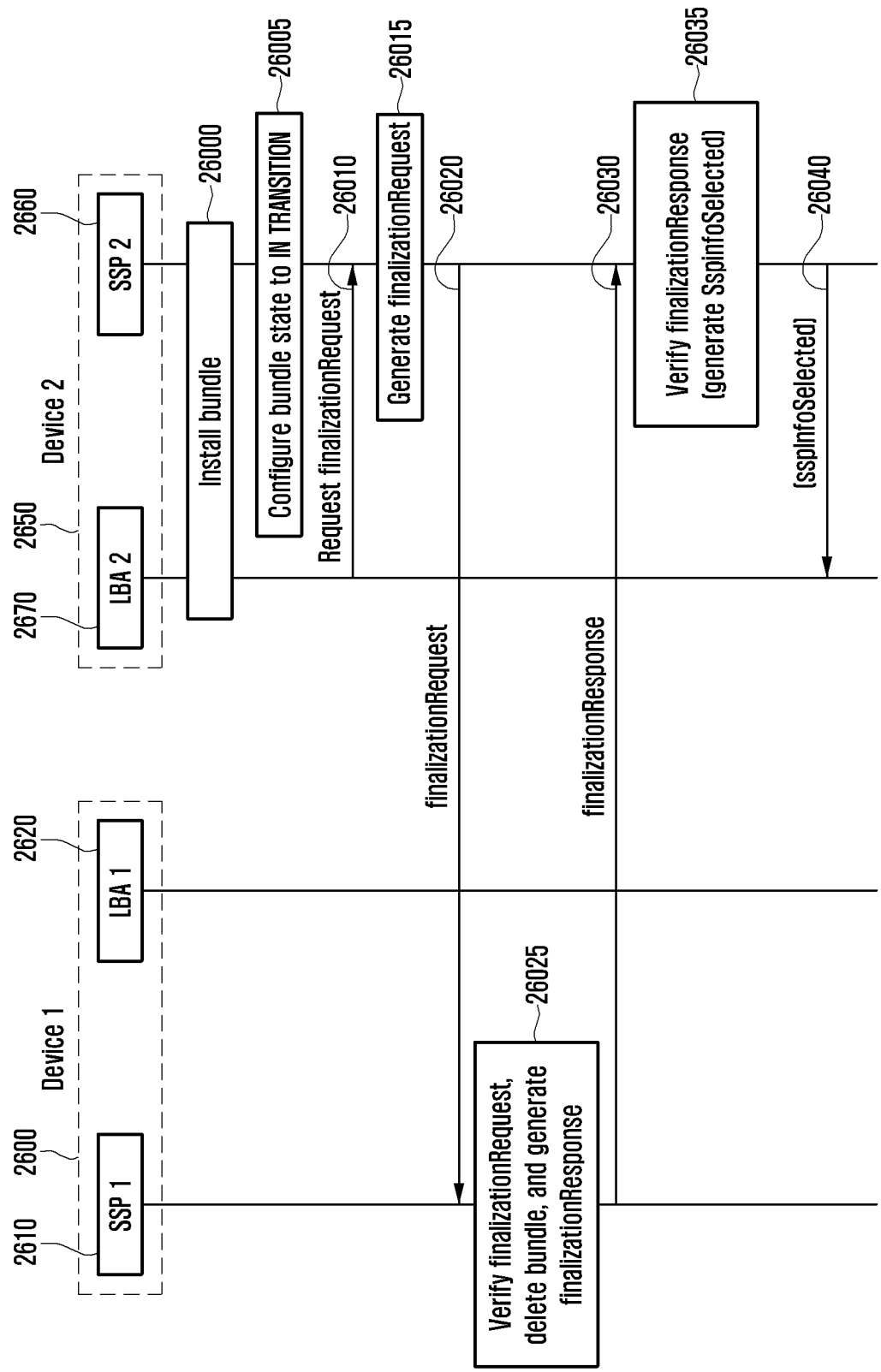
FIG. 26 is a diagram illustrating another detailed procedure of a procedure in which transmission of a bundle is completed among procedures illustrated in FIG. 19.

FIG. 26 is a diagram illustrating another detailed procedure of a procedure in which transmission of a bundle is completed among procedures illustrated in FIG. 19.

FIG. 26 illustrates a procedure applied when a transmission history of a bundle between devices is
  pre-notification is required and
  encryption of the notification content is required or not required According to various embodiments, the terminal may include at least one LBA and at least one SSP. For example, as in an example of FIG. 26, a first terminal 2600 may include a first LBA 2620 and a first SSP 2610, and a second terminal 2650 may include a second LBA 2670 and a second SSP 2660. For example, the first terminal 2600 may be a terminal in which the first SSP 2610 is mounted and in which the first LBA 2620 for controlling the first SSP 2610 is installed, and the second terminal 2650 may be a terminal in which the second SSP 2660 is mounted and in which the second LBA 2670 for controlling the second SSP 2660 is installed.

With reference to FIG. 26, in step 26000, the following procedures may be performed.
1. Install the Bundle With reference to FIG. 26, in step 26000, the second LBA 2670 and the second SSP 2660 may cooperate with each other to install a bundle in the second terminal 2650. In this process, the following procedures may be performed together. When metadata is transmitted, the second LBA 2670 or the second SSP 2660 may verify the content included in the metadata. When a "bundle transfer configuration" is transmitted, the second LBA 2670 may transfer the information to the second SSP 2660. When a transaction ID is transmitted, the second LBA 2670 or the second SSP 2660 may check whether the transaction ID is the same as the transaction ID used in the current session. When at least one of a bundle identifier (SPB ID), a bundle family identifier (SPB Family ID), or a bundle family manager identifier (SPB Family Custodian Object ID) is transmitted, the second LBA 2670 or the second SSP 2660 may identify whether the information matches information of the bundle to be currently received. When ssp1.Cert.DS is transmitted, the second SSP 2660 may verify the validity of the certificate to authenticate the first SSP 2610. When the received data includes encrypted data, the second SSP 2660 may generate a session key ShKey02 using the received ssp1.bundle.ePK.KA and ssp2.eSK.KA thereof, and decrypt and verify the encrypted data using the session key. When the received data includes a digital signature, the second SSP 2660 may verify ssp1.Cer.DS and then verify the validity of the digital signature using the certificate.

2. Identify Whether Pre-Registration is Required

Further, although not illustrated in the drawing, the second LBA 2670 and/or the second SSP 2660 may identify whether a "notification" is required, whether a "pre-notification" is required, and/or whether the notification content needs to be encrypted using a "registration configuration" of the bundle. This process is part of step 26000 and may be performed independently of regardless of the order of other procedures performed in step 26000. Alternatively, after step 26000, before step 26035 is completed, the process may be performed at a moment when a determination is required. A procedure to be described later in the drawing may be a procedure to be applied when, as a result of identifying the "registration configuration", a transmission history of the bundle between devices needs to be pre-notified.

With reference to FIG. 26, in step 26005, the second SSP 2660 may configure the bundle state to "IN TRANSITION". "IN TRANSITION" means a state that the bundle has been successfully installed but is not yet available (also, a state that may be changed to an available state (disabled, enable, active state) only by an "additional operation to be described later in this drawing" and an additional operation to be described with reference to FIG. 27 and/or an additional operation such as a "request from an external server (although not described in the disclosure)").

With reference to FIG. 26, in step 26010, the second LBA 2670 may request an "attestation" to the second SSP 2660.

With reference to FIG. 26, in step 26015, the second SSP 2660 may generate an "attestation". In FIG. 26, the attestation may be referred to as a finalizationRequest. A structure of the attestation may follow the structure disclosed in FIG. 18.

In this case, one example of a possible attestation configuration is as follows.
- The finalizationRequest may include a "bundle delimiter" of the corresponding bundle in 1810 of FIG. 18.
- The finalizationRequest may include an "SSP identifier" of the second SSP in 1830 of FIG. 18.
- The finalizationRequest may include information indicating that the second SSP configured the bundle state to the "IN TRANSITION" state in 1850 of FIG. 18.
- The finalizationRequest may optionally include a time in which the second SSP changed the bundle state to the "IN TRANSITION" state or a time in which the attestation was generated in 1870 of FIG. 18. Alternatively, the finalizationRequest may include information on a certificate for signing used for an electronic signature to be described later, and information on a certificate chain related thereto.
- The finalizationRequest may include signature information of the second SSP in 1890 of FIG. 18. The signature may be signature information obtained by digitally signing the above-described information with a signing certificate of the second SSP.

With reference to FIG. 26, in step 26020, the second SSP 2660 may transfer a finalizationRequest to the first SSP 2610. For example, the second SSP 2660 may transfer the finalizationRequestto the first SSP 2610 through the following process. That is, the second SSP 2660 may transfer the finalizationRequest to the second LBA 2670 in response to step 26010, and the second LBA may transfer the finalizationRequestto the first SSP through the first LBA 2620.

With reference to FIG. 26, in step 26025, the first SSP 2610 may verify the received finalizationRequest. The verification process may include step of checking the validity of the signature of the second SSP included in the finalizationRequest. Further, the verification process may further include a process of checking whether s "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to the "IN TRANSITION" state.

Further, in step 26025, the first SSP 2610 may delete the bundle after verification is completed.

Further, in step 26025, the first SSP 2610 may generate an "attestation". In FIG. 26, the attestation may be referred to as a finalizationResponse. A structure of the attestation may follow the structure disclosed in FIG. 18.

In this case, one example of a possible attestation configuration is as follows.
- The finalizationResponse may include a "bundle delimiter" of the corresponding bundle in 1810 of FIG. 18. Alternatively, the finalizationResponse may include part and/or all data of the finalizationRequest received in the previous step.
- The finalizationResponse may include an "SSP identifier" of the first SSP in 1830 of FIG. 18.
- The finalizationResponse may include information indicating that the first SSP has deleted the bundle in 1850 of FIG. 18.
- The finalizationResponse may optionally include a time in which the first SSP deleted the bundle or a time in which the attestation was generated in 1870 of FIG. 18. Alternatively, the finalizationResponse may include information on a certificate for signing used for an electronic signature to be described later, and information on a certificate chain related thereto.
- The finalizationResponse may include signature information of the first SSP in 1890 of FIG. 18. The signature may be signature information obtained by digitally signing the above-described information with a signing certificate of the first SSP.

With reference to FIG. 26, in step 26030, the first SSP 2610 may transfer the finalizationResponse to the second SSP 2660. For example, the first SSP 2610 may transfer the finalizationResponse to the second SSP 2660 via the first LBA 2620 and the second LBA 2670.

With reference to FIG. 26, in step 26035, the second SSP 2660 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may include a process of checking whether part or of all data of the finalizationRequest included in the finalizationResponse match information that has transmitted by itself. Further, the verification process may further include a process of identifying an "SSP identifier" included in the finalizationResponse. Further, the verification process may further include a process of identifying whether instruction information included in the finalizationResponse is instruction information that deletes the bundle.

Further, in step 26035, the second SSP 2660 may generate "selected SSP information (sspInforSelected)" thereof. The "selected SSP information" may include information on the second SSP to be provided in order to notify the server of the result of the bundle transmission between devices.

In this case, "selected SSP information" may include information for a certificate negotiation process (certificate negotiation information). The "certificate negotiation information" may optionally include information such as
    certificate information that the second SSP 2660 may use for verifying the server (spbmVerification)
    certificate information that the server may use for verifying the first SSP 2610 (SenderSpblVerification)
    certificate information that the server may use for verifying the second SSP 2660 (ReceiverSpblVerification)

Further, the "certificate negotiation information" may optionally further include a list of key agreement algorithms supported by the second SSP 2660, and optionally further include a list of encryption algorithms supported by the second SSP 2660.

Further, the "selected SSP information" may optionally further include SSP version information including at least one of version information of a standard specification supported by the primary platform and the loader included in the second SSP 2660.

With reference to FIG. 26, in step 26040, the second SSP 2660 may transmit a result (e.g., whether success or failure) of the operation performed in step 26035 to the second LBA 2670. Further, the "selected SSP information" generated in step 26035 may be transmitted together.

A process of generating "selected SSP information" in step 26035 and a process of transferring "selected SSP information" in step 26040 may be omitted.

Figure 27:
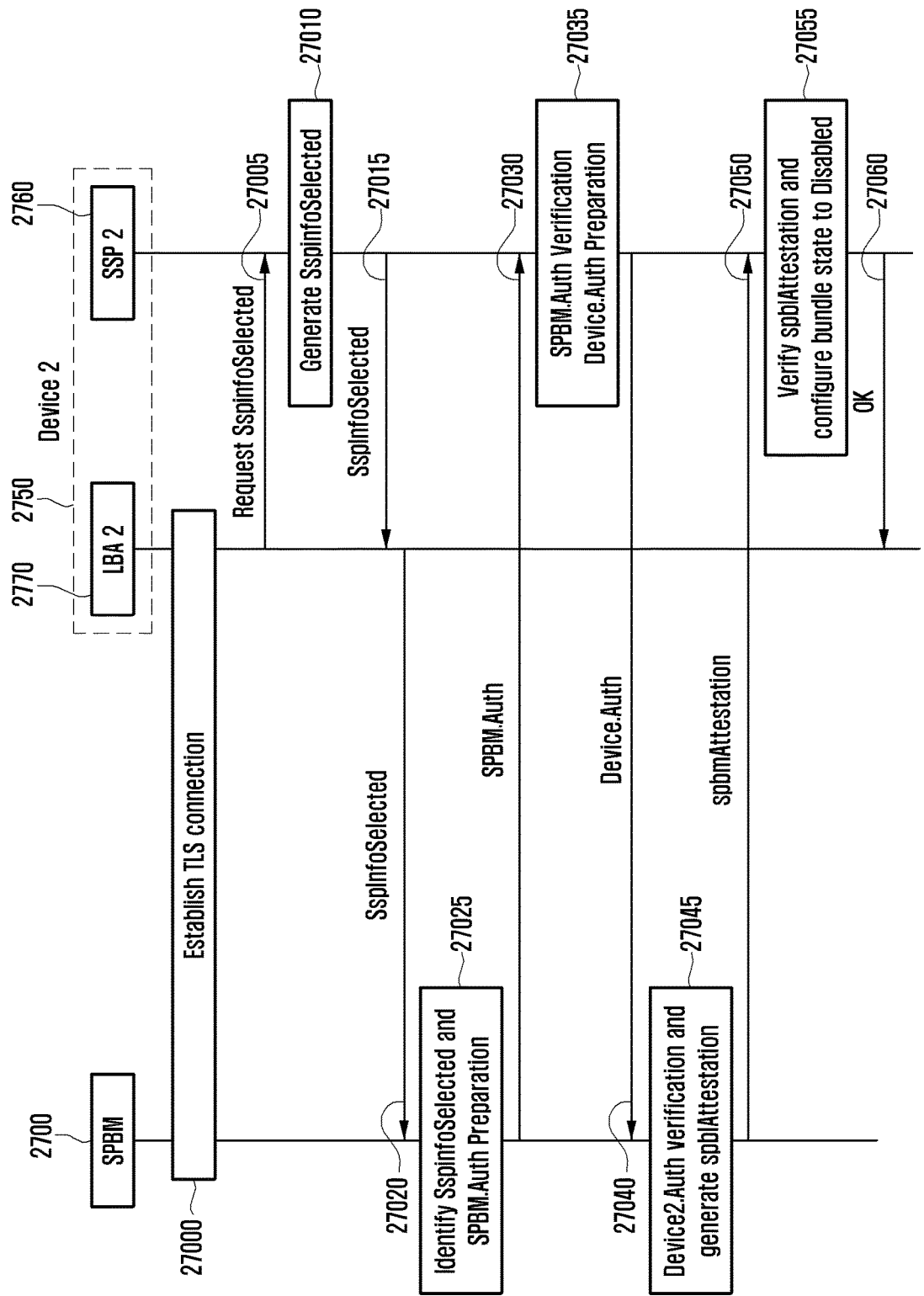
FIG. 27 is a diagram illustrating a procedure in which a bundle transmission result is registered in a server after the procedure presented in FIG. 26.

FIG. 27 is a diagram illustrating a procedure in which a bundle transmission result is registered in a server after the procedure presented in FIG. 26.

According to various embodiments, the terminal may include at least one LBA and at least one SSP. For example, as in an example of FIG. 27, a second terminal 2750 may include a second LBA 2770 and a second SSP 2760. For example, the second terminal 2750 may be a terminal in which the second SSP 2760 is mounted and in which the second LBA 2770 for controlling the second SSP 2760 is installed.

Further, according to various embodiments, a server 2700 may be a server operated by a service provider, a bundle management server, a server operated by collaboration between the service provider and the bundle management server, or any server operated in association with the service provider and/or the bundle management server. In the description of the drawing, although the term SPBM, which is one of possible examples of the server, is sometimes used for referring to the server 2700, the type of the server is not limited to SPBM, as described above.

With reference to FIG. 27, in step 27000, a transport layer security (TLS) connection may be established between the SPBM 2700 and the LBA 2770. Although it is described with reference to the drawing that step 27000 is performed before steps 27005 to 27015, step 27000 may be performed independently of steps 27005 to 27015 before step 27020 is performed. For example, step 27000 may be performed between steps 27015 and 27020.

With reference to FIG. 27, in step 27005, the second LBA 2770 may request "selected SSP information (SspInfoSelected)" to the second SSP 2760. In this case, step 27005 may be performed automatically or may be performed after receiving an external input. In this case, the "external input" may be given by the user through a UI provided by the second terminal 2750 or may be given from a remote server to the second terminal 2750 through a push input.

With reference to FIG. 27, in step 27010, the second SSP 2760 may generate "selected SSP information" thereof. A description of "selected SSP information" refers to the description of FIG. 26.

With reference to FIG. 27, in step 27015, the second SSP 2760 may transmit "selected SSP information" generated in step 27010 to the second LBA 2770.

Steps 27005 to 27015 may be omitted in some cases.

With reference to FIG. 27, in step 27020, the second LBA 2770 may transmit "selected SSP information" to the server 2700. When the second LBA 2770 has received "selected SSP information" through steps 26035 to 26040 of FIG. 26 or "selected SSP information" through steps 27005 to 27015 of FIG. 27, the second LBA 2770 may transmit the received "selected SSP information" to the server 2700. When the second LBA 2770 has not received the "selected SSP information", the second LBA 2770 may generate "selected SSP information" and transmit the "selected SSP information" to the server 2700.

With reference to FIG. 27, in step 27025, the server 2700 may identify the received "selected SSP information" and generate "server authentication information (SPBM.Auth)" capable of authenticating itself based on the information. A more detailed procedure for the process is as follows.

The server 2700 may identify certificate information capable of verifying itself using the received "spbmVerification" and select at least one key agreement certificate (spbm.Cert.KA). Alternatively, the server 2700 may generate a public key "spbm.ePK.KA" and a private key "spbm.eSK.KA" as a key pair for asymmetric encryption to be used for key agreement using the received "list of key agreement algorithms supported by the second SSP 2760" and then select the public key (spbm.ePK.KA) among the key pair. Further, the server 2700 may identify certificate information capable of verifying itself using the received "spbmVerification" and further select at least one signing certificate (spbm.Cert.DS).

Further, the server 2700 may identify whether certificate information of the first SSP 2610 to perform verification is verifiable by itself using the received "SenderSpblVerification".

Further, the server 2700 may identify whether certificate information of the second SSP 2760 to perform verification is verifiable by itself using the received "ReceiverSpblVerification". Alternatively, after selecting at least one certificate information of the second SSP 2760 capable of being verified by itself using "ReceiverSpblVerification", the server 2700 may configure the corresponding information to "CiPkIdToBeUsed".

Further, the server 2700 may select at least one encryption algorithm to be used in the future using the received "list of encryption algorithms supported by the second SSP 2760" and configure the corresponding information to "CryptoToBeUsed".

Further, the server 2700 may identify the received list of "version information of the standard specification supported by the primary platform and the loader included in the second SSP 2760", and identify whether there is a version of the standard specification supported by itself among them.

"Server authentication information (SPBM.Auth)" may include at least one of "spbm.Cert.KA", "spbm.ePK.KA", "spbm.Cert.DS", "CiPkIdToBeUsed", or "CryptoToBeUsed" described above.

In this case, part or all of the above-mentioned "server authentication information (SPBM.Auth)" may be digitally signed so that it may be verified using spbm.Cert.DS so as to ensure the integrity of the information, and digital signature data may be added as part of "server authentication information".

With reference to FIG. 27, in step 27030, the server 2700 may transfer "server authentication information (SPBM.Auth)" generated in step 27025 to the second SSP 2760 via the second LBA 2770.

With reference to FIG. 27, in step 27035, the second SSP 2760 may verify the received "server authentication information (SPBM.Auth)". When the second SSP 2760 receives "spbm.Cert.KA", the second SSP 2760 may identify the signature of the corresponding certificate to identify the validity of the certificate. Further, when the second SSP 2760 receives "spbm.Cert.DS", the second SSP 2760 may identify the signature of the corresponding certificate to identify the validity of the certificate. Further, when the second SSP 2760 receives "spbm.ePK.KA" and a digital signature thereof, the second SSP 2760 may identify a digital signature using spbm.Cert.DS to identify the integrity of the received public key spbm.ePK.KA. Further, upon receiving "CiPkIdToBeUsed", the second SSP 2760 may identify "CiPkIdToBeUsed" to select at least one signature certificate (ssp2.Cert.DS) capable of verifying itself.

Further, although not illustrated in the drawing, in step 27035, the second SSP 2760 may generate a public key "ssp2.ePK.KA" and a private key "ssp2.eSK.KA" as a key pair for asymmetric encryption to be used for key agreement and then select the public key (ssp2.ePK.KA) among the key pair. Further, the second SSP 2760 may select one of spbm.ePK.KA or the public key for key agreement included in spbm.Cert.KA, and then generate a session key ShKey03 to be used for encryption during communication with the server in the future using the value and ssp2.eSK.KA. ShKey03 should be the session key for encryption algorithm included in the received "CryptoToBeUsed".

Further, in step 27035, the second SSP 2760 may generate "terminal authentication information (Device.Auth)" capable of authenticating itself. In this case, "terminal authentication information (Device.Auth)" may include "ssp2.Cert.DS". Further, the "terminal authentication information (Device.Auth)" may further include "ssp2.ePK.KA". Further, the "terminal authentication information (Device.Auth)" may optionally further include "ssp1.Cert.DS". Further, "terminal authentication information (Device.Auth)" may include part and/or all of the finalizationRequest. Further, "terminal authentication information (Device.Auth)" may include part and/or all of the finalizationResponse.

In this case, some or all of the above-mentioned "terminal authentication information (Device.Auth)" may be digitally signed so that it may be verified using ssp2.Cert.DS so as to ensure the integrity of the information, and digital signature data may be added as part of "terminal authentication information". Further, part or all of "terminal authentication information (Device.Auth)" may be encrypted using the previously generated session key ShKey03.

With reference to FIG. 27, in step 27040, the second SSP 2760 may transfer the "terminal authentication information (Device.Auth)" generated in step 27035 to the server 2700 via the second LBA 2770.

With reference to FIG. 27, in step 27045, the server 2700 may verify the received "terminal authentication information (Device.Auth)". A specific procedure of the verification process is as follows. The server 2700 may verify the received signature of "ssp1.Cert.DS" and/or "ssp2.Cert.DS" to verify the validity of the corresponding certificate. Further, the server 2700 may verify the signature of the received finalizationRequest and/or finalizationResponse. Further, the server 2700 may verify the contents of the received finalizationRequest and/or finalizationResponse. Further, the server 2700 may update the details of bundles transmitted between devices based on the verified contents. For example, the server 2700 may update a mapping relationship that has existed between the bundle and the first SSP 2610 to a mapping relationship between the bundle and the second SSP 2760.

In this process, when encrypted data is included in the "terminal authentication information (Device.Auth)", the server 2700 may generate a session key ShKey03 using spbm.eSK.KA or a private key corresponding to the public key for key agreement included in the received ssp2.ePK.KA and spbm.Cert.KA thereof, decrypt encrypted data using the session key, and then perform a verification process.

Further, in step 27045, the server 2700 may generate an "attestation". In FIG. 27, the attestation may be referred to as spbmAttestation. A structure of the attestation may follow the structure disclosed in FIG. 18.

In this case, one example of a possible attestation configuration is as follows.

The spbmAttestation may include a "bundle delimiter" of the bundle in 1810 of FIG. 18. Alternatively, the spbmAttestation may include part and/or all data of the finalizationRequest and/or finalizationResponse received in the previous step.

The spbmAttestation may include an identifier of the server (e.g., an identifier of the service provider and/or an identifier of the bundle management server and/or an address of the server) in 1830 of FIG. 18.

The spbmAttestation may include information indicating that the server identified the movement history of the bundle in 1850 of FIG. 18.

The spbmAttestation may optionally include a time in which the server identified the movement history of the bundle or a time in which the attestation was generated in 1870 of FIG. 18. Alternatively, the spbmAttestation may include information on a certificate for signing used for an electronic signature to be described later, and information on a certificate chain related thereto.

The spbmAttestation may include signature information of the server in 1890 of FIG. 18. The signature may be signature information obtained by digitally signing the above-described information with a signing certificate of the server.

Further, in step 27045, although not illustrated in FIG. 27, the server 2700 may generate a public key "spbm.attestation.ePK.KA" and a private key "spbm.attestation.eSK.KA" as a key pair for asymmetric encryption to be used for key agreement. In this case, the key pair "spbm.attestation.ePK.KA and spbm.attestation.eSK.KA" may be configured to the same value as the previously generated "spbm.ePK.KA and spbm.eSK.KA". Alternatively, the key pair "spbm.attestation.ePK.KA and spbm.attestation.eSK.KA" may be configured to the same value as the previously used "public key included in spbm.Cert.KA and a corresponding private key". Further, the server 2700 may generate a session key ShKey04 using spbm.attestation.eSK.KA and ssp2.ePK.KA. When the "private key corresponding to the public key included in spbm.eSK.KA or spbm.Cert.Ka is reused for spbm.attstation.eSK.KA, the value of the session key ShKey04 may be configured to a value of the previously generated ShKey03.

Further, in step 27045, although not illustrated in FIG. 27, the server 2700 may configure "attestation verification data". "Attestation verification data" may include "spbm.Cert.DS". Further, digital signature values of the server for "spbm.attestation.ePK.KA" and/or "spbm.attestation.ePK.KA" may be further included.

According to various embodiments, some and/or all of the "attestation" and "attestation verification data" generated in step 27045 may be encrypted using ShKey04.

With reference to FIG. 27, in step 27050, the server 2700 may transmit "spbmAttestation" and "attestation verification data" generated in step 27045 to the second SSP 2760 via the second LBA 2770.

With reference to FIG. 27, in step 27055, the second SSP 2760 may verify the received "spbmAttestation" and/or "attestation verification data". When the received data includes encrypted data, the second SSP 2760 may generate a session key ShKey04 using the received spbm.attestation.ePK.KA and ssp2.eSK.KA thereof, and decrypt and then verify the encrypted data using the session key. When the received data includes a digital signature, the second SSP 2760 may verify spbm.Cert.DS and then verify the validity of the digital signature using the certificate.

Further, in step 27055, after verification is completed, the second SSP 2760 may change the bundle state to one of available states (one of disabled, enable, and active). For example, as illustrated in the drawing, the second SSP 2760 may convert the bundle state to the disabled state.

With reference to FIG. 27, in step 27060, the second SSP 2760 may transfer the result of step 27060 to the second LBA 2770. For example, the second SSP 2760 may transfer the verification success or failure result of step 27060 to the second LBA 2770.

Figure 28:
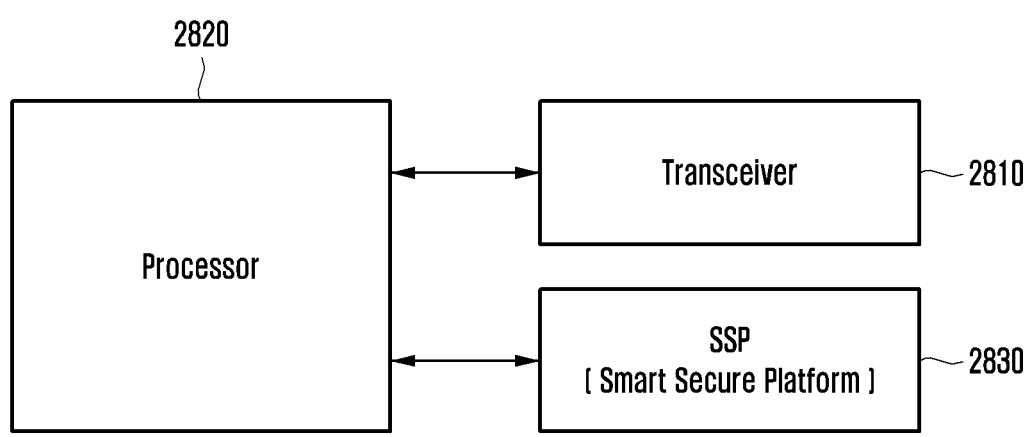
FIG. 28 is a diagram illustrating a configuration of a terminal according to some embodiments of the disclosure.

FIG. 28 is a block diagram illustrating a constitution of a terminal according to an embodiment of the disclosure.

As illustrated in FIG. 28, the terminal may include a transceiver 2810 and at least one processor 2820. Further, the terminal may further include an SSP 2830. For example, the SSP 2830 may be inserted into the terminal or may be embedded in the terminal. The at least one processor 2820 may be referred to as a "controller". However, a configuration of the terminal is not limited to that of FIG. 28, and may include more or fewer components than the components illustrated in FIG. 28. According to some embodiments, the transceiver 2810, at least one processor 2820, and a memory (not illustrated) may be implemented in the form of a single chip. Further, when the SSP 2830 is embedded in the terminal, the transceiver 2810, at least one processor 2820, and the memory (not illustrated) may be implemented in the form of a single chip including the SSP 2830.

According to various embodiments, the transceiver 2810 may transmit and receive signals, information, data, and the like according to various embodiments of the disclosure to and from a transceiver of another terminal or an external server. The transceiver 2810 may include an RF transmitter for up-converting and amplifying a frequency of a signal to be transmitted, and an RF receiver for low-noise amplifying a received signal and down-converting a frequency thereof. However, this is only an example of the transceiver 2810, and components of the transceiver 2810 are not limited to the RF transmitter and the RF receiver. Further, the transceiver 2810 may receive a signal through a wireless channel, output the signal to the at least one processor 2820, and transmit a signal output from the at least one processor 2820 through a wireless channel.

According to various embodiments, the transceiver 2810 may transmit or receive SSP information included in another terminal from a transceiver of another terminal or an external server, authentication information capable of authenticating another terminal, authentication information capable of authenticating a server, authentication information capable of authenticating itself, a bundle transfer code, a bundle transfer configuration, a bundle, and various attestations described with reference to FIGS. 22 to 27.

At least one processor 2820 is a component for overall controlling the terminal. At least one processor 2820 may control the overall operation of the terminal according to various embodiments of the disclosure, as described above.

The SSP 2830 may include a processor or a controller for installing and controlling a bundle, or an application may be installed therein.

According to various embodiments, at least one processor or controller in the SSP 2830 may identify a bundle transfer configuration to determine whether to transmit a specific bundle. Further, by identifying the bundle transfer configuration, at least one processor or controller may determine whether the result of the bundle transfer of the corresponding bundle between devices needs to be registered in the server, or whether a pre-notification is required, if registration is required.

Further, according to various embodiments, at least one processor or controller in the SSP may generate a bundle transfer code to control a transmission process of a specific bundle.

Further, according to various embodiments, at least one processor or controller in the SSP may generate SSP information thereof, and identify and verify SSP information of another SSP received from the outside.

Further, according to various embodiments, at least one processor or controller in the SSP may generate authentication information capable of verifying itself, and verify authentication information of another SSP received from the outside.

Further, according to various embodiments, the SSP 2830 may generate a bundle and install the bundle alone or in cooperation with one or more processors 2820. Further, the SSP 2830 may manage a bundle.

Further, according to various embodiments, the SSP 2830 may generate various types of attestations described with reference to FIGS. 22 to 27 and verify the received attestations.

Further, according to various embodiments, the SSP 2830 may change the bundle state based on the contents of the received attestation, as described with reference to FIGS. 22 to 27.

Further, according to various embodiments, the SSP 2830 may operate under the control of the processor 2820. Alternatively, the SSP 2830 may include a processor or a controller for installing and controlling a bundle, or an application may be installed therein. Some or all of the application may be installed in the SSP 2830 or a memory (not illustrated).

The terminal may further include a memory (not illustrated), and store data such as a basic program, an application program, and configuration information for an operation of the terminal. Further, the memory may include at least one storage medium of a flash memory type, a hard disk type, a multimedia card micro type, a card type memory (e.g., SD or XD memory, and the like), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Further, the processor 2820 may perform various operations using various programs, contents, data, and the like stored in the memory.

Figure 29:
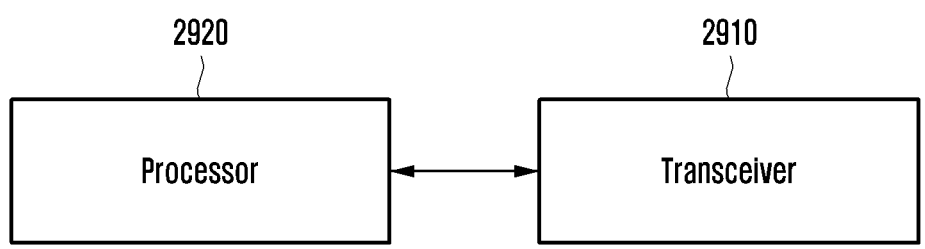
FIG. 29 is a diagram illustrating a configuration of a server according to some embodiments of the disclosure.

FIG. 29 is a diagram illustrating a configuration of a server according to an embodiment of the disclosure. In this case, the server may be a server operated by a service provider, a bundle management server, a server operated by collaboration between a service provider and a bundle management server, or any server operated in association with the service provider and/or the bundle management server. In the description of this drawing, the term bundle management server, which is one of possible examples of the server, is used for referring to the server, but as described above, the type of the server is not limited to the bundle management server.

According to some embodiments, the bundle management server may include a transceiver 2910 and at least one processor 2920. However, a configuration of the bundle management server is not limited to that of FIG. 29, and may include more or fewer components than those illustrated in FIG. 29. According to some embodiments, the transceiver 2910, at least one processor 2920, and a memory (not illustrated) may be implemented in the form of a single chip.

According to some embodiments, the transceiver 2910 may transmit and receive signals, information, data, and the like according to various embodiments of the disclosure to and from the terminal. The transceiver 2910 may include an RF transmitter for up-converting and amplifying a frequency of a signal to be transmitted, and an RF receiver for low-noise amplifying a received signal and down-converting frequency thereof. However, this is only an embodiment of the transceiver 2910, and components of the transceiver 2910 are not limited to the RF transmitter and the RF receiver. Further, the transceiver 2910 may receive a signal through a wireless channel, output the signal to the at least one processor 2920, and transmit the signal output from the at least one processor 2920 through a wireless channel.

At least one processor 2920 is a component for overall controlling the bundle management server. The processor 2920 may control the overall operation of the bundle management server according to various embodiments of the disclosure, as described above. The at least one processor 2920 may be referred to as a controller.

The bundle management server may further include a memory (not illustrated), and store data such as a basic program, an application program, and configuration information for an operation of the bundle management server. Further, the memory may include at least one storage medium of a flash memory type, a hard disk type, a multimedia card micro type, a card type memory (e.g., SD or XD memory, and the like), a magnetic memory, a magnetic disk, an optical disk, a random access memory (RAM), a static random access memory (SRAM), a read-only memory (ROM), a programmable read-only memory (PROM), or an electrically erasable programmable read-only memory (EEPROM). Further, the processor 2920 may perform various operations using various programs, contents, data, and the like stored in the memory.

Figure 30:
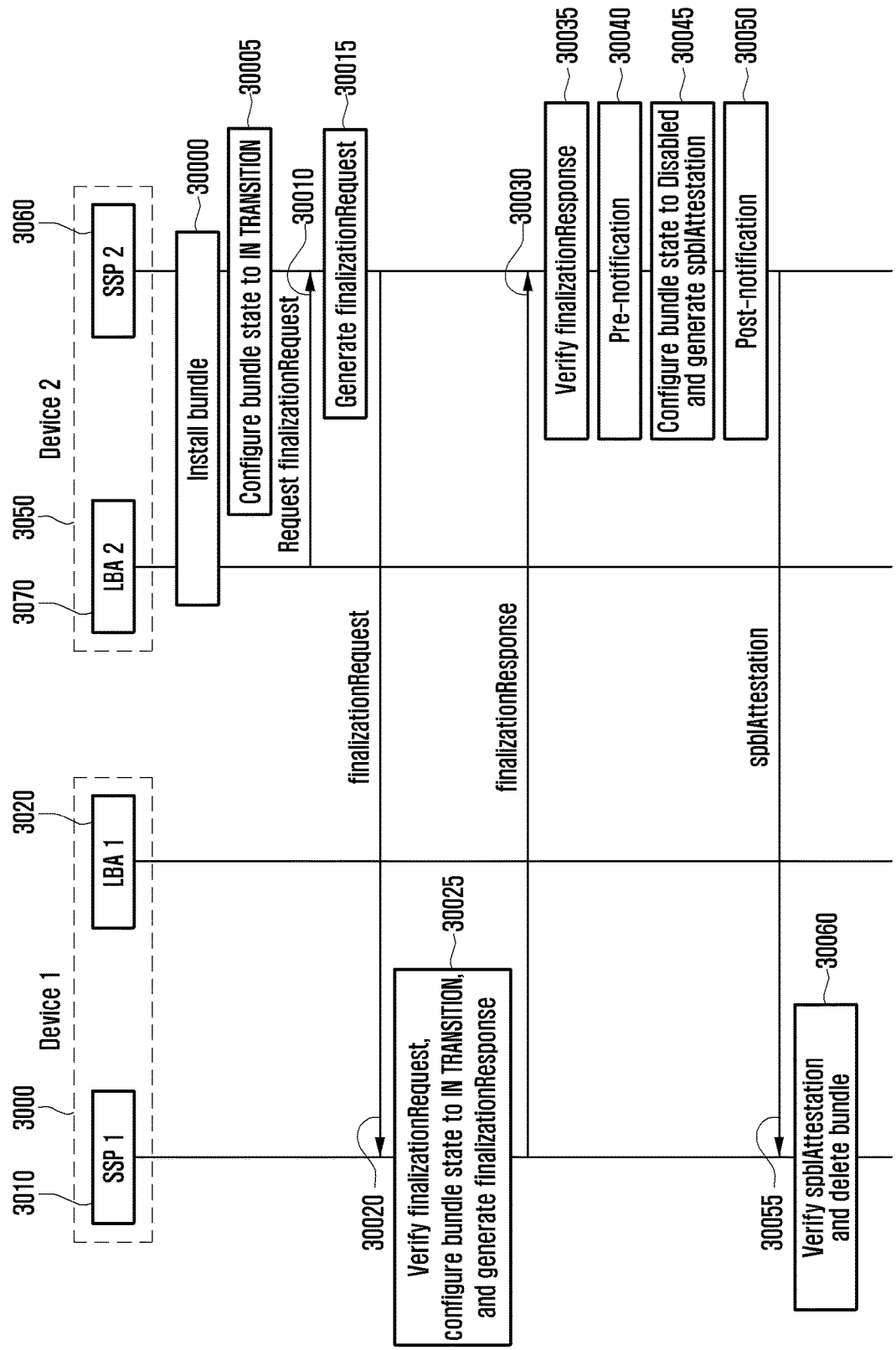
FIG. 30 is a diagram illustrating another detailed procedure of a procedure in which transmission of a bundle is completed and a procedure for registering a bundle transmission result in a server among procedures presented in FIG. 19.

FIG. 30 is a diagram illustrating another detailed procedure of a procedure in which bundle transmission is completed among procedures presented in FIG. 19 and a procedure for registering a bundle transmission result in a server.

According to various embodiments, the terminal may include at least one LBA and at least one SSP. For example, as in an example of FIG. 30, a first terminal 3000 may include a first LBA 3020 and a first SSP 3010, and a second terminal 3050 may include a second LBA 3070 and a second SSP 3060. For example, the first terminal 3000 may be a terminal in which the first SSP 3010 is mounted and in which the first LBA 3020 for controlling the first SSP 3010 is installed, and the second terminal 3050 may be a terminal in which the second SSP 3060 is mounted and in which the second LBA 3070 for controlling the second SSP 3060 is installed.

With reference to FIG. 30, the following procedures may be performed in step 30000.

1. Install the Bundle

With reference to FIG. 30, in step 30000, the second LBA 3070 and the second SSP 3060 may cooperate with each other to install a bundle in the second terminal 3050. In this process, the following procedures may be performed together. When metadata is transmitted, the second LBA 3070 or the second SSP 3060 may verify contents included in the metadata. When the "bundle transfer configuration" is transmitted, the second LBA 3070 may transfer the information to the second SSP 3060. When a transaction ID is transmitted, the second LBA 3070 or the second SSP 3060 may check whether the transaction ID is the same as a transaction ID used in a current session. When at least one of a bundle identifier (SPB ID), a bundle family identifier (SPB Family ID), or a bundle family manager identifier (SPB Family Custodian Object ID) is transmitted, the second LBA 3070 or the second SSP 3060 may identify whether the information matches information of the bundle to be currently received. When ssp1.Cert.DS is transmitted, the second SSP 3060 may verify the validity of the certificate to authenticate the first SSP 3010. When the received data includes encrypted data, the second SSP 3060 may generate a session key ShKey02 using the received ssp1.bundle.ePK.KA and ssp2.eSK.KA thereof, decrypt the encrypted data using the session key, and then perform verification. When the received data includes a digital signature, the second SSP 3060 may verify ssp1.Cer.DS and then verify the validity of the digital signature using the certificate.

2. Identify "Registration Configuration"

Further, although not illustrated in the drawing, the second LBA 3070 and/or the second SSP 3060 may identify whether a "notification is required", whether a "pre-notification is required", and/or whether the notification content needs to be encrypted using the "registration configuration" of the bundle. This process is part of step 30000 and may be performed independently of regardless of the order of other procedures performed in step 30000. Alternatively, after step 30000, before a notification is made in 30040 or 30050, the "registration configuration" may be identified and the process may be performed at the moment when a determination is required.

With reference to FIG. 30, in step 30005, the second SSP 3060 may configure the bundle state to "IN TRANSITION". "IN TRANSITION" may mean a state that the bundle has been installed successfully but is unavailable (also, a state that may be changed to an available state (disabled, enable, active state) only by operations such as a "request from the first terminal 3000" and/or a "request from an external server").

With reference to FIG. 30, in step 30010, the second LBA 3070 may request an "attestation" to the second SSP 3060.

With reference to FIG. 30, in step 30015, the second SSP 3060 may generate an "attestation". In FIG. 30, the attestation may be referred to as a finalizationRequest. A structure of the attestation may follow the structure disclosed in FIG. 18.

In this case, one example of a possible attestation configuration is as follows.

The finalizationRequest may include a "bundle delimiter" of the corresponding bundle in 510 of FIG. 18.

The finalizationRequest may include an "SSP identifier" of the second SSP in 530 of FIG. 18.

The finalizationRequest may include information indicating that the second SSP configured the bundle state to the "IN TRANSITION" state in 1850 of FIG. 18.

The finalizationRequest may optionally include a time in which the second SSP configured the bundle state to the "IN TRANSITION" state or a time in which the attestation was generated in 1870 of FIG. 18. Alternatively, the finalizationRequest may include information on a certificate for signing used for an electronic signature to be described later, and information on a certificate chain related thereto.

The finalizationRequest may include signature information of the second SSP in 1890 of FIG. 18. The signature may be signature information obtained by digitally signing the above-described information with a signing certificate of the second SSP.

With reference to FIG. 22, in step 30020, the second SSP 3060 may transfer a finalizationRequest to the first SSP 3010. For example, the second SSP 3060 may transfer the finalizationRequest to the first SSP 3010 through the following process. That is, the second SSP 3060 may transfer the finalizationRequest to the second LBA 3070 in response to step 30010, and the second LBA 3070 may transfer the finalizationRequest to the first SSP 3010 via the first LBA 3020.

With reference to FIG. 30, in step 30025, the first SSP 3010 may verify the received finalizationRequest. The verification process may include step of checking the validity of the signature of the second SSP included in the finalizationRequest. Further, the verification process may further include a process of checking whether a "bundle delimiter" included in the finalizationRequest matches a bundle delimiter of the corresponding bundle. Further, the verification process may further include a process of checking whether an "SSP identifier" included in the finalizationRequest is a valid identifier of the second SSP. Further, the verification process may further include a process of identifying whether instruction information included in the finalizationRequest is instruction information that changes the bundle state to the "IN TRANSITION" state.

Further, in step 30025, the first SSP 3010 may configure the bundle state to "IN TRANSITION" after verification is completed. "IN TRANSITION" may mean a state that the bundle has been successfully installed but is unavailable (also, a state that may be changed to an available state (disabled, enable, active states) only by an additional operation such as a "request from the second terminal 3050" and/or a "request from an external server").

Further, in step 30025, the first SSP 3010 may generate an "attestation". In FIG. 30, the attestation may be referred to as a finalizationResponse. A structure of the attestation may follow the structure disclosed in FIG. 18.

In this case, one example of a possible attestation configuration is as follows.

The finalizationResponse may include a "bundle delimiter" of the corresponding bundle in 510 of FIG. 18.

Alternatively, the finalizationResponse may include part and/or all data of the finalizationRequest received in the previous step.

The finalizationResponse may include an "SSP identifier" of the first SSP in 530 of FIG. 18.

The finalizationResponse may include information indicating that the first SSP configured the bundle state to the "IN TRANSITION" state in 1850 of FIG. 18.

The finalizationResponse may optionally include a time in which the first SSP configured the bundle state to the "IN TRANSITION" state or a time in which the attestation was generated in 1870 of FIG. 18. Alternatively, the finalizationResponse may include information on a certificate for signing used for an electronic signature to be described later, and information on a certificate chain related thereto.

The finalizationResponse may include signature information of the first SSP in 1890 of FIG. 18. The signature may be signature information obtained by digitally signing the above-described information with a signing certificate of the first SSP.

With reference to FIG. 30, in step 30030, the first SSP 3010 may transfer the finalizationResponse to the second SSP 3060. For example, the first SSP 3010 may transfer the finalizationResponse to the second SSP 3060 via the first LBA 3020 and the second LBA 3070.

With reference to FIG. 30, in step 30035, the second SSP 3060 may verify the received finalizationResponse. The verification process may include step of checking the validity of the signature of the first SSP included in the finalizationResponse. Further, the verification process may optionally further include a process of checking whether a "bundle delimiter" included in the finalizationResponse matches a bundle delimiter of the corresponding bundle. Further, the verification process may include a process of checking whether part or all data of the finalizationRequest included in the finalizationResponse matches information that has transmitted by itself. Further, the verification process may further include a process of identifying an "SSP identifier" included in the finalizationResponse. Further, the verification process may further include a process of identifying whether instruction information included in the finalizationResponse is instruction information that configures the bundle state to "IN TRANSITION".

With reference to FIG. 30, a pre-notification procedure may be performed in step 30040. The procedure may be applied when it is configured to require a pre-notification in a "registration configuration". When a pre-notification procedure is carried out, the procedure may be as follows.

First, the second SSP 3060 may generate sspInfoSelected and transmit the information to the second LBA 3070. The process may be omitted, as needed. In this case, the description of sspInfoSelected refers to the description of FIG. 26. Thereafter, a process before a "procedure of changing the bundle state to one of available states (one of disabled, enable, and active)" of step 27055 among the procedures described with reference to FIG. 27 may be performed.

With reference to FIG. 30, in step 30045, the second SSP 3060 may change the bundle state to one of available states (one of disabled, enable, and active). For example, as illustrated in the drawing, the second SSP 3060 may change the bundle state to the disabled state.

Further, in step 30045, the second SSP 3060 may generate an "attestation". In FIG. 30, the attestation may be referred to as spblAttestation. A structure of the attestation may follow the structure disclosed in FIG. 18.

In this case, one example of a possible attestation configuration is as follows.

The spblAttestation may include a "bundle delimiter" of the corresponding bundle in 510 of FIG. 18. Alternatively, the spblAttestation may include part and/or all data of a "finalizationRequest, a finalizationResponse, and/or a spbmAttestation".

The spblAttestation may include an "SSP identifier" of the second SSP in 530 of FIG. 18.

The spblAttestation may include information indicating that the second SSP has changed the bundle state to one of available states in 1850 of FIG. 18.

The spblAttestation may optionally include a time in which the second SSP changed the bundle state to one of available states or a time in which the attestation was generated in 1870 of FIG. 18. Alternatively, the spblAttestation may include information on a certificate for signing used for an electronic signature to be described later, and information on a certificate chain related thereto.

The spblAttestation may include signature information of the second SSP in 1890 of FIG. 18. The signature may be signature information obtained by digitally signing the above-described information with a signing certificate of the second SSP.

With reference to FIG. 30, in step 30050, a post-notification procedure may be performed. The procedure may be applied when it is configured in a "registration configuration" that a pre-notification is not required. When a post-notification procedure is carried out, the procedure may be as follows.

a. When it is configured that encryption of the notification content is required in the "registration configuration"

First, the second SSP 3060 may generate sspInfoSelected and transmit the information to the second LBA 3070. The process may be omitted, as needed. In this case, the description of sspInfoSelected refers to the description of FIG. 22. Thereafter, the procedure described in FIG. 23 may be performed.

b. When it is configured that encryption of the notification content is not required in the "registration configuration"

First, the second SSP 3060 may transmit spblAttestation to the second LBA 3070. Thereafter, the procedure described with reference to FIG. 25 may be performed.

With reference to FIG. 30, in step 30055, the second SSP 3060 may transmit spblAttestation to the first SSP 3010 via the second LBA 3070 and the first LBA 3020.

With reference to FIG. 30, in step 30060, the first SSP 3010 may verify the received spblAttestation. The verification process may include step of checking the validity of the signature of the second SSP included in spblAttestation. Further, the verification process may further include a process of checking whether a "bundle delimiter" included in spblAttestation matches a bundle delimiter of the corresponding bundle. Further, the verification process may further include a process of checking whether an "SSP identifier" included in spblAttestation is a valid identifier of the second SSP. Further, the verification process may further include a process of identifying whether instruction information included in spblAttestation is instruction information that configures the bundle state to one of available states.

Further, in step 30060, the first SSP 3010 may delete the bundle.

A procedure for generating spblAttestation in step 30045 and/or step 30055 and/or step 30060 may be omitted, as needed.

When the notification process described in step 30040 or 30050 is not completed (e.g., when a notification is transmitted to the server but no response is received), the second terminal may repeatedly retransmit the notification to the server. A retransmission process may be performed until the maximum value is satisfied according to the preconfigured maximum number of retransmissions or may be repeatedly performed until a response is received from the server.

According to the "registration configuration", a pre-notification is required, but when the bundle is unavailable in both the first terminal 3000 and the second terminal 3050 because the process 30040 is not performed normally, the state of the bundle installed in the first terminal 3000 and/or the second terminal 3050 may be changed from "IN TRANSITION" to one (e.g., disabled state) of available states by a request of the server described with reference to FIG. 29.

In the specific embodiments of the disclosure described above, components included in the disclosure were represented in the singular or plural according to the presented specific embodiments. However, the singular or plural expression is appropriately selected for a situation presented for convenience of description, and the disclosure is not limited to the singular or plural component, and even if a component is represented in the plural, it may be configured with the singular, or even if a component is represented in the singular, it may be configured with the plural.

Although specific embodiments have been described in the detailed description of the disclosure, various modifications are possible without departing from the scope of the disclosure. Therefore, the scope of the disclosure should not be limited to the described embodiments and should be defined by the claims described below as well as those equivalent to the claims.

Various embodiments of the disclosure and terms used therein are not intended to limit the technology described in the disclosure to a specific embodiment, but it should be understood to include various modifications, equivalents, and/or substitutions of the embodiments. In connection with the description of the drawings, like reference numerals may be used for like components. The singular expression may include the plural expression unless the context clearly dictates otherwise. In the disclosure, expressions such as "A or B", "at least one of A and/or B", "A, B, or C" or "at least one of A, B, and/or C", and the like may include all possible combinations of the items listed together. Expressions such as "first" or "second" may modify the corresponding components regardless of order or importance, and are used only for distinguishing one component from other components, and do not limit the corresponding components. When a (e.g., first) component is referred to as being "connected (functionally or communicatively)" or "accessed" to another (e.g., second) component, the component may be directly connected to the another component or may be connected through the another component (e.g., third component).

The term "module" used in the disclosure includes a unit configured with hardware, software, or firmware, and may be used interchangeably with terms such as, for example, logic, logic block, part, or circuit. A module may be an integrally formed part or a minimum unit or a part of performing one or more functions. For example, the module may be configured as an application-specific integrated circuit (ASIC).

Various embodiments of the disclosure may be implemented into software (e.g., program) including instructions stored in machine (e.g., computer) readable storage media (e.g., internal memory or external memory). The machine is a device capable of calling a stored instruction from a storage medium and operating according to the called instruction, and may include a terminal according to various embodiments. When the command is executed by the processor, the processor may perform a function corresponding to the command directly or using other components under the control of the processor. The command may include code generated or executed by a compiler or interpreter.

The machine readable storage medium may be provided in the form of a non-transitory storage medium. Here, "non-transitory" means that the storage medium does not include a signal and is tangible, and does not distinguish that data is semi-permanently or temporarily stored in the storage medium.

Methods according to various embodiments disclosed in the disclosure may be provided by being included in a computer program product. Computer program products may be traded between sellers and buyers as commodities. The computer program product may be distributed in the form of a machine-readable storage medium (e.g., compact disc read only memory (CD-ROM)) or online through an application store (e.g., Play Store™). In the case of online distribution, at least a portion of the computer program product may be at least temporarily stored or temporarily generated in a storage medium such as a memory of a server of a manufacturer, a server of an application store, or a relay server. Each of the components (e.g., module or program) according to various embodiments may be configured with a singular entity or a plurality of entities, and some sub-components of the aforementioned sub-components may be omitted, or other sub-components may be further included in the various embodiments. Alternatively or additionally, some components (e.g., module or program) may be integrated into a single entity, so that functions performed by each corresponding component prior to integration may be performed identically or similarly. According to various embodiments, operations performed by a module, a program, or other component may be sequentially, parallelly, repetitively or heuristically executed, or at least some operations may be executed in different order, omitted, or other operations may be added thereto.

The invention claimed is:

1. A method performed by a first terminal, the method comprising: transmitting, to a second terminal, a bundle to be installed at the second terminal, wherein the bundle is a secondary platform bundle (SPB) included in a smart secure platform (SSP) of the first terminal; receiving, from the second terminal, a first attestation generated by the second terminal, wherein the first attestation includes information on a bundle state of the second terminal, an SSP identifier of the second terminal, and a signature of the second terminal; verifying the first attestation by checking a validity of the SSP identifier and the signature; deleting the bundle in response to the first attestation being verified; generating a second attestation including information on a bundle state of the first terminal, an SSP identifier of the first terminal, and a signature of the first terminal; and transmitting, to the second terminal, the second attestation, wherein the bundle state of the second terminal is changed on the second terminal after verifying the second attestation.

2. The method of claim 1, wherein the bundle state of the first terminal is configured to at least one of DELETE, IN TRANSITION, or SUSPENSION, and wherein the method further comprises: receiving, from the second terminal, a third attestation including information on a bundle state change of the second terminal in response to the bundle state of the first terminal being configured to IN TRANSITION; verifying the received third attestation; and deleting the bundle of the first terminal after verifying the third attestation.

3. The method of claim 1, wherein a fourth attestation including information on a verification result of the first attestation and the second attestation is generated by the second terminal,
the fourth attestation is transmitted to a server, and
the fourth attestation is verified by the server.

4. The method of claim 1, wherein a fifth attestation including an authentication result with a server is generated by the server,
the fifth attestation is transmitted to the second terminal, and
the fifth attestation is verified by the second terminal.

5. A method performed by a second terminal, the method comprising: receiving, from a first terminal, a bundle to be installed at the second terminal, wherein the bundle is a secondary platform bundle (SPB) included in a smart secure platform (SSP) of the first terminal; installing the bundle; generating a first attestation including information on a bundle state of the second terminal, an SSP identifier of the second terminal, and a signature of the second terminal; transmitting, to the first terminal, the first attestation; receiving, from the first terminal, a second attestation generated by the first terminal, wherein the second attestation includes information on a bundle state of the first terminal, an SSP identifier of the first terminal, and a signature of the first terminal; verifying the received second attestation by checking a validity of the SSP identifier and the signature; and changing the bundle state of the second terminal on the second terminal in response to the second attestation being verified, wherein the bundle is deleted on the first terminal.

6. The method of claim 5, wherein changing the bundle state on the second terminal comprises changing the bundle state of the second terminal to at least one of enable, active, or disabled, and wherein the bundle state of the first terminal is configured to at least one of DELETE, IN TRANSITION, or SUSPENSION, and wherein the method further comprises: generating a third attestation including information on a bundle state change of the second terminal in response to the bundle state of the first terminal being configured to IN TRANSITION; and transmitting the third attestation to the first terminal.

7. The method of claim 5, further comprising:
generating a fourth attestation including information on a verification result of the first attestation and the second attestation; and
transmitting the fourth attestation to a server.

8. The method of claim 5, further comprising:
receiving, from a server, a fifth attestation generated including an authentication result with the server;
verifying the received fifth attestation; and
changing the bundle state on the second terminal after verifying the fifth attestation.

9. A first terminal, comprising:
a transceiver configured to transmit and receive at least one signal; and
a controller coupled to the transceiver, wherein the controller is configured to:
transmit, to a second terminal, a bundle to be installed at the second terminal, wherein the bundle is a secondary platform bundle (SPB) included in a smart secure platform (SSP) of the first terminal,
receive, from the second terminal, a first attestation generated by the second terminal, wherein the first attestation includes information on a bundle state of the second terminal, an SSP identifier of the second terminal, and a signature of the second terminal,
verify the received first attestation by checking a validity of the SSP identifier and the signature,
delete the bundle in response to the first attestation being verified,
generate a second attestation including information on a bundle state of the first terminal, an SSP identifier of the first terminal, and a signature of the first terminal, and
transmit, to the second terminal, the second attestation,
wherein the bundle state of the second terminal is changed on the second terminal after verifying the second attestation.

10. The first terminal of claim 9, wherein the controller is further configured to: receive a third attestation generated including information on a bundle state change of the second terminal from the second terminal in response to a bundle state of the first terminal being configured to IN TRANSITION, verify the received third attestation, and delete a bundle of the first terminal after verifying the third attestation, wherein the bundle state of the first terminal is configured to at least one of DELETE, IN TRANSITION, or SUSPENSION.

11. The first terminal of claim 9, wherein a fourth attestation including information on a verification result of the first attestation and the second attestation is generated by the second terminal,
the fourth attestation is transmitted to a server, and
the fourth attestation is verified by the server.

12. The first terminal of claim 9, wherein a fifth attestation including an authentication result with a server is generated by the server,
the fifth attestation is transmitted to the second terminal, and
the fifth attestation is verified by the second terminal.

13. A second terminal, comprising: a transceiver configured to transmit and receive at least one signal; and a controller coupled to the transceiver, wherein the controller is configured to: receive, from a first terminal, a bundle to be installed at the second terminal, wherein the bundle is a secondary platform bundle (SPB) included in a smart secure platform (SSP) of the first terminal, install the bundle, generate a first attestation including information on a bundle state of the second terminal, an SSP identifier of the second terminal, and a signature of the second terminal, transmit, to the first terminal, the first attestation, receive, from the first terminal, a second attestation generated by the first terminal, wherein the second attestation includes information on a bundle state of the first terminal, an SSP identifier of the first terminal, and a signature of the first terminal, verify the received second attestation by checking a validity of the SSP identifier and the signature, and change the bundle state of the second terminal on the second terminal in response to the second attestation being verified, wherein the bundle is deleted on the first terminal.

14. The second terminal of claim 13, wherein the controller is further configured to: change a bundle state of the second terminal to at least one of enable, active, or disabled, generate a third attestation including information on the changed bundle state of the second terminal in response to a bundle state of the first terminal being configured to IN TRANSITION, and transmit the third attestation to the first terminal, wherein the bundle state of the first terminal is configured to at least one of DELETE, IN TRANSITION, or SUSPENSION.

15. The second terminal of claim 13, wherein the controller is further configured to:
generate a fourth attestation including information on a verification result of the first attestation and the second attestation, and
transmit the fourth attestation to a server.

\* \* \* \* \*